(12) United States Patent
Rabaud et al.

(10) Patent No.: US 11,012,714 B1
(45) Date of Patent: May 18, 2021

(54) IMAGE CODING USING LEXICOGRAPHIC CODING ORDER WITH FLOATING BLOCK-PARTITIONING

(71) Applicant: GOOGLE LLC, Mountain View, CA (US)

(72) Inventors: Vincent Rabaud, Paris (FR); Pascal Massimino, Orsay (FR)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/909,221

(22) Filed: Jun. 23, 2020

(51) Int. Cl.
*H04N 19/64* (2014.01)
*H04N 19/176* (2014.01)
*H04N 19/119* (2014.01)
*H04N 19/13* (2014.01)

(52) U.S. Cl.
CPC ........... *H04N 19/64* (2014.11); *H04N 19/119* (2014.11); *H04N 19/176* (2014.11); *H04N 19/13* (2014.11)

(58) Field of Classification Search
USPC .................................................... 375/240.18
See application file for complete search history.

(56) References Cited

U.S. PATENT DOCUMENTS

| | | | | |
|---|---|---|---|---|
| 2016/0150236 A1* | 5/2016 | Maeda | ................. | H04N 19/187 375/240.08 |
| 2016/0269684 A1* | 9/2016 | Lim | ...................... | H04N 7/152 |
| 2018/0070078 A1* | 3/2018 | Henry | ................... | H04N 19/194 |
| 2018/0070109 A1* | 3/2018 | Henry | ................... | H04N 19/124 |
| 2018/0165880 A1* | 6/2018 | Overbeck | ............ | H04N 19/597 |
| 2019/0394482 A1* | 12/2019 | Joshi | ...................... | H04N 19/50 |
| 2020/0221086 A1* | 7/2020 | Henry | ................... | H04N 19/119 |

OTHER PUBLICATIONS

Bankoski, et al., "Technical Overview of VP8, An Open Source Video Codec for the Web", Jul. 11, 2011, 6 pp.
Bankoski et al., "VP8 Data Format and Decoding Guide", Independent Submission RFC 6389, Nov. 2011, 305 pp.
(Continued)

*Primary Examiner* — Behrooz M Senfi
(74) *Attorney, Agent, or Firm* — Young Basile Hanlon & MacFarlane, P.C.

(57) ABSTRACT

Decoding image data using lexicographic coding order with floating block-partitioning includes obtaining, from an encoded bitstream, encoded data for a defined portion of a frame, generating a reconstructed frame by decoding the encoded data, and outputting the reconstructed frame for presentation to a user. Decoding the encoded data using lexicographic coding order with floating block-partitioning includes decoding, from the encoded data, block dimension data for respective blocks from the plurality of blocks in lexicographic coding order, determining block location data for the respective blocks from the plurality of blocks in lexicographic coding order, generating reconstructed block data for the respective blocks from the plurality of blocks using the block dimension data and the block location data by decoding, from the encoded data, image content data for the respective blocks from the plurality of blocks, and including the reconstructed block data in the reconstructed frame.

20 Claims, 31 Drawing Sheets

(56) References Cited

OTHER PUBLICATIONS

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

\* cited by examiner

IMAGE CODING USING LEXICOGRAPHIC CODING ORDER WITH FLOATING BLOCK-PARTITIONING

BACKGROUND

Digital images and video can be used, for example, on the internet, for remote business meetings via video conferencing, high definition video entertainment, video advertisements, or sharing of user-generated content. Due to the large amount of data involved in transferring and processing image and video data, high-performance compression may be advantageous for transmission and storage. Accordingly, it would be advantageous to provide high-resolution image and video transmitted over communications channels having limited bandwidth, such as image and video coding using lexicographic coding order with floating block-partitioning.

SUMMARY

This application relates to encoding and decoding of image data, video stream data, or both for transmission or storage. Disclosed herein are aspects of systems, methods, and apparatuses for encoding and decoding using lexicographic coding order with floating block-partitioning.

An aspect is a method for image coding using lexicographic coding order with floating block-partitioning. Image coding using lexicographic coding order with floating block-partitioning may include obtaining, from an encoded bitstream, encoded data for a defined portion of a frame, generating, by a processor, a reconstructed frame by decoding the encoded data using lexicographic coding order with floating block-partitioning, wherein the defined portion includes a plurality of blocks of pixels, and outputting the reconstructed frame for presentation to a user. Decoding the encoded data using lexicographic coding order with floating block-partitioning may include decoding, from the encoded data, block dimension data for respective blocks from the plurality of blocks in lexicographic coding order, determining block location data for the respective blocks from the plurality of blocks in lexicographic coding order, generating reconstructed block data for the respective blocks from the plurality of blocks using the block dimension data and the block location data by decoding, from the encoded data, image content data for the respective blocks from the plurality of blocks, and including the reconstructed block data in the reconstructed frame.

Another aspect is an apparatus for image coding using lexicographic coding order with floating block-partitioning. The apparatus may include a processor configured to obtain, from an encoded bitstream, encoded data for a defined portion of a frame, generate a reconstructed frame by decoding the encoded data using lexicographic coding order with floating block-partitioning, wherein the defined portion includes a plurality of blocks of pixels, and output the reconstructed frame for presentation to a user. Decoding the encoded data using lexicographic coding order with floating block-partitioning includes, decoding, from the encoded data, block dimension data for respective blocks from the plurality of blocks in lexicographic coding order, determining block location data for the respective blocks from the plurality of blocks in lexicographic coding order, generating reconstructed block data for the respective blocks from the plurality of blocks using the block dimension data and the block location data by decoding, from the encoded data, image content data for the respective blocks from the plurality of blocks, including the reconstructed block data in the reconstructed frame.

Another aspect is a method for image coding using lexicographic coding order with floating block-partitioning. Image coding using lexicographic coding order with floating block-partitioning may include obtaining, from an encoded bitstream, an encoded tile header for a tile from an image, decoding, from the encoded tile header, block dimensions for a first block, other than a sub-block, wherein the block dimensions for the first block differ from block dimensions for an adjacent block, other than a sub-block, from the tile, identifying the first block as a current block, determining block location data for the current block in accordance with block location constraints, obtaining, from the encoded bitstream, encoded block data for the current block, generating reconstructed block data for the current block using the block dimensions and the block location data by decoding the encoded block data, including the reconstructed block data in a reconstructed tile, including the reconstructed tile in a reconstructed image, outputting the reconstructed image for presentation to a user.

Variations in these and other aspects will be described in additional detail hereafter.

BRIEF DESCRIPTION OF THE DRAWINGS

The description herein refers to the accompanying drawings wherein like reference numerals refer to like parts throughout the several views unless otherwise noted or otherwise clear from context.

DETAILED DESCRIPTION

Image and video compression schemes may include breaking an image, or frame, into smaller portions, such as blocks, and generating an output bitstream using techniques to minimize the bandwidth utilization of the information included for each block in the output. In some implementations, the information included for each block in the output may be limited by reducing spatial redundancy, reducing temporal redundancy, or a combination thereof. For example, temporal or spatial redundancies may be reduced by predicting a frame, or a portion thereof, based on information available to both the encoder and decoder, and including information representing a difference, or residual, between the predicted frame and the original frame in the encoded bitstream. The residual information may be further compressed by transforming the residual information into transform coefficients, quantizing the transform coefficients, and entropy coding the quantized transform coefficients. Other coding information, such as motion information, may be included in the encoded bitstream, which may include transmitting differential information based on predictions of the encoding information, which may be entropy coded to further reduce the corresponding bandwidth utilization. An encoded bitstream can be decoded to reconstruct the blocks and the source images from the limited information.

In some implementations, image and video coding may include partitioning a frame using trellised block partitioning wherein the frame is partitioned in accordance with a grid or trellis of maximum size blocks aligned in rows and columns. The maximum size blocks may be partitioned into sub-blocks. The available block sizes may be limited by the maximum size block. Block sizes greater than the maximum block size in a dimension may be unavailable. Block locations may be subject to a trellising constraint to be aligned with the trellis of maximum size blocks. Blocks crossing boundaries of the maximum block size trellis may be unavailable. The maximum size blocks may be coded in a defined block coding order, such as raster order.

Implementations of image and video coding using lexicographic coding order with floating block-partitioning may increase the available block sizes and block locations, which may reduce bandwidth utilization relative to trellised block partitioning. Implementations of image and video coding using lexicographic coding order with floating block-partitioning may signal block dimensions in accordance with a lexicographic coding order, which may differ from the defined block coding order used with trellised block partitioning. The image content for the respective blocks may be signaled in an order that differs from the order for signaling the block dimensions.

Figure 1:
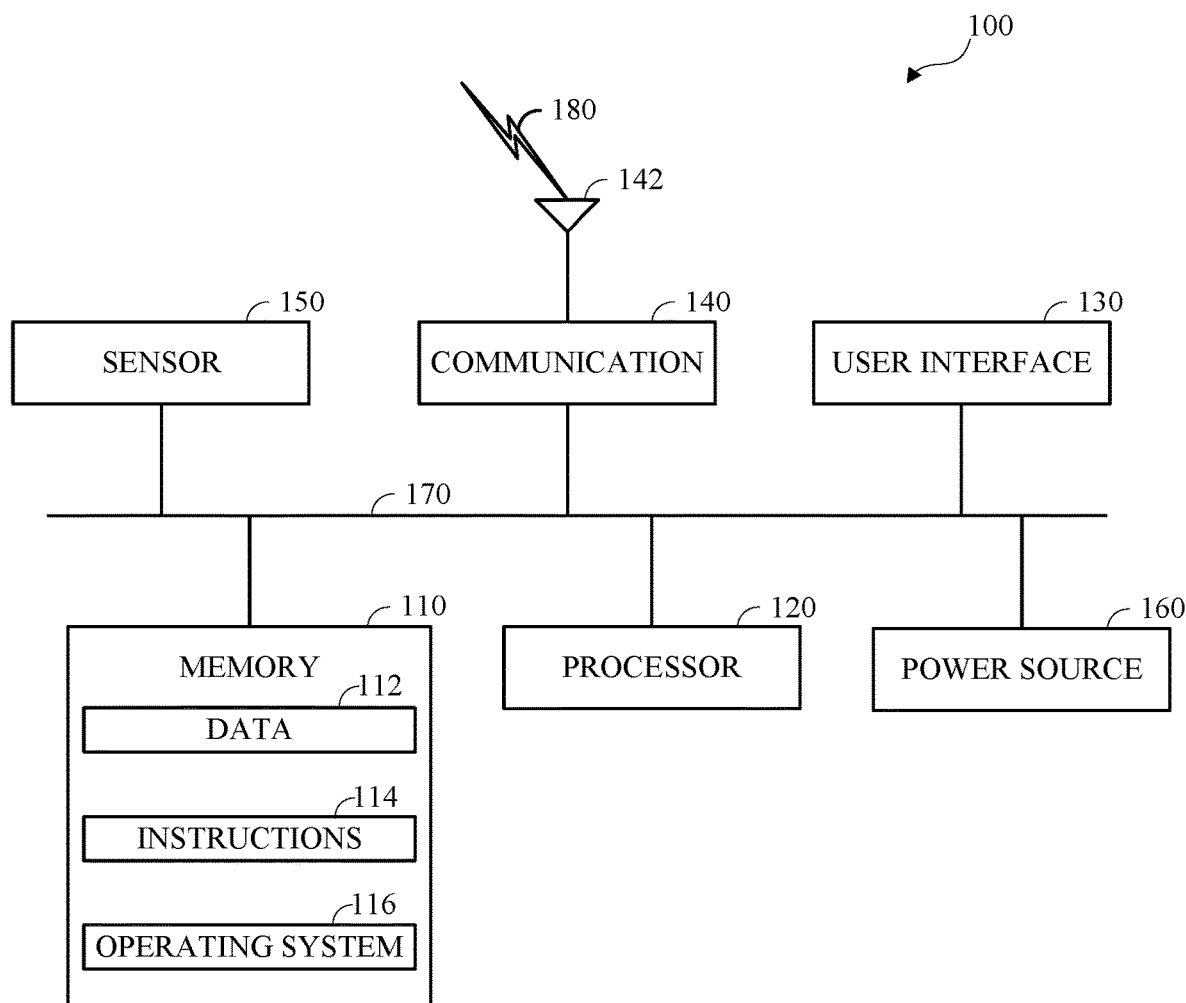
FIG. 1 is a diagram of a computing device in accordance with implementations of this disclosure.

FIG. 1 is a diagram of a computing device 100 in accordance with implementations of this disclosure. The computing device 100 shown includes a memory 110, a processor 120, a user interface (UI) 130, an electronic communication unit 140, a sensor 150, a power source 160, and a bus 170. As used herein, the term "computing device" includes any unit, or a combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 100 can be integrated into any number of separate physical units. For example, the user interface 130 and processor 120 can be integrated in a first physical unit and the memory 110 can be integrated in a second physical unit.

The memory 110 can include any non-transitory computer-usable or computer-readable medium, such as any tangible device that can, for example, contain, store, communicate, or transport data 112, instructions 114, an operating system 116, or any information associated therewith, for use by or in connection with other components of the computing device 100. The non-transitory computer-usable or computer-readable medium can be, for example, a solid state drive, a memory card, removable media, a read-only memory (ROM), a random-access memory (RAM), any type of disk including a hard disk, a floppy disk, an optical disk, a magnetic or optical card, an application-specific integrated circuits (ASICs), or any type of non-transitory media suitable for storing electronic information, or any combination thereof.

Although shown as a single unit, the memory 110 may include multiple physical units, such as one or more primary memory units, such as random-access memory units, one or more secondary data storage units, such as disks, or a combination thereof. For example, the data 112, or a portion thereof, the instructions 114, or a portion thereof, or both, may be stored in a secondary storage unit and may be loaded or otherwise transferred to a primary storage unit in conjunction with processing the respective data 112, executing the respective instructions 114, or both. In some implementations, the memory 110, or a portion thereof, may be removable memory.

The data 112 can include information, such as input audio data, encoded audio data, decoded audio data, or the like. The instructions 114 can include directions, such as code, for performing any method, or any portion or portions thereof, disclosed herein. The instructions 114 can be realized in hardware, software, or any combination thereof. For example, the instructions 114 may be implemented as information stored in the memory 110, such as a computer program, that may be executed by the processor 120 to perform any of the respective methods, algorithms, aspects, or combinations thereof, as described herein.

Although shown as included in the memory 110, in some implementations, the instructions 114, or a portion thereof, may be implemented as a special purpose processor, or circuitry, that can include specialized hardware for carrying out any of the methods, algorithms, aspects, or combinations thereof, as described herein. Portions of the instructions 114 can be distributed across multiple processors on the same machine or different machines or across a network such as a local area network, a wide area network, the Internet, or a combination thereof.

The processor 120 can include any device or system capable of manipulating or processing a digital signal or other electronic information now-existing or hereafter developed, including optical processors, quantum processors, molecular processors, or a combination thereof. For example, the processor 120 can include a special purpose processor, a central processing unit (CPU), a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors.

The user interface 130 can include any unit capable of interfacing with a user, such as a virtual or physical keypad, a touchpad, a display, a touch display, a speaker, a microphone, a video camera, a sensor, or any combination thereof. For example, the user interface 130 may be an audio-visual display device, and the computing device 100 may present audio, such as decoded audio, using the user interface 130 audio-visual display device, such as in conjunction with displaying video, such as decoded video. Although shown as a single unit, the user interface 130 may include one or more physical units. For example, the user interface 130 may include an audio interface for performing audio communication with a user, and a touch display for performing visual and touch-based communication with the user.

The electronic communication unit 140 can transmit, receive, or transmit and receive signals via a wired or wireless electronic communication medium 180, such as a radio frequency (RF) communication medium, an ultraviolet (UV) communication medium, a visible light communication medium, a fiber optic communication medium, a wireline communication medium, or a combination thereof. For example, as shown, the electronic communication unit 140 is operatively connected to an electronic communication interface 142, such as an antenna, configured to communicate via wireless signals.

Although the electronic communication interface 142 is shown as a wireless antenna in FIG. 1, the electronic communication interface 142 can be a wireless antenna, as shown, a wired communication port, such as an Ethernet port, an infrared port, a serial port, or any other wired or wireless unit capable of interfacing with a wired or wireless electronic communication medium 180. Although FIG. 1 shows a single electronic communication unit 140 and a single electronic communication interface 142, any number of electronic communication units and any number of electronic communication interfaces can be used.

The sensor 150 may include, for example, an audio-sensing device, a visible light-sensing device, a motion sensing device, or a combination thereof. For example, 100 the sensor 150 may include a sound-sensing device, such as a microphone, or any other sound-sensing device now existing or hereafter developed that can sense sounds in the proximity of the computing device 100, such as speech or other utterances, made by a user operating the computing device 100. In another example, the sensor 150 may include a camera, or any other image-sensing device now existing or hereafter developed that can sense an image such as the image of a user operating the computing device. Although a single sensor 150 is shown, the computing device 100 may include a number of sensors 150. For example, the computing device 100 may include a first camera oriented with a field of view directed toward a user of the computing device 100 and a second camera oriented with a field of view directed away from the user of the computing device 100.

The power source 160 can be any suitable device for powering the computing device 100. For example, the power source 160 can include a wired external power source interface; one or more dry cell batteries, such as nickel-cadmium (NiCad), nickel-zinc (NiZn), nickel metal hydride (NiMH), lithium-ion (Li-ion); solar cells; fuel cells; or any other device capable of powering the computing device 100. Although a single power source 160 is shown in FIG. 1, the computing device 100 may include multiple power sources 160, such as a battery and a wired external power source interface.

Although shown as separate units, the electronic communication unit 140, the electronic communication interface 142, the user interface 130, the power source 160, or portions thereof, may be configured as a combined unit. For example, the electronic communication unit 140, the electronic communication interface 142, the user interface 130, and the power source 160 may be implemented as a communications port capable of interfacing with an external display device, providing communications, power, or both.

One or more of the memory 110, the processor 120, the user interface 130, the electronic communication unit 140, the sensor 150, or the power source 160, may be operatively coupled via a bus 170. Although a single bus 170 is shown in FIG. 1, a computing device 100 may include multiple buses. For example, the memory 110, the processor 120, the user interface 130, the electronic communication unit 140, the sensor 150, and the bus 170 may receive power from the power source 160 via the bus 170. In another example, the memory 110, the processor 120, the user interface 130, the electronic communication unit 140, the sensor 150, the power source 160, or a combination thereof, may communicate data, such as by sending and receiving electronic signals, via the bus 170.

Although not shown separately in FIG. 1, one or more of the processor 120, the user interface 130, the electronic communication unit 140, the sensor 150, or the power source 160 may include internal memory, such as an internal buffer or register. For example, the processor 120 may include internal memory (not shown) and may read data 112 from the memory 110 into the internal memory (not shown) for processing.

Although shown as separate elements, the memory 110, the processor 120, the user interface 130, the electronic communication unit 140, the sensor 150, the power source 160, and the bus 170, or any combination thereof can be integrated in one or more electronic units, circuits, or chips.

Figure 2:
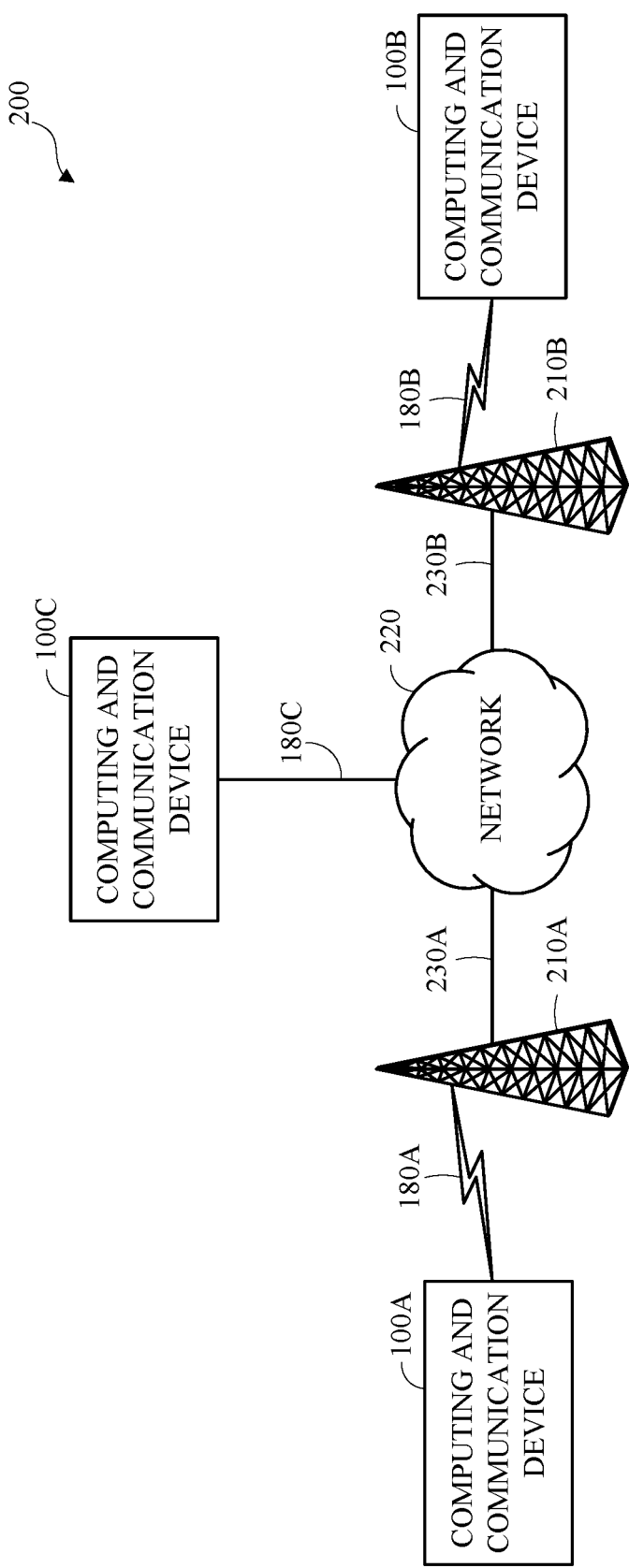
FIG. 2 is a diagram of a computing and communications system in accordance with implementations of this disclosure.

FIG. 2 is a diagram of a computing and communications system 200 in accordance with implementations of this disclosure. The computing and communications system 200 shown includes computing and communication devices 100A, 100B, 100C, access points 210A, 210B, and a network 220. For example, the computing and communication system 200 can be a multiple access system that provides communication, such as voice, audio, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, 100C can be, for example, a computing device, such as the computing device 100 shown in FIG. 1. For example, the computing and communication devices 100A, 100B may be user devices, such as a mobile computing device, a laptop, a thin client, or a smartphone, and the computing and communication device 100C may be a server, such as a mainframe or a cluster. Although the computing and communication device 100A and the computing and communication device 100B are described as user devices, and the computing and communication device 100C is described as a server, any computing and communication device may perform some or all of the functions of a server, some or all of the functions of a user device, or some or all of the functions of a server and a user device. For example, the server computing and communication device 100C may receive, encode, process, store, transmit, or a combination thereof audio data and one or both of the computing and communication device 100A and the computing and communication device 100B may receive, decode, process, store, present, or a combination thereof the audio data.

Each computing and communication device 100A, 100B, 100C, which may include a user equipment (UE), a mobile station, a fixed or mobile subscriber unit, a cellular telephone, a personal computer, a tablet computer, a server, consumer electronics, or any similar device, can be configured to perform wired or wireless communication, such as via the network 220. For example, the computing and communication devices 100A, 100B, 100C can be configured to transmit or receive wired or wireless communication signals. Although each computing and communication device 100A, 100B, 100C is shown as a single unit, a computing and communication device can include any number of interconnected elements.

Each access point 210A, 210B can be any type of device configured to communicate with a computing and communication device 100A, 100B, 100C, a network 220, or both via wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the HyperText Transport Protocol (HTTP), or a combination thereof.

The computing and communication devices 100A, 100B, 100C can communicate with each other via the network 220 using one or more wired or wireless communication links, or via a combination of wired and wireless communication links. For example, as shown the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

In some implementations, communications between one or more of the computing and communication devices 100A, 100B, 100C may omit communicating via the network 220 and may include transferring data via another medium (not shown), such as a data storage device. For example, the server computing and communication device 100C may store audio data, such as encoded audio data, in a data storage device, such as a portable data storage unit, and one or both of the computing and communication device 100A or the computing and communication device 100B may access, read, or retrieve the stored audio data from the data storage unit, such as by physically disconnecting the data storage device from the server computing and communication device 100C and physically connecting the data storage device to the computing and communication device 100A or the computing and communication device 100B.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
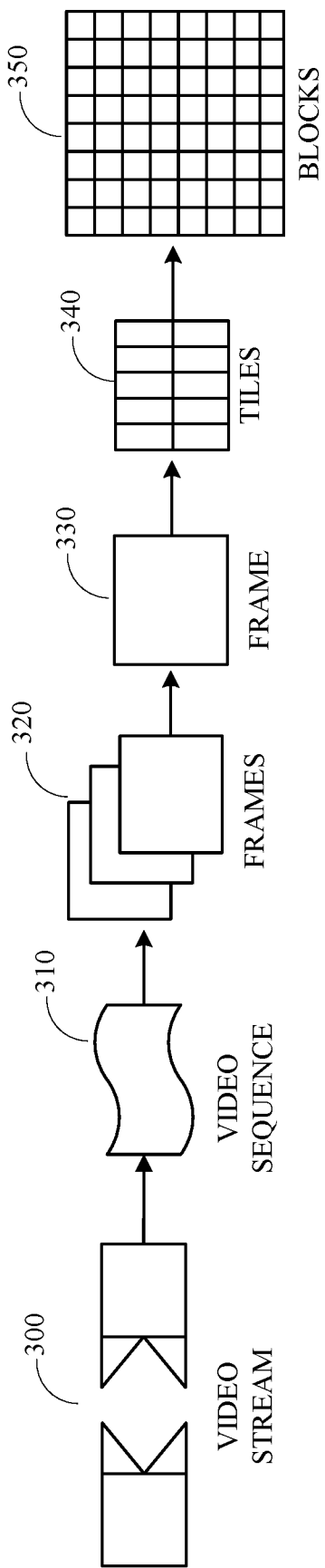
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320.

Each frame 330 from the adjacent frames 320 may represent a single image from the video stream. Although not shown in FIG. 3, a frame 330 may include one or more segments, tiles, or planes, which may be coded, or otherwise processed, independently, such as in parallel. A frame 330 may include one or more tiles 340. Each of the tiles 340 may be a rectangular region of the frame that can be coded independently. Each of the tiles 340 may include respective blocks 350. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
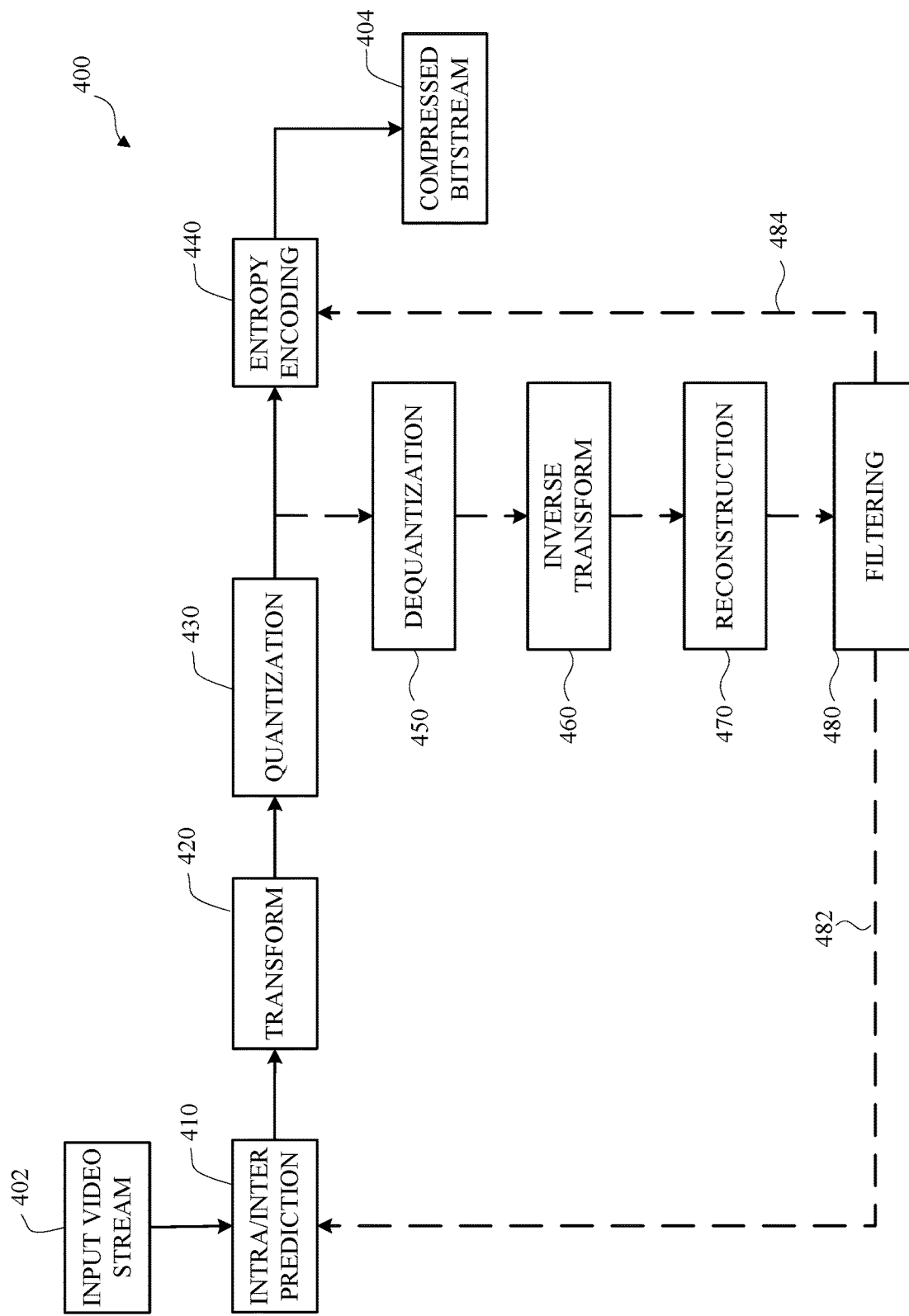
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3, to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference portion of the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loeve Transform (KLT), the Discrete Cosine Transform (DCT), the Singular Value Decomposition Transform (SVD), and the Asymmetric Discrete Sine Transform (ADST). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
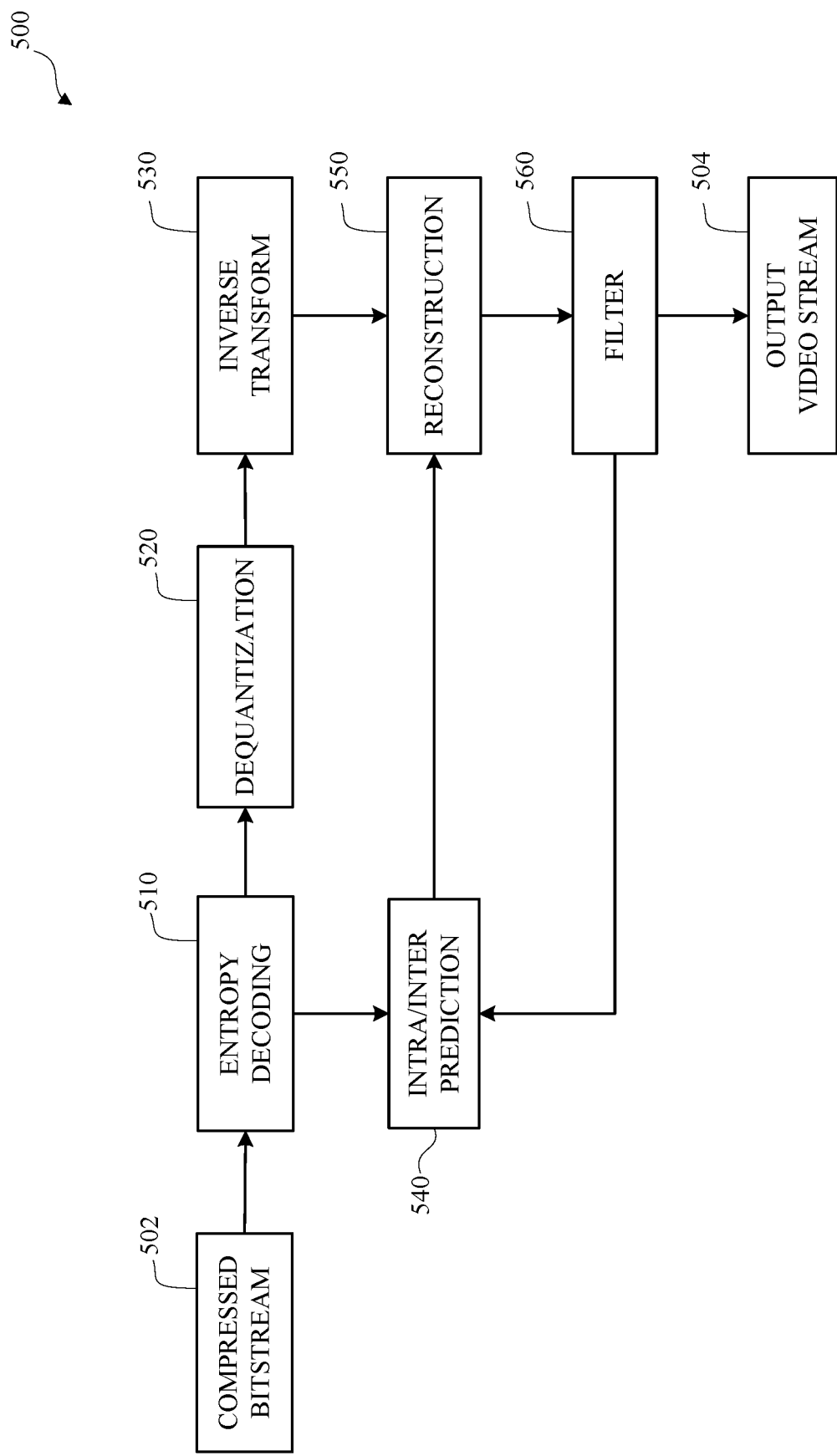
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below and may include decoding the encoded frame, or a portion thereof, which may include decoding an encoded block, which may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a decoded block. The filtering unit 480 can be applied to the decoded block to generate a reconstructed block, which may reduce distortion, such as blocking artifacts. Although one filtering unit 480 is shown in FIG. 4, filtering the decoded block may include loop filtering, deblocking filtering, or other types of filtering or combinations of types of filtering. The reconstructed block may be stored or otherwise made accessible as a reconstructed block, which may be a portion of a reference frame, for encoding another portion of the current frame, another frame, or both, as indicated by the broken line at 482. Coding information, such as deblocking threshold index values, for the frame may be encoded, included in the compressed bitstream 404, or both, as indicated by the broken line at 484.

Other variations of the encoder 400 can be used to encode the compressed bitstream 404. For example, a non-transform-based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to decode video data as described herein. The decoder 500 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a filtering unit 560, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond to the derivative residual block generated by the inverse transform unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a decoded block. The filtering unit 560 can be applied to the decoded block to reduce artifacts, such as blocking artifacts, which may include loop filtering, deblocking filtering, or other types of filtering or combinations of types of filtering, and which may include generating a reconstructed block, which may be output as the output video stream 504.

Other variations of the decoder 500 can be used to decode the compressed bitstream 502. For example, the decoder 500 can produce the output video stream 504 without the deblocking filtering unit 570.

Figure 6:
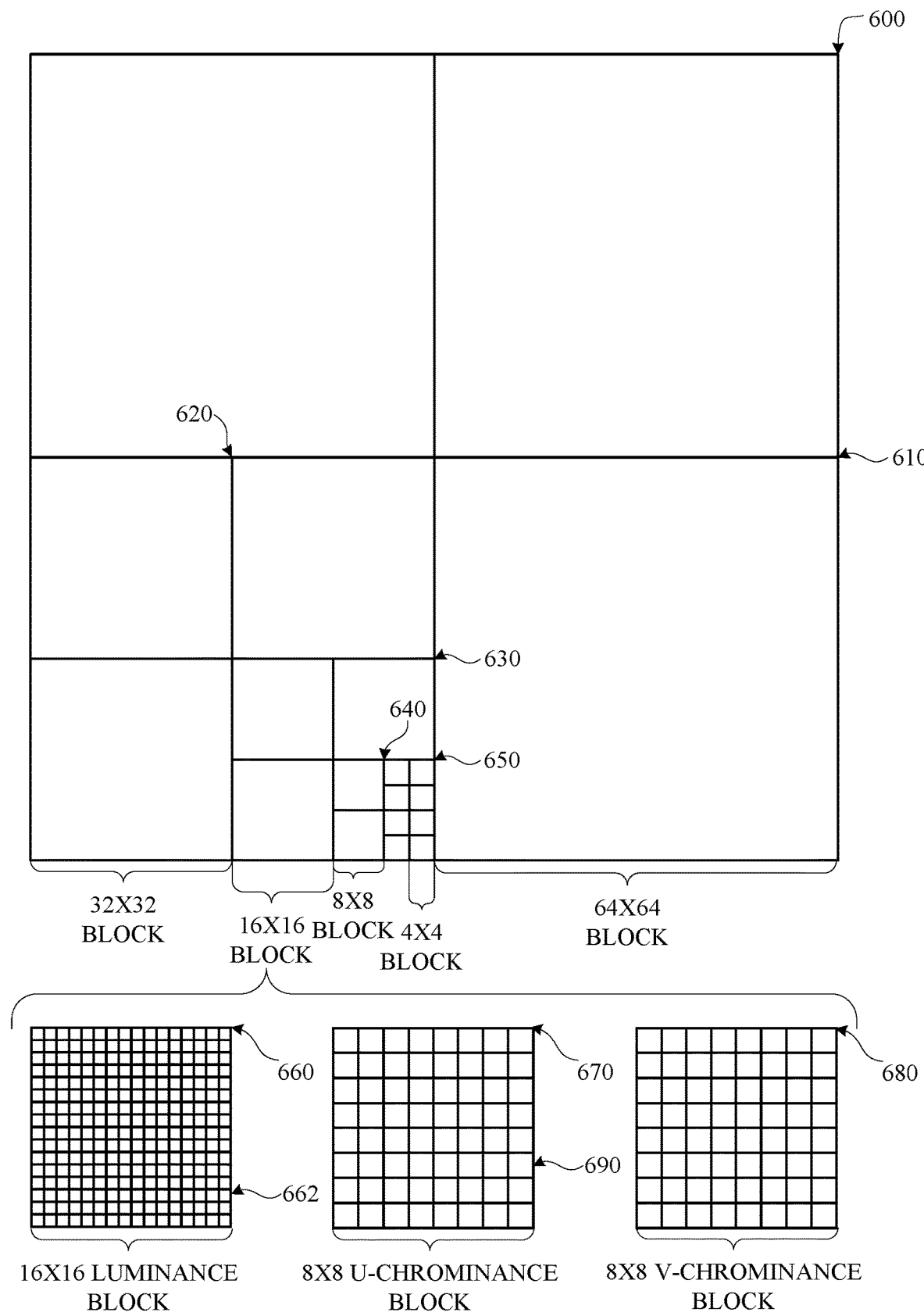
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, in two rows and two columns in a matrix or Cartesian plane. In some implementations, a 64×64 block may be a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include luminance pixels 662; and two chrominance blocks 670, 680, such as a U or Cb chrominance block 670, and a V or Cr chrominance block 680. The chrominance blocks 670, 680 may include chrominance pixels 690. For example, the luminance block 660 may include 16×16 luminance pixels 662 and each chrominance block 670, 680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block may include using quad-tree coding, which may include coding smaller block units within a block in raster-scan order. For example, the 64×64 block shown in the bottom left corner of the portion of the frame shown in FIG. 6, may be coded using quad-tree coding wherein the top left 32×32 block may be coded, then the top right 32×32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame and using a relatively small amount of information to represent each corresponding chrominance component for the portion of the frame. For example, a portion of a frame may be represented by a high-resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a portion of a reference frame that corresponds to a current block or pixel of a current frame. For example, a reference frame, or a portion of a reference frame, which may be stored in memory, may be searched to identify a portion for generating a prediction to use for encoding a current block or pixel of the current frame with maximal efficiency. For example, the search may identify a portion of the reference frame for which the difference in pixel values between the current block and a prediction block generated based on the portion of the reference frame is minimized and may be referred to as motion searching. In some implementations, the portion of the reference frame searched may be limited. For example, the portion of the reference frame searched, which may be referred to as the search area, may include a limited number of rows of the reference frame. In an example, identifying the portion of the reference frame for generating a prediction may include calculating a cost function, such as a sum of absolute differences (SAD), between the pixels of portions of the search area and the pixels of the current block.

In some implementations, the spatial difference between the location of the portion of the reference frame for generating a prediction in the reference frame and the current block in the current frame may be represented as a motion vector. The difference in pixel values between the prediction block and the current block may be referred to as differential data, residual data, a prediction error, or as a residual block. In some implementations, generating motion vectors may be referred to as motion estimation, and a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two-dimensional data structure such as a matrix as shown, or in a one-dimensional data structure, such as a vector array. In an implementation, a representation of the frame, such as a two-dimensional representation as shown, may correspond to a physical location in a rendering of the frame as an image. For example, a location in the top left corner of a block in the top left corner of the frame may correspond with a physical location in the top left corner of a rendering of the frame as an image.

In some implementations, block-based coding efficiency may be improved by partitioning input blocks into one or more prediction partitions, which may be rectangular, including square, partitions for prediction coding. In some implementations, video coding using prediction partitioning may include selecting a prediction partitioning scheme from among multiple candidate prediction partitioning schemes. For example, in some implementations, candidate prediction partitioning schemes for a 64×64 coding unit may include rectangular size prediction partitions ranging in sizes from 4×4 to 64×64, such as 4×4, 4×8, 8×4, 8×8, 8×16, 16×8, 16×16, 16×32, 32×16, 32×32, 32×64, 64×32, or 64×64. In some implementations, video coding using prediction partitioning may include a full prediction partition search, which may include selecting a prediction partitioning scheme by encoding the coding unit using each available candidate prediction partitioning scheme and selecting the best scheme, such as the scheme that produces the least rate-distortion error.

In some implementations, encoding a video frame may include identifying a prediction partitioning scheme for encoding a current block, such as block 610. In some implementations, identifying a prediction partitioning scheme may include determining whether to encode the block as a single prediction partition of maximum coding unit size, which may be 64×64 as shown, or to partition the block into multiple prediction partitions, which may correspond with the sub-blocks, such as the 32×32 blocks 620 the 16×16 blocks 630, or the 8×8 blocks 640, as shown, and may include determining whether to partition into one or more smaller prediction partitions. For example, a 64×64 block may be partitioned into four 32×32 prediction partitions. Three of the four 32×32 prediction partitions may be encoded as 32×32 prediction partitions and the fourth 32×32 prediction partition may be further partitioned into four 16×16 prediction partitions. Three of the four 16×16 prediction partitions may be encoded as 16×16 prediction partitions and the fourth 16×16 prediction partition may be further partitioned into four 8×8 prediction partitions, each of which may be encoded as an 8×8 prediction partition. In some implementations, identifying the prediction partitioning scheme may include using a prediction partitioning decision tree.

In some implementations, video coding for a current block may include identifying an optimal prediction coding mode from multiple candidate prediction coding modes, which may provide flexibility in handling video signals with various statistical properties and may improve the compression efficiency. For example, a video coder may evaluate each candidate prediction coding mode to identify the optimal prediction coding mode, which may be, for example, the prediction coding mode that minimizes an error metric, such as a rate-distortion cost, for the current block. In some implementations, the complexity of searching the candidate prediction coding modes may be reduced by limiting the set of available candidate prediction coding modes based on similarities between the current block and a corresponding prediction block. In some implementations, the complexity of searching each candidate prediction coding mode may be reduced by performing a directed refinement mode search. For example, metrics may be generated for a limited set of candidate block sizes, such as 16×16, 8×8, and 4×4, the error metric associated with each block size may be in descending order, and additional candidate block sizes, such as 4×8 and 8×4 block sizes, may be evaluated.

In some implementations, block-based coding efficiency may be improved by partitioning a current residual block into one or more transform partitions, which may be rectangular, including square, partitions for transform coding. In some implementations, video coding using transform partitioning may include selecting a uniform transform partitioning scheme. For example, a current residual block, such as block 610, may be a 64×64 block and may be transformed without partitioning using a 64×64 transform.

Although not expressly shown in FIG. 6, a residual block may be transform partitioned using a uniform transform partitioning scheme. For example, a 64×64 residual block may be transform partitioned using a uniform transform partitioning scheme including four 32×32 transform blocks, using a uniform transform partitioning scheme including sixteen 16×16 transform blocks, using a uniform transform partitioning scheme including sixty-four 8×8 transform blocks, or using a uniform transform partitioning scheme including 256 4×4 transform blocks.

In some implementations, video coding using transform partitioning may include identifying multiple transform block sizes for a residual block using multiform transform partition coding. In some implementations, multiform transform partition coding may include recursively determining whether to transform a current block using a current block size transform or by partitioning the current block and multiform transform partition coding each partition. For example, the bottom left block 610 shown in FIG. 6 may be a 64×64 residual block, and multiform transform partition coding may include determining whether to code the current 64×64 residual block using a 64×64 transform or to code the 64×64 residual block by partitioning the 64×64 residual block into partitions, such as four 32×32 blocks 620, and multiform transform partition coding each partition. In some implementations, determining whether to transform partition the current block may be based on comparing a cost for encoding the current block using a current block size transform to a sum of costs for encoding each partition using partition size transforms.

Figure 7:
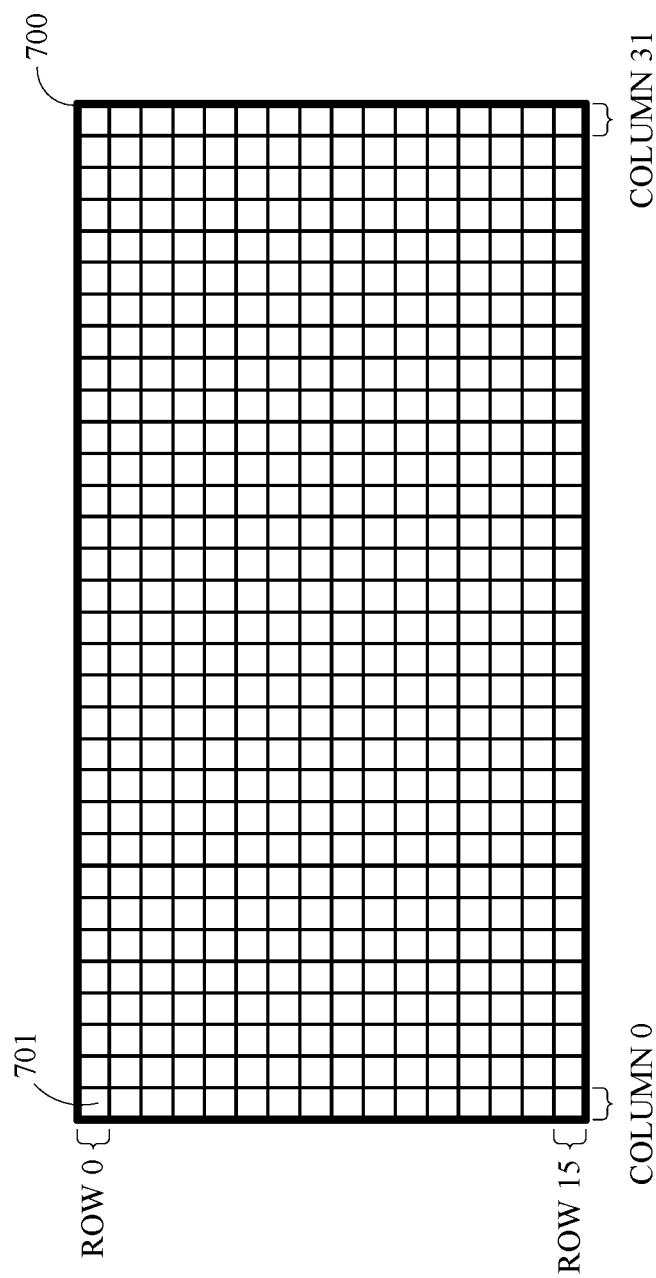
FIG. 7 is a block diagram of a representation of a portion of a frame in accordance with implementations of this disclosure.

FIG. 7 is a block diagram of a representation of a portion 700 of a frame, such as the frame 330 shown in FIG. 3, in accordance with implementations of this disclosure. As shown, the portion 700 of the frame includes 16 rows and 32 columns in a matrix or Cartesian plane. Each element 701 may represent a respective pixel. The pixels may include information representing an image captured in the frame, such as luminance information, color information, and location information. Although FIG. 7 shows 16 rows and 32 columns, any cardinality of rows and any cardinality of columns may be used. The portion 700 may be a frame, a tile, or any other portion of a frame.

Image or video coding may include partitioning a frame, or a portion of a frame, such as the portion 700 shown in FIG. 7, into blocks of pixels. Partitioning a frame, or a portion of a frame, into blocks of pixels may include restricting or controlling the partitioning in accordance with one or more constraints. The constraints may reduce bandwidth, such as storage, memory, or transmission bandwidth, utilization and may reduce accuracy.

A frame, or a portion of a frame, may be partitioned subject to a maximum block size, or superblock, constraint. For example, 64×64 blocks, such as the 64×64 blocks 610 shown in FIG. 6, may be maximum block size blocks. Other maximum block sizes, such as 128×128 may be used. A maximum block size constraint may be expressed as a maximum block dimension constraint, which may define a maximum block height and a maximum block width.

Blocks may be constrained to be aligned, such as along block boundaries of the maximum block size blocks. Blocks may have a minimum block size, such as 2×2 blocks, or 4×4 blocks, such as the 4×4 block 650 shown in FIG. 6. Blocks may be constrained to include multiples of two or four pixels. Blocks may be constrained to be square, such as 32×32 blocks, such as the 32×32 blocks 620 shown in FIG. 6, 16×16 blocks, such as the 16×16 blocks 630 shown in FIG. 6, 8×8 blocks, such as the 8×8 blocks 640 shown in FIG. 6, 4×4 blocks, such as the 4×4 blocks 650 shown in FIG. 6, or 2×2 blocks. Blocks may be constrained to be rectangular, which may include square blocks, and non-square rectangular blocks, such as 32×64 blocks, 64×32 blocks, 16×32 blocks, 32×16 blocks, 8×16 blocks, 16×8 blocks, 4×8 blocks, 8×4 blocks, 2×4 blocks, or 4×2 blocks. In some implementations, a minimum block size of one pixel, a maximum block size corresponding to the frame size, or a both may be used. The set of block sizes may include block sizes in the range from a minimum block size of one pixel to a maximum block size corresponding to the frame, or tile, size. In some implementations, partitioning a frame, or a portion of a frame, may include using a defined set of available block sizes, which may omit using block sizes that differ from the defined set of available block sizes.

A defined set of available block sizes may be a subset of block sizes that omits one or more of the block sizes in the range from a minimum block size of one pixel to a maximum block size corresponding to the frame, or tile, size. In some implementations, block sizes may be defined in the sub-pixel domain, the super-frame domain, or both.

Trellised block partitioning may include partitioning a frame, or a portion of a frame, such as a tile, using a grid or trellis of maximum size blocks aligned in rows and columns (trellising constraint), and may include partitioning the maximum size blocks into sub-blocks (sub-block partitioning), such as shown in FIG. 6. Image or video coding using trellised block partitioning may include encoding, decoding, or both, the blocks in a defined block scan order, such as in raster order. For example, the maximum size blocks may be coded in raster order and the sub-blocks within a respective maximum size block may be coded in raster order or in another order. The sub-blocks of a maximum size block may be coded prior to coding a subsequent, such as adjacent in the defined block order, block.

Image or video coding using floating block-partitioning may be similar to the trellised block partitioning shown in FIG. 6, except as described herein or otherwise clear from context. One or more of the constraints of trellised block partitioning may be relaxed or omitted in floating block-partitioning. For example, floating block-partitioning may omit partitioning using a grid or trellis of maximum size blocks aligned in block-rows and block-columns. In some implementations, floating block-partitioning may include using one or more constraints omitted from trellised block partitioning. In floating block-partitioning the trellising constraint may be omitted and the dimensions of a block may differ from the dimensions of an adjacent block. A maximum block size, other than the frame or tile size, may be expressed as a cardinality of pixels. In some implementations, a maximum block width may be used for blocks unconstrained by a maximum block height. In some implementations, a maximum block height may be used for blocks unconstrained by a maximum block width. Floating block-partitioning may omit using sub-blocks.

For simplicity and clarity, data for a block, other than block dimension data and block location data, such as pixel data, transform coefficients, residual data, motion data, prediction data, transform data, or the like, may be referred to herein as image content for the block. The block dimension data may indicate a height, a width, or both, for a block. For example, the block height may indicate a cardinality of rows of pixels in the block and the block width may indicate a cardinality of columns of pixels in the block. The block location data may express a location of the block in the portion 700. For example, the block location data may express the location of the block using coordinates, such as cartesian coordinates, of a portion of the block, such as the top-left pixel of the block as shown, or a center of the block. For example, the block location data may express the location of block in the portion 700 by indicating a row and column of the portion 700 corresponding to the top-left pixel of the block.

Figure 8:
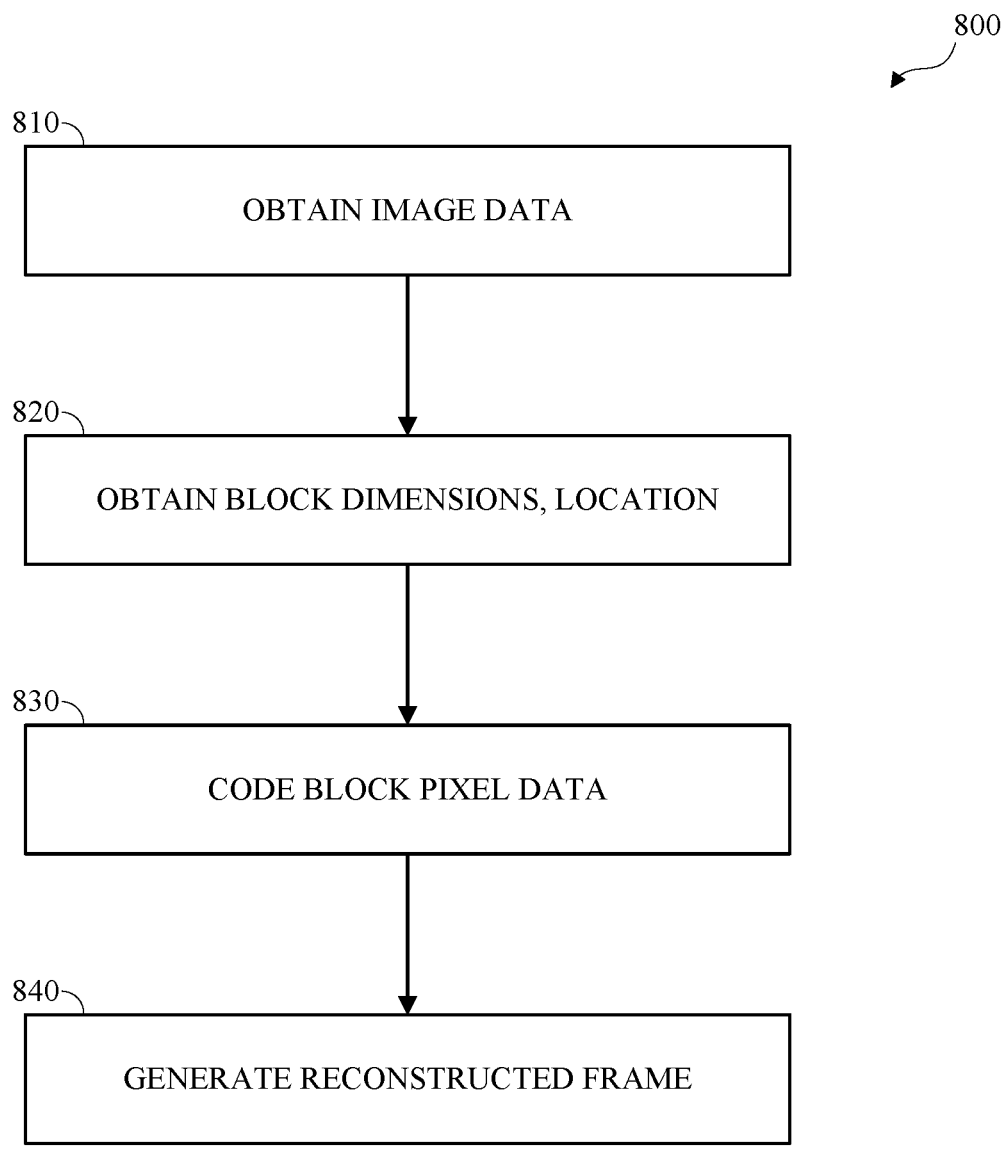
FIG. 8 is a flowchart diagram of an example of coding using lexicographic coding order with floating block-partitioning in accordance with implementations of this disclosure.

FIG. 8 is a flowchart diagram of an example of coding using lexicographic coding order with floating block-partitioning 800 in accordance with implementations of this disclosure. Coding using lexicographic coding order, such as raster-lexicographic coding order or contextual-lexicographic coding order, with floating block-partitioning 800 may be implemented in an encoder, such as the encoder 400 shown in FIG. 4. Coding using lexicographic coding order with floating block-partitioning 800 may be implemented in a decoder, such as the decoder 500 shown in FIG. 5. Although the encoder 400 shown in FIG. 4 and the decoder 500 shown in FIG. 5 are described with respect to video coding, coding using lexicographic coding order with floating block-partitioning 800 may be implemented for still image coding, video coding, or both. Coding using lexicographic coding order with floating block-partitioning 800 may be similar to coding using trellised block partitioning, except as described herein or otherwise clear from context. Contextual-lexicographic coding order may be referred to herein as a lexicographic coding order.

An image (frame), or a portion thereof, such as tile, may include pixels, or pixel locations, which may be expressed or identified by spatial location within the image, or tile, which may be expressed using coordinates, such as cartesian coordinates, such that the image, or tile, may be a totally ordered set, wherein the set of pixel locations, as expressed using cartesian coordinates $\{i,j\}$, are an alphabet, and the order is a lexicographic order, such that $\{i1, j1\}$ is less than or equal to $\{i2, j2\}$ wherein i1 is less than i2 or both i1 is i2 and j1 is less than or equal to j2, and $\{i1, j1\}$ is otherwise greater than $\{i2, j2\}$. Blocks may be referred to by block location, which may correspond with a pixel location in the frame or tile of a top-left pixel, or pixel location, of the block, such that a lexicographic order with respect to blocks may be such that for a first block (B1=$\{y1, x1\}$) and a second block (B2=$\{y2, x2\}$), B1<B2=>(y1<y2) or (y1==y2 and x1<x2).

As shown in FIG. 8, coding using lexicographic coding order with floating block-partitioning 800 includes obtaining image data at 810, obtaining block dimensions and location data at 820, coding block pixel data at 830, and generating a reconstructed frame at 840.

Image data may be obtained at 810. Obtaining the image data at 810 may include obtaining image data for a frame, or a portion of a frame, such as the portion 700 shown in FIG. 7. Encoding using lexicographic coding order with floating block-partitioning may include obtaining an input image at 810. The input image may be an uncompressed input, or source, image or video frame. For example, the encoder may receive, or otherwise access, an input image or input video stream or signal, or a portion thereof, and may identify the input image or a portion of the input video stream as the current input image. Identifying an input image may include receiving one or more input images at a buffer and buffering the input images, or one or more respective image portions. Decoding using lexicographic coding order with floating block-partitioning may include obtaining encoded image data at 810. Obtaining the encoded image data may include receiving a compressed bitstream, such as the compressed bitstream 502 shown in FIG. 5, and reading the encoded image data, or a portion thereof, from the compressed bitstream. For example, the decoder, or the decoding path of the encoder, may decode a header for the portion, such as a frame header or a tile header. In some implementations, the decoder, or the decoding path of the encoder, may decode a block header for a block of the portion.

Block dimensions and location data may be obtained at 820.

Encoding using lexicographic coding order with floating block-partitioning may include determining block dimensions and location data for respective blocks using rate-distortion optimization. Encoding using lexicographic coding order with floating block-partitioning may include the inclusion of data identifying block dimensions for respective blocks in an encoded output bitstream, such as the compressed bitstream 404 shown in FIG. 4. In some implementations, the data identifying the block dimensions for the respective blocks may be included in the encoded output bitstream sequentially in lexicographic coding order, such as in a header for a frame, or a portion of a frame, such as the portion 700 shown in FIG. 7, such as a frame header or a tile header. Pixel data or other block content data, other than the block dimensions and block location data, may be included in the encoded bitstream subsequent to the data identifying the block dimensions, the block location data, or both, as shown at 830. In some implementations, the data identifying the block dimensions for the respective blocks may be interleaved with the block content data. For example, the data identifying the block dimensions for a block may be included in a header for the block. In some implementations, the encoder may include the block location data with the data identifying the block dimensions. In some implementations, the encoder may omit the block location data from the encoded bitstream. In some implementations, encoding using lexicographic coding order with floating block-partitioning may include determining block location data for respective blocks.

Decoding using lexicographic coding order with floating block-partitioning may include decoding block dimensions for respective blocks from an encoded bitstream, such as the compressed bitstream 502 shown in FIG. 5. In some implementations, decoding using lexicographic coding order with floating block-partitioning may include decoding block location data for respective blocks from the encoded bitstream. In some implementations, the encoded bitstream may omit the block location data and decoding using lexicographic coding order with floating block-partitioning may include determining block location data for respective blocks.

Determining block location data for respective blocks may include using available context data, one or more block location constraints, the block dimensions, or a combination thereof. The available context data may indicate previously obtained block location and dimension data (previously identified blocks), which may indicate whether respective pixel locations in the frame, or the portion of the frame, such as the portion 700 shown in FIG. 7, are available for the current block. Pixel locations that are within previously identified blocks for the frame, or the portion of the frame, such as the portion 700 shown in FIG. 7, are unavailable.

The block location constraints may include a column constraint and a row constraint. The intersection of a column identified in accordance with the column constraint and a row identified in accordance with the row constraint may indicate the block location, such as a location of a pixel, such as the top-left pixel or the top-right pixel, of the block.

The row constraint may be a minimum available row constraint indicating that the block location includes the minimum, such as nearest to the top of the frame, or the portion of the frame, such as the portion 700 shown in FIG. 7, row that includes locations, corresponding to pixels or intersections of the row with pixel columns, that are available.

The column constraint may be a minimum available column constraint indicating that the block location includes the minimum, such as nearest to the left of the frame, or the portion of the frame, such as the portion 700 shown in FIG. 7, column that includes locations, corresponding to pixels or intersections of the column with pixel rows, that are available.

The column constraint may be a context constraint, which may be a column constraint indicating a column adjacent to an identified block, for which block location and dimension data is available, such as previously obtained, in a defined direction, such as to the left of the identified block, such as wherein the decoding the block content of the identified block may include using the block content in the column as context.

The block location constraints may be prioritized. For example, the context constraint, may have a higher priority than the row constraint and the minimum available row constraint may have a higher priority than the minimum available column constraint. Other constraints may be used.

For simplicity and clarity, the block location constraints for a block may be expressed as the set "(row constraint, column constraint)". For example, the block location constraint "(min, min)" may indicate the minimum row constraint and the minimum column constraint, which may indicate that the top-left pixel of the block is located at the pixel location in the portion 700 that is in the minimum available row and in the minimum available column within the minimum available row. In another example, a block location constraint "(min, context)" may indicate the context column constraint and the minimum row constraint, which may indicate that the top-right pixel of the block is located at the pixel location in the context column, immediately adjacent to the left of an identified block, and within the minimum available row within the context column.

Image content data for the block may be coded at 830. Encoding using lexicographic coding order with floating block-partitioning may include prediction, such as the prediction shown at 410 in FIG. 4, transformation, such as the transformation shown at 420 in FIG. 4, quantization, such as the quantization shown at 430 in FIG. 4, entropy encoding, such as the entropy encoding shown at 440 in FIG. 4, or a combination thereof. Encoding using lexicographic coding order with floating block-partitioning may include outputting encoded block content data to an encoded bitstream, such as the compressed bitstream 404 shown in FIG. 4. The encoder may encode a current block from the frame, or the portion of the frame, such as the portion 700 shown in FIG. 7, subsequent to encoding and reconstructing context blocks from the frame, or the portion of the frame, such as the portion 700 shown in FIG. 7, for the current block. Encoding using lexicographic coding order with floating block-partitioning may include decoding an encoded block and generating a corresponding reconstructed block, as shown at 450-480 in FIG. 7, for use as context for encoding other blocks from the frame, or the portion of the frame, such as the portion 700 shown in FIG. 7.

Decoding using lexicographic coding order with floating block-partitioning may include entropy decoding, such as the entropy decoding shown at 510 in FIG. 5, dequantization, such as the dequantization shown at 520 in FIG. 5, inverse transformation, such as the inverse transformation shown at 530 in FIG. 5, reconstruction, such as the reconstruction 550 shown in FIG. 5, prediction, such as the prediction shown at 540 in FIG. 5, filtering, such as the filtering shown at 560 in FIG. 5, or a combination thereof.

The order of decoding the image content for respective blocks may differ from the lexicographic coding order. For example, the coding order for the image content may include coding the blocks at the corners of the frame or frame portion prior to coding other blocks of the frame or frame portion, or the coding order for the image content may include coding on a per-column basis, or coding order for the image content may include using prediction type information for the respective blocks to determine the coding order. Other coding orders for the image content may be used.

A reconstructed frame, or a portion thereof, such as a reconstructed tile, may be generated at 840. Generating the reconstructed frame, or reconstructed frame portion, may include the inclusion of the decoded, or reconstructed, block content obtained at 730 in the frame in accordance with the block dimensions and the block location data obtained at 720.

Figure 9:
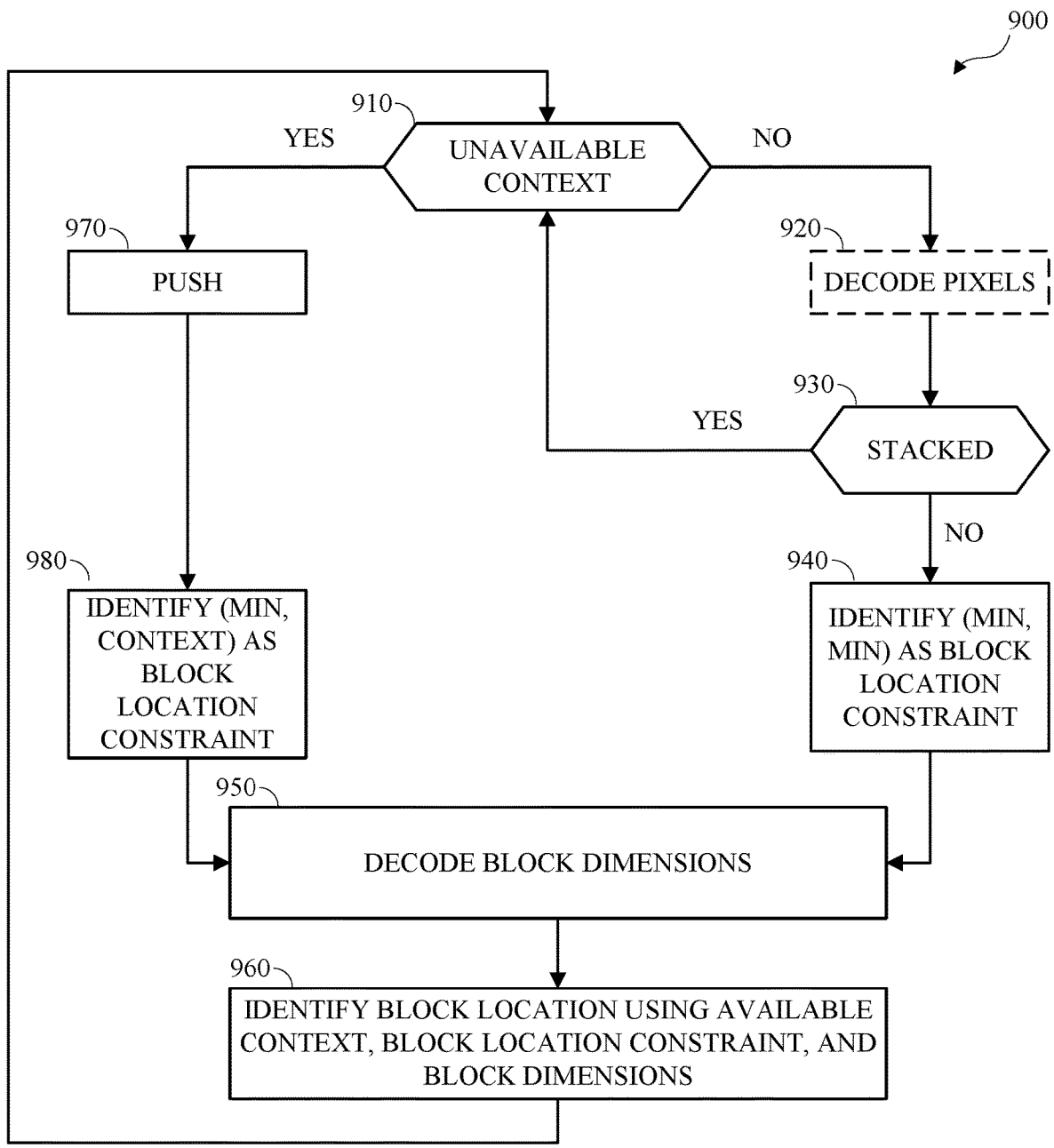
FIG. 9 is a flowchart diagram of an example of coding using contextual-lexicographic coding order with floating block-partitioning in accordance with implementations of this disclosure.

FIG. 9 is a flowchart diagram of an example of coding using contextual-lexicographic coding order with floating block-partitioning 900 in accordance with implementations of this disclosure. Coding using contextual-lexicographic coding order with floating block-partitioning 900 may be implemented in an encoder, such as in the decode path of the encoder 400 shown in FIG. 4, or a decoder, such as the decoder 500 shown in FIG. 5. Although the encoder 400 shown in FIG. 4 and the decoder 500 shown in FIG. 5 are described with respect to video coding, coding using contextual-lexicographic coding order with floating block-partitioning 900 may be implemented for still image coding, video coding, or both.

As shown in FIG. 9, coding using contextual-lexicographic coding order with floating block-partitioning 900 may include determining whether context data is identified as unavailable for decoding a current block at 910, decoding the image content for the current block at 920, determining whether a stack, such as a pending-block-stack, for tracking blocks for which dimensions are available and at least some context is unavailable includes a block at 930, identifying a (min, min) block location constraint at 940, obtaining block dimensions at 950, identifying block location data at 960, pushing the current block on to the stack at 970, identifying a (min, context) block location constraint at 980, or a combination thereof.

Whether context data is identified as unavailable for decoding a current block may be determined at 910. Determining whether context data is identified as unavailable for decoding a current block may be equivalent to determining whether at least some context is unavailable for decoding the image content data for the current block. The context for decoding a block may be spatially oriented in the frame, or frame portion, such as the portion 700 shown in FIG. 7, in a defined direction relative to the block. For example, the context may include image content above the current block in the portion and image content to the left of the current block in the portion. For blocks along the boundaries of the frame, or frame portion, wherein the frame, or frame portion, omits image content corresponding to the context, such as image content above the portion and image content to the left of the portion, determining whether context data is identified as unavailable for decoding the block may include identifying the absence of unavailable context.

For example, the context for coding the current block may be reconstructed image content above the block and to the left of the block. For a block at the top-left corner of the frame, or frame portion, prior to coding the blocks of the frame, or frame portion, the determination may identify the absence of unavailable context. For a block at the bottom-right corner of the frame, or frame portion, prior to coding the blocks of the frame, or frame portion, the determination may identify unavailable context, which may be equivalent to determining that at least some context is unavailable for decoding the image content data for the current block. Prior to coding the dimensions and location data for at least one block from the frame, or frame portion, determining whether context data is identified as unavailable for decoding a current block at 910 may be omitted.

The image content of the current block may be coded at 920. For example, the image content of the current block may be coded at 920 in response to identifying at 910 the absence of unavailable context for coding the image content of the current block. Coding the image content of the current block at 920 is shown with a broken line boarder to indicate that the block coding order for coding the image content of the current block may differ from the contextual-lexicographic coding order for coding the block location described herein. In some implementations, the image content of a block may be coded in response to identifying the absence of unavailable context for coding the image content block, as shown. In some implementations, the image content of a block may be coded subsequent to coding the block location data for the blocks of the image portion. Coding the image content for the current block may be similar to coding the image content for a block shown at 830 in FIG. 8, except as described herein or otherwise clear from context. Prior to coding the dimensions and location data for at least one block from the frame, or frame portion, decoding the image content of the current block at 920 may be omitted.

Whether the stack for tracking blocks for which block dimensions are available and at least some context is unavailable includes a block may be determined at 930. The stack may be an ordered data structure, such as a last-in-first-out array. Prior to coding the dimensions and location data for at least one block from the frame, or frame portion, determining whether the stack includes a block at 930 may be omitted. Determining whether the stack includes a block may include determining whether the stack has a cardinality of zero. The cardinality of the stack may be a count or number of blocks, which may be referred to as stacked blocks, in the stack. A maximum cardinality of the stack may indicate a maximum count or number of blocks that may concurrently be in the stack Coding using contextual-lexicographic coding order with floating block-partitioning 900 may include determining that the stack includes a block at 930. The block from the stack, such as the block most recently added to the stack, which may be referred to as the most recently pushed block, may be identified as the current block, popped or removed from the stack, and contextual-lexicographic coding order with floating block-partitioning 900 may include determining whether the context for coding the image content of the current block is unavailable at 910.

A minimum row and minimum column (min, min) block location constraint may be identified at 940. For example, the minimum row and minimum column (min, min) block location constraint may be identified at 940 in response to determining that the stack omits a block, which may correspond with the stack having a cardinality of zero, at 930 or in response to omitting determining whether the stack includes a block at 930.

Block dimensions for the current block may be obtained at 950. Obtaining the block dimensions at 950 may be similar to obtaining block dimensions as shown at 820 in FIG. 8, except as described herein or otherwise clear from context. For example, encoding the current block may include identifying the block dimensions at 950 based on rate-distortion optimization and including the block dimensions in an encoded output bitstream. In another example, decoding the current block may include decoding the block dimensions from an encoded bitstream.

Block location data for the current block may be identified at 960. Identifying the block location data at 960 may be similar to identifying block location data for a block as shown at 820 in FIG. 8, except as described herein or otherwise clear from context. Subsequent to obtaining the block location data for the current block at 960, coding using contextual-lexicographic coding order with floating block-partitioning 900 may include determining whether context data is identified as unavailable for decoding the current block at 910.

The current block may be pushed on, or added to, the stack at 970. For example, in response to determining that context data is identified as unavailable for decoding the current block at 910, the current block may be pushed on the stack at 970, and a subsequent, previously unidentified, block may be identified as the current block. The stack, including the most recently pushed block added to the stack at 970, may have a cardinality greater than zero (0).

A minimum row and context column (min, context) block location constraint may be identified for the current block at 980. For example, the minimum row and context column (min, context) block location constraint may be identified at 980 in response to pushing a previous block on the stack at 970. Subsequent to identifying the minimum row and context column (min, context) block location constraint for the current block at 980, block dimensions may be coded for the current block at 950 and block location data for the current block may be identified at 960. In some implementations, the block location data and the block dimensions for the current block may be previously identified and obtaining block dimensions for the current block at 950 and block location data for the current block at 960 may be omitted for the current block.

FIGS. 10-17 are a series of block diagrams of raster-lexicographic coding order with floating block-partitioning for a frame, or a portion of a frame, such as the frame portion 700 shown in FIG. 7, in accordance with implementations of this disclosure. FIGS. 18-31 are a series of block diagrams of contextual-lexicographic coding order with floating block-partitioning for a frame, or a portion of a frame, such as the frame portion 700 shown in FIG. 7, in accordance with implementations of this disclosure.

Figure 10:
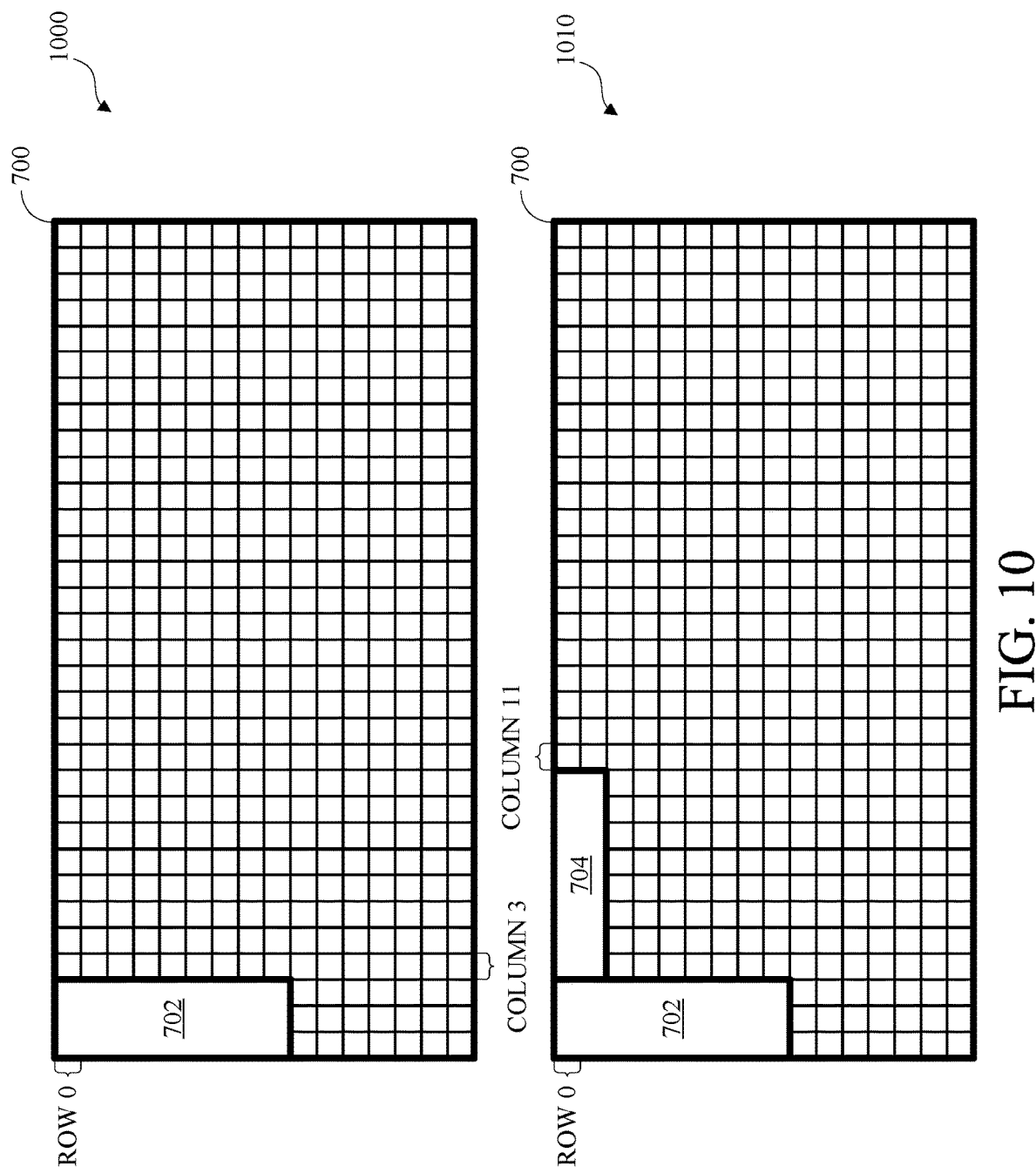
FIGS. 10-17 are a series of block diagrams of raster-lexicographic coding order with floating block-partitioning for a frame, or a portion of a frame, in accordance with implementations of this disclosure.

FIG. 10 is a block diagram of raster-lexicographic coding order with floating block-partitioning, in accordance with implementations of this disclosure. As shown at 1000, raster-lexicographic coding order with floating block-partitioning may include obtaining block dimensions and location data for a first block 702, such as by determining the block dimensions and location data at an encoder or decoding the block dimensions and determining the location data at a decoder. The first block 702 is shown as a 9×3 block. The first block 702 is shown with a solid white background to indicate that the reconstructed image content, such as reconstructed pixel values, for the first block 702 are unavailable. The unavailable image content for the block may be obtained, such as decoded at a decoder or the decoding path of an encoder, subsequent to obtaining the block dimension and location data.

Encoding the portion 700 may include identifying the block location and dimension data for the first block 702 and including the block dimension data for the first block 702 in the output bitstream. The block location data for the first block 702 may be omitted from the output bitstream. In some implementations, the block dimension data and the block location data for the first block 702 may be included in the output bitstream.

In some implementations, decoding the portion 700 may include decoding the block location data, the block dimension data, or both for the first block 702, such as from the encoded bitstream.

In some implementations, the encoded bitstream may omit the block location information for the first block 702 and decoding the portion 700 may include determining the block location. Raster-lexicographic coding order with floating block-partitioning may include using the minimum row constraint and the minimum column constraint, (min, min). As shown in FIG. 7, prior to obtaining the block location and dimension data for the first block, the minimum available row is the top row (row 0) of the portion 700 and the minimum available column within the minimum available row is the left column (column 0) of the portion 700. Decoding the block dimension data for the first block 702 may include decoding a block height of nine pixels and a block width of three pixels.

As shown at 1010, subsequent to obtaining block dimensions and location data for the first block 702 as shown at 1000, raster-lexicographic coding order with floating block-partitioning may include obtaining block dimensions and location data for a second block 704, such as by determining the block dimensions and location data at an encoder or decoding the block dimensions and determining the location data at a decoder. The second block 704 is shown as a 2×8 block. The second block 704 is shown with a solid white background to indicate that the image content, such as pixel values, for the second block 704 are unavailable. The unavailable image content for the block may be obtained, such as decoded at a decoder, subsequent to obtaining the block dimension and location data.

Encoding the portion 700 may include identifying the block location and dimension data for the second block 704 and including the block dimension data for the second block 704 in the output bitstream. The block location data for the second block 704 may be omitted from the output bitstream. In some implementations, the block dimension data and the block location data for the second block 704 may be included in the output bitstream In some implementations, decoding the portion 700 may include decoding the block location data, the block dimension data, or both for the second block 704, such as from the encoded bitstream In some implementations, the encoded bitstream may omit the block location information for the second block 704 and decoding the portion 700 may include determining the block location for the second block 704. Raster-lexicographic coding order with floating block-partitioning may include using the minimum row constraint and the minimum column constraint, (min, min). As shown at 1000 in FIG. 10, prior to obtaining the block location and dimension data for the second block 704, the minimum available row is the top row (row 0) of the portion 700 and the minimum available column within the minimum available row is column 3 of the portion 700. Decoding the block dimension data for the second block 704 may include decoding a block height of two pixels and a block width of eight pixels.

Figure 11:
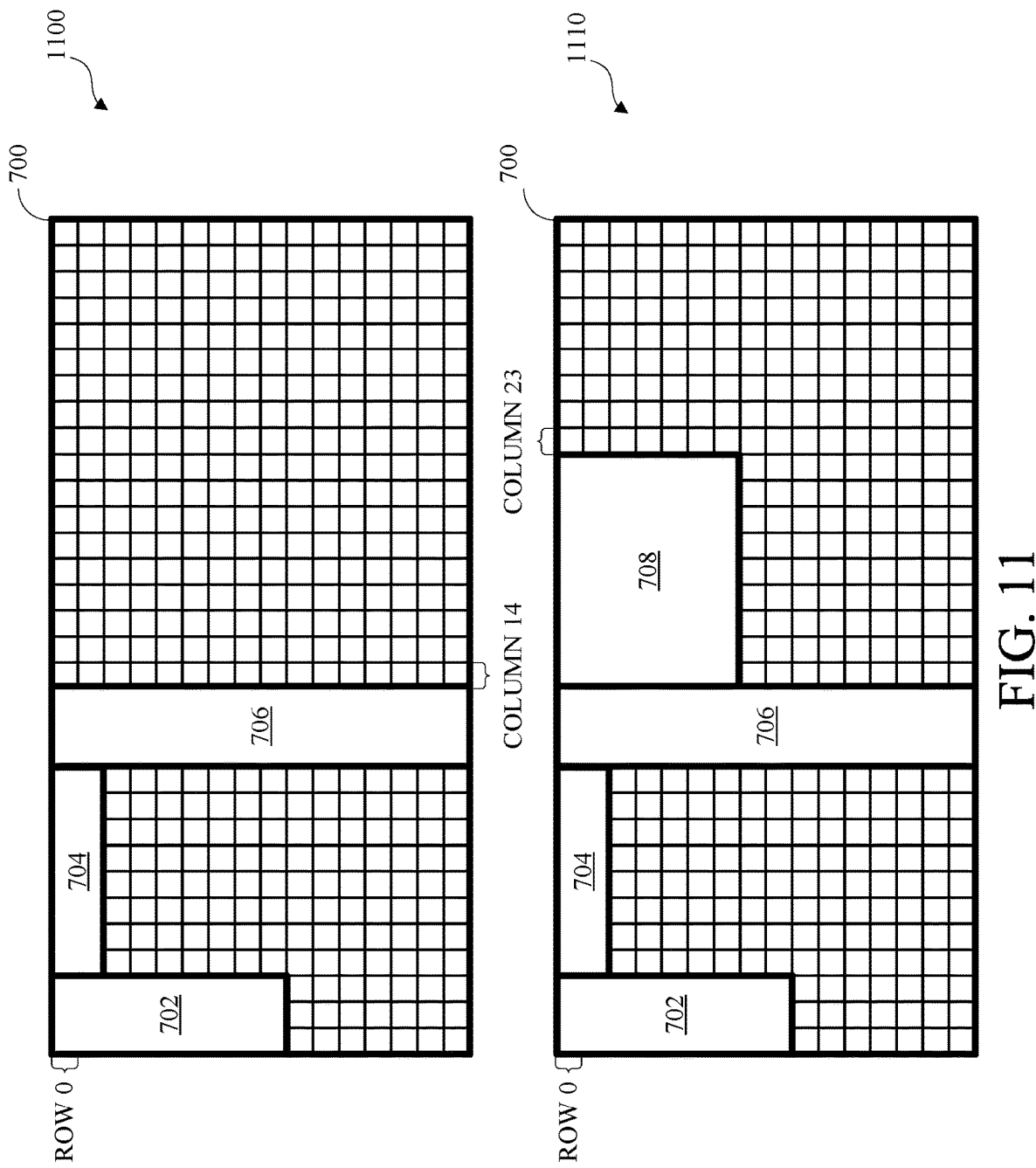

FIG. 11 is a block diagram of raster-lexicographic coding order with floating block-partitioning, in accordance with implementations of this disclosure. As shown at 1100, subsequent to obtaining block dimensions and location data for the second block 704 as shown at 1010 in FIG. 10, raster-lexicographic coding order with floating block-partitioning may include obtaining block dimensions and location data for a third block 706, such as by determining the block dimensions and location data at an encoder or decoding the block dimensions and determining the location data at a decoder. The third block 706 is shown as a 16×3 block. The third block 706 is shown with a solid white background to indicate that the reconstructed image content, such as reconstructed pixel values, for the third block 706 are unavailable. The unavailable image content may be obtained, such as decoded at a decoder or the decoding path of an encoder, subsequent to obtaining the block dimension and location data.

Encoding the portion 700 may include identifying the block location and dimension data for the third block 706 and including the block dimension data for the third block 706 in the output bitstream. The block location data for the third block 706 may be omitted from the output bitstream. In some implementations, the block dimension data and the block location data for the third block 706 may be included in the output bitstream.

In some implementations, decoding the portion 700 may include decoding the block location data, the block dimension data, or both for the third block 706, such as from the encoded bitstream.

In some implementations, the encoded bitstream may omit the block location information for the third block 706 and decoding the portion 700 may include determining the block location for the third block 706. Raster-lexicographic coding order with floating block-partitioning may include using the minimum row constraint and the minimum column constraint, (min, min). As shown at 1010 in FIG. 10, prior to obtaining the block location and dimension data for the third block 706, the minimum available row is the top row (row 0) of the portion 700 and the minimum available column within the minimum available row is the column 11 of the portion 700. Decoding the block dimension data for the third block 706 may include decoding a block height of 16 pixels and a block width of three pixels.

As shown at 1110, subsequent to obtaining block dimensions and location data for the third block 706 as shown at 1100, raster-lexicographic coding order with floating block-partitioning may include obtaining block dimensions and location data for a fourth block 708, such as by determining the block dimensions and location data at an encoder or decoding the block dimensions and determining the location data at a decoder. The fourth block 708 is shown as a 7×9 block. The fourth block 708 is shown with a solid white background to indicate that the reconstructed image content, such as reconstructed pixel values, for the fourth block 708 are unavailable. The unavailable image content may be obtained, such as decoded at a decoder, subsequent to obtaining the block dimension and location data.

Encoding the portion 700 may include identifying the block location and dimension data for the fourth block 708 and including the block dimension data for the fourth block 708 in the output bitstream. The block location data for the fourth block 708 may be omitted from the output bitstream. In some implementations, the block dimension data and the block location data for the fourth block 708 may be included in the output bitstream.

In some implementations, decoding the portion 700 may include decoding the block location data, the block dimension data, or both for the fourth block 708, such as from the encoded bitstream.

In some implementations, the encoded bitstream may omit the block location information for the fourth block 708 and decoding the portion 700 may include determining the block location for the fourth block 708. Raster-lexicographic coding order with floating block-partitioning may include using the minimum row constraint and the minimum column constraint, (min, min). As shown at 1100 in FIG. 11, prior to obtaining the block location and dimension data for the fourth block 708, the minimum available row is the top row (row 0) of the portion 700 and the minimum available column within the minimum available row is column 14 of the portion 700. Decoding the block dimension data for the fourth block 708 may include decoding a block height of seven pixels and a block width of nine pixels.

Figure 12:
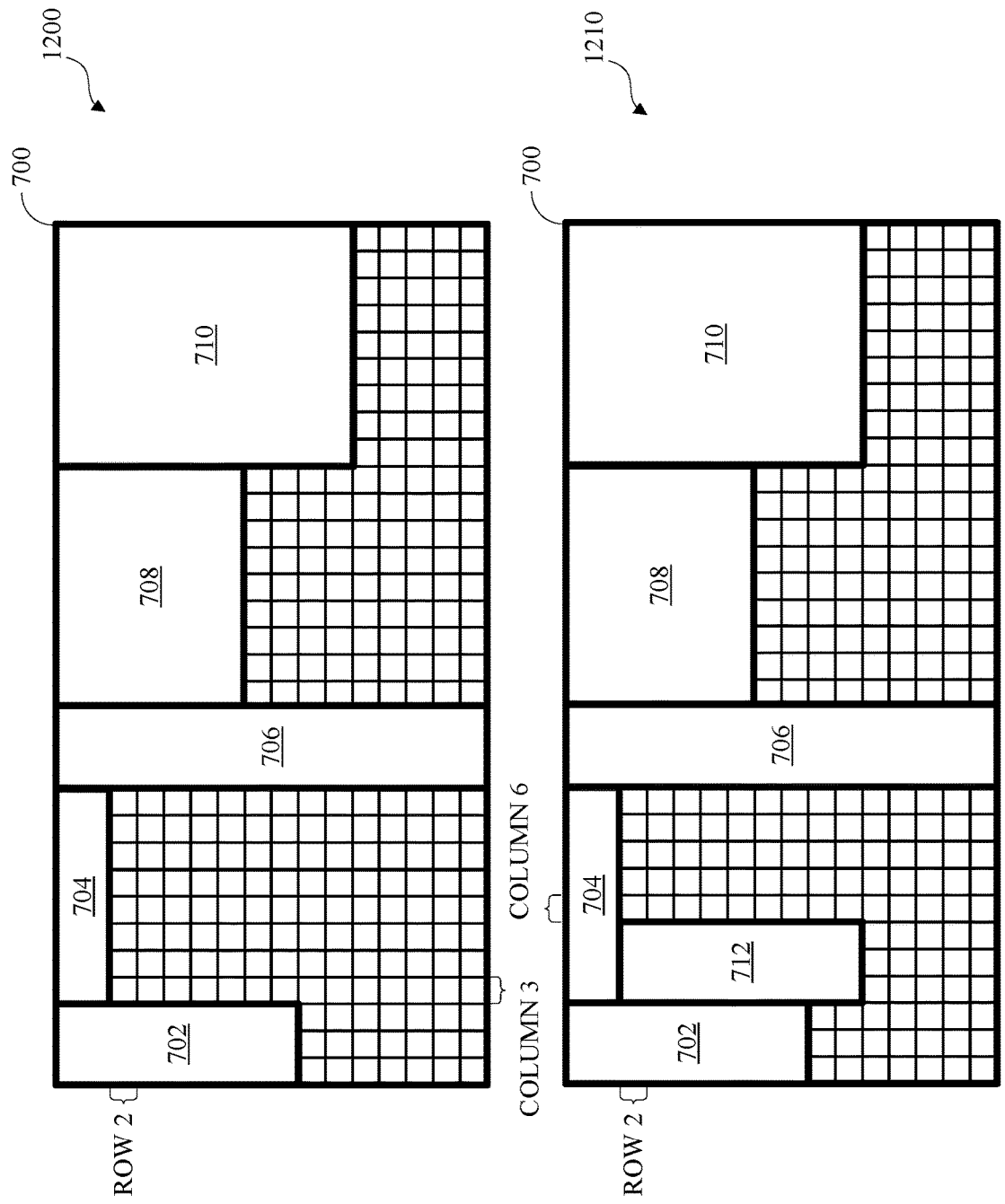

FIG. 12 is a block diagram of raster-lexicographic coding order with floating block-partitioning for the frame portion 700, in accordance with implementations of this disclosure. As shown at 1200, subsequent to obtaining block dimensions and location data for the fourth block 708 as shown at 1110 in FIG. 11, raster-lexicographic coding order with floating block-partitioning may include obtaining block dimensions and location data for a fifth block 710, such as by determining the block dimensions and location data at an encoder or decoding the block dimensions and determining the location data at a decoder. The fifth block 710 is shown as a 11×9 block. The fifth block 710 is shown with a solid white background to indicate that the reconstructed image content, such as reconstructed pixel values, for the fifth block 710 are unavailable. The unavailable image content for the block may be obtained, such as decoded at a decoder or the decoding path of an encoder, subsequent to obtaining the block dimension and location data.

Encoding the portion 700 may include identifying the block location and dimension data for the fifth block 710 and including the block dimension data for the fifth block 710 in the output bitstream. The block location data for the fifth block 710 may be omitted from the output bitstream. In some implementations, the block dimension data and the block location data for the fifth block 710 may be included in the output bitstream.

In some implementations, decoding the portion 700 may include decoding the block location data, the block dimension data, or both for the fifth block 710, such as from the encoded bitstream.

In some implementations, the encoded bitstream may omit the block location information for the fifth block 710 and decoding the portion 700 may include determining the block location for the fifth block 710. Raster-lexicographic coding order with floating block-partitioning may include using the minimum row constraint and the minimum column constraint, (min, min). As shown at 1110 in FIG. 11, prior to obtaining the block location and dimension data for the fifth block 710, the minimum available row is the top row (row 0) of the portion 700 and the minimum available column within the minimum available row is column 23 of the portion 700. Decoding the block dimension data for the fifth block 710 may include decoding a block height of eleven pixels and a block width of nine pixels.

As shown at 1210, subsequent to obtaining block dimensions and location data for the fifth block 710 as shown at 1200, raster-lexicographic coding order with floating block-partitioning may include obtaining block dimensions and location data for a sixth block 712, such as by determining the block dimensions and location data at an encoder or decoding the block dimensions and determining the location data at a decoder. The sixth block 712 is shown as a 9×3 block. The sixth block 712 is shown with a solid white background to indicate that the reconstructed image content, such as pixel values, for the sixth block 712 are unavailable. The unavailable image content for the sixth block 712 may be obtained, such as decoded at a decoder, subsequent to obtaining the block dimension and location data for the sixth block 712.

Encoding the portion 700 may include identifying the block location and dimension data for the sixth block 712 and including the block dimension data for the sixth block 712 in the output bitstream. The block location data for the sixth block 712 may be omitted from the output bitstream. In some implementations, the block dimension data and the block location data for the sixth block 712 may be included in the output bitstream.

In some implementations, decoding the portion 700 may include decoding the block location data, the block dimension data, or both for the sixth block 712, such as from the encoded bitstream.

In some implementations, the encoded bitstream may omit the block location information for the sixth block 712 and decoding the portion 700 may include determining the block location for the sixth block 712. Raster-lexicographic coding order with floating block-partitioning may include using the minimum row constraint and the minimum column constraint, (min, min). As shown at 1200 in FIG. 12, prior to obtaining the block location and dimension data for the sixth block 712, the minimum available row is row 2 of the portion 700 and the minimum available column within the minimum available row is column 3 of the portion 700. Decoding the block dimension data for the sixth block 712 may include decoding a block height of nine pixels and a block width of three pixels.

Figure 13:
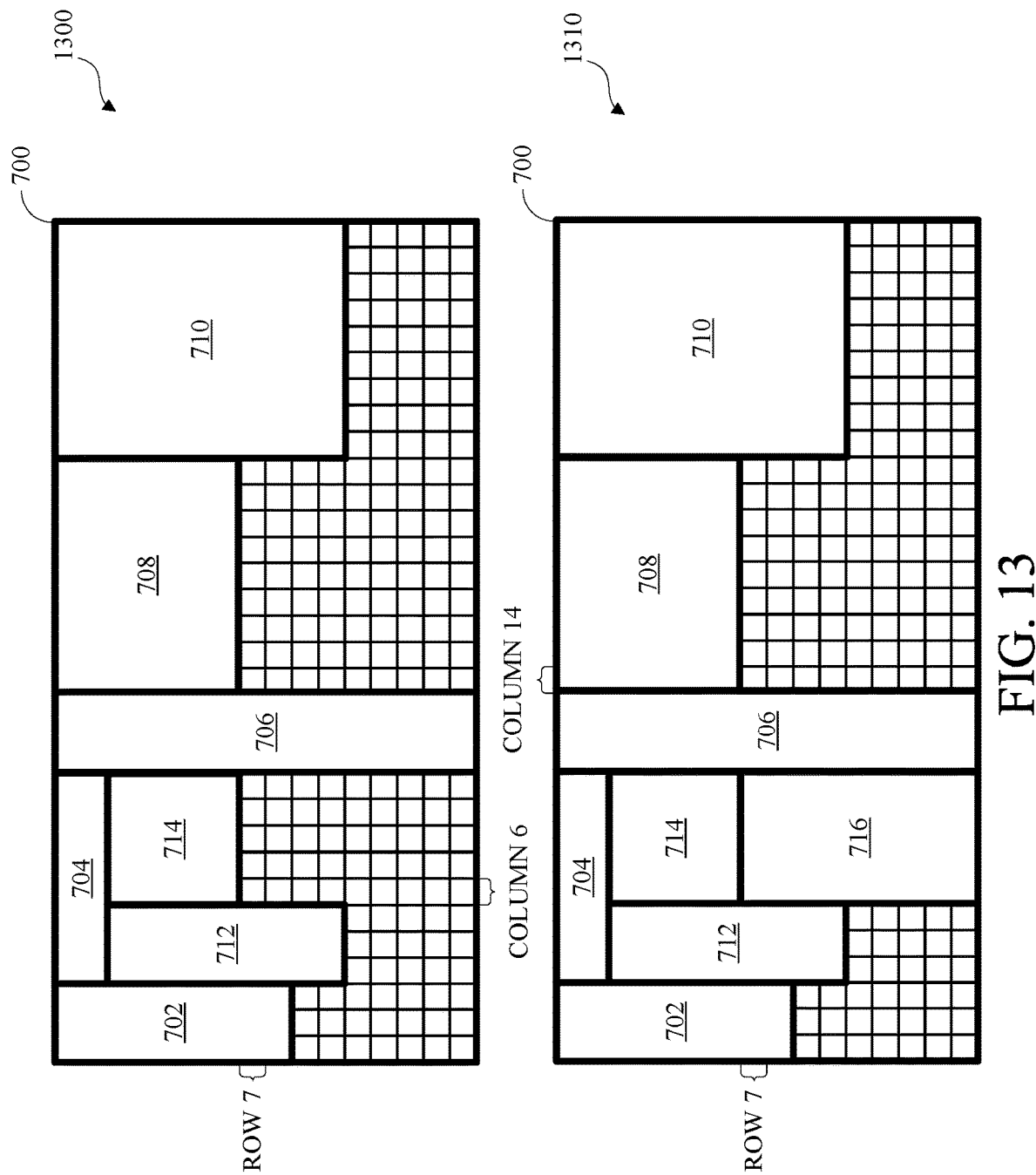

FIG. 13 is a block diagram of raster-lexicographic coding order with floating block-partitioning, in accordance with implementations of this disclosure. As shown at 1300, subsequent to obtaining block dimensions and location data for the sixth block 712 as shown at 1210 in FIG. 12, raster-lexicographic coding order with floating block-partitioning may include obtaining block dimensions and location data for a seventh block 714, such as by determining the block dimensions and location data at an encoder or decoding the block dimensions and determining the location data at a decoder. The seventh block 714 is shown as a 5×5 block. The seventh block 714 is shown with a solid white background to indicate that the content, such as pixel values, for the seventh block 714 are unavailable. The unavailable image content for the block may be obtained, such as decoded at a decoder or the decoding path of an encoder, subsequent to obtaining the block dimension and location data.

Encoding the portion 700 may include identifying the block location and dimension data for the seventh block 714 and including the block dimension data or the block dimension data and the block location data in the output bitstream.

In some implementations, decoding the portion 700 may include decoding the block location data and the block dimension data for the seventh block 714 from the encoded bitstream.

In some implementations, the encoded bitstream may omit the block location information for the seventh block 714 and decoding the portion 700 may include determining the block location for the seventh block 714. Raster-lexicographic coding order with floating block-partitioning may include using the minimum row constraint and the minimum column constraint, (min, min). As shown at 1210 in FIG. 12, prior to obtaining the block location and dimension data for the seventh block 714, the minimum available row is row 2 of the portion 700 and the minimum available column within the minimum available row is column 6 of the portion 700. Decoding the block dimension data for the seventh block 714 may include decoding a block height of five pixels and a block width of five pixels.

As shown at 1310, subsequent to obtaining block dimensions and location data for the seventh block 714 as shown at 1300, raster-lexicographic coding order with floating block-partitioning may include obtaining block dimensions and location data for an eighth block 716, such as by determining the block dimensions and location data at an encoder or decoding the block dimensions and determining the location data at a decoder. The eighth block 716 is shown as a 9×5 block. The eighth block 716 is shown with a solid white background to indicate that the content, such as pixel values, for the eighth block 716 are unavailable. The unavailable image content for the block may be obtained, such as decoded at a decoder, subsequent to obtaining the block dimension and location data.

Encoding the portion 700 may include identifying the block location and dimension data for the eighth block 716 and including the block dimension data or the block dimension data and the block location data for the eighth block 716 in the output bitstream.

In some implementations, decoding the portion 700 may include decoding the block location data and the block dimension data for the eighth block 716 from the encoded bitstream.

In some implementations, the encoded bitstream may omit the block location information for the eighth block 716 and decoding the portion 700 may include determining the block location for the eighth block 716. Raster-lexicographic coding order with floating block-partitioning may include using the minimum row constraint and the minimum column constraint, (min, min). As shown at 1300 in FIG. 13, prior to obtaining the block location and dimension data for the eighth block 716, the minimum available row is row 7 of the portion 700 and the minimum available column within the minimum available row is column 6 of the portion 700. Decoding the block dimension data for the eighth block 716 may include decoding a block height of nine pixels and a block width of five pixels.

Figure 14:
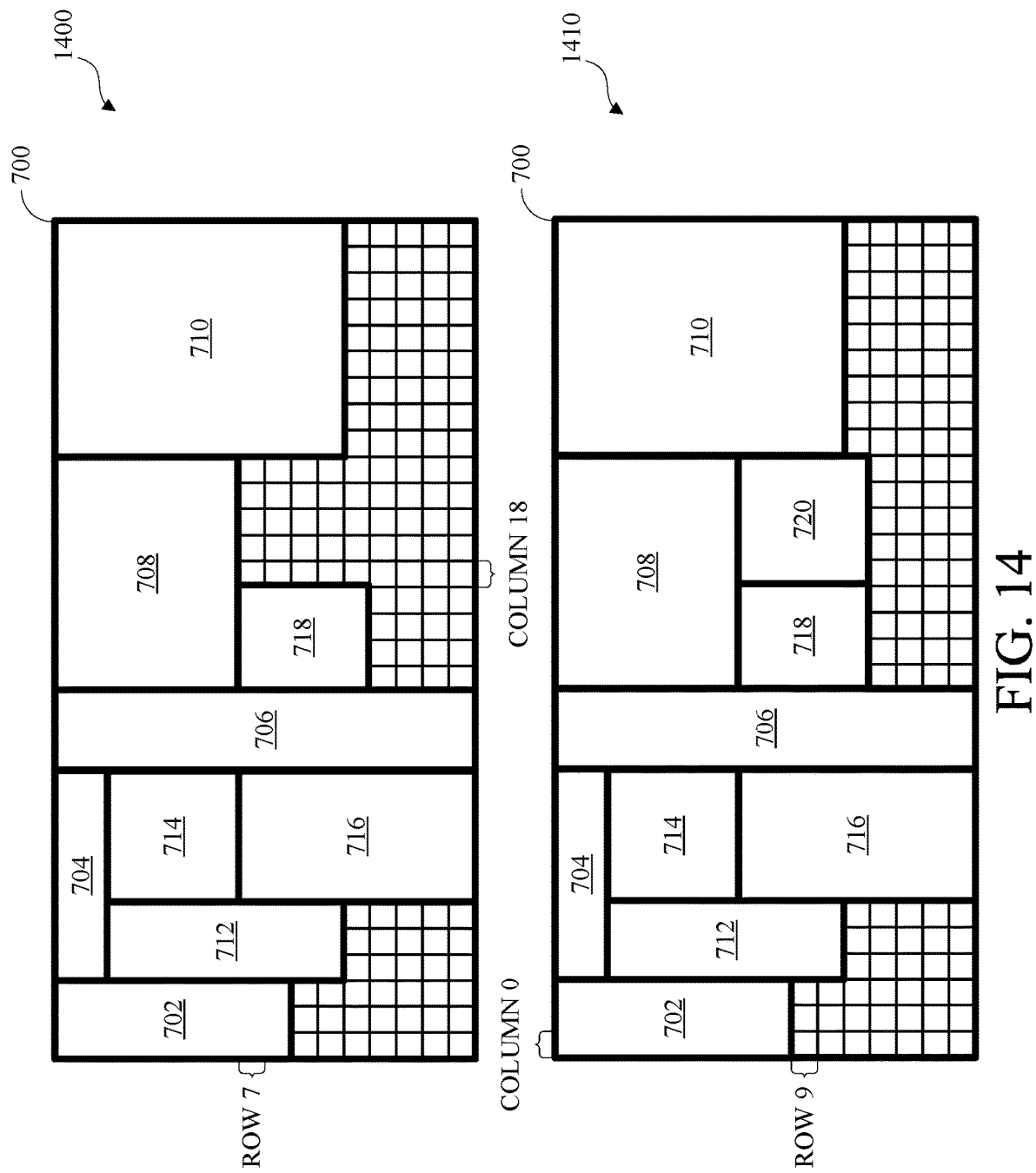

FIG. 14 is a block diagram of raster-lexicographic coding order with floating block-partitioning, in accordance with implementations of this disclosure. As shown at 1400, subsequent to obtaining block dimensions and location data for the eighth block 716 as shown at 1310 in FIG. 13, raster-lexicographic coding order with floating block-partitioning may include obtaining block dimensions and location data for a ninth block 718, such as by determining the block dimensions and location data at an encoder or decoding the block dimensions and determining the location data at a decoder. The ninth block 718 is shown as a 5×4 block. The ninth block 718 is shown with a solid white background to indicate that the reconstructed image content, such as reconstructed pixel values, for the ninth block 718 are unavailable. The unavailable image content may be obtained, such as decoded at a decoder or the decoding path of an encoder, subsequent to obtaining the block dimension and location data.

Encoding the portion 700 may include identifying the block location and dimension data for the ninth block 718 and including the block dimension data or the block dimension data and the block location data in the output bitstream.

In some implementations, decoding the portion 700 may include decoding the block location data and the block dimension data for the ninth block 718 from the encoded bitstream.

In some implementations, the encoded bitstream may omit the block location information for the ninth block 718 and decoding the portion 700 may include determining the block location for the ninth block 718. Raster-lexicographic coding order with floating block-partitioning may include using the minimum row constraint and the minimum column constraint, (min, min). As shown at 1310 in FIG. 13, prior to obtaining the block location and dimension data for the ninth block 718, the minimum available row is row 7 of the portion 700 and the minimum available column within the minimum available row is column 14 of the portion 700. Decoding the block dimension data for the ninth block 718 may include decoding a block height of five pixels and a block width of four pixels.

As shown at 1410, subsequent to obtaining block dimensions and location data for the ninth block 718 as shown at 1400, raster-lexicographic coding order with floating block-partitioning may include obtaining block dimensions and location data for an tenth block 720, such as by determining the block dimensions and location data at an encoder or decoding the block dimensions and determining the location data at a decoder. The tenth block 720 is shown as a 5×5 block. The tenth block 720 is shown with a solid white background to indicate that the content, such as pixel values, for the tenth block 720 are unavailable. The unavailable image content may be obtained, such as decoded at a decoder, subsequent to obtaining the block dimension and location data.

Encoding the portion 700 may include identifying the block location and dimension data for the tenth block 720 and including the block dimension data or the block dimension data and the block location data for the tenth block 720 in the output bitstream.

In some implementations, decoding the portion 700 may include decoding the block location data and the block dimension data for the tenth block 720 from the encoded bitstream.

In some implementations, the encoded bitstream may omit the block location information for the tenth block 720 and decoding the portion 700 may include determining the block location for the tenth block 720. Raster-lexicographic coding order with floating block-partitioning may include using the minimum row constraint and the minimum column constraint, (min, min). As shown at 1400 in FIG. 14, prior to obtaining the block location and dimension data for the tenth block 720, the minimum available row is row 7 of the portion 700 and the minimum available column within the minimum available row is column 18 of the portion 700. Decoding the block dimension data for the tenth block 720 may include decoding a block height of five pixels and a block width of five pixels.

Figure 15:
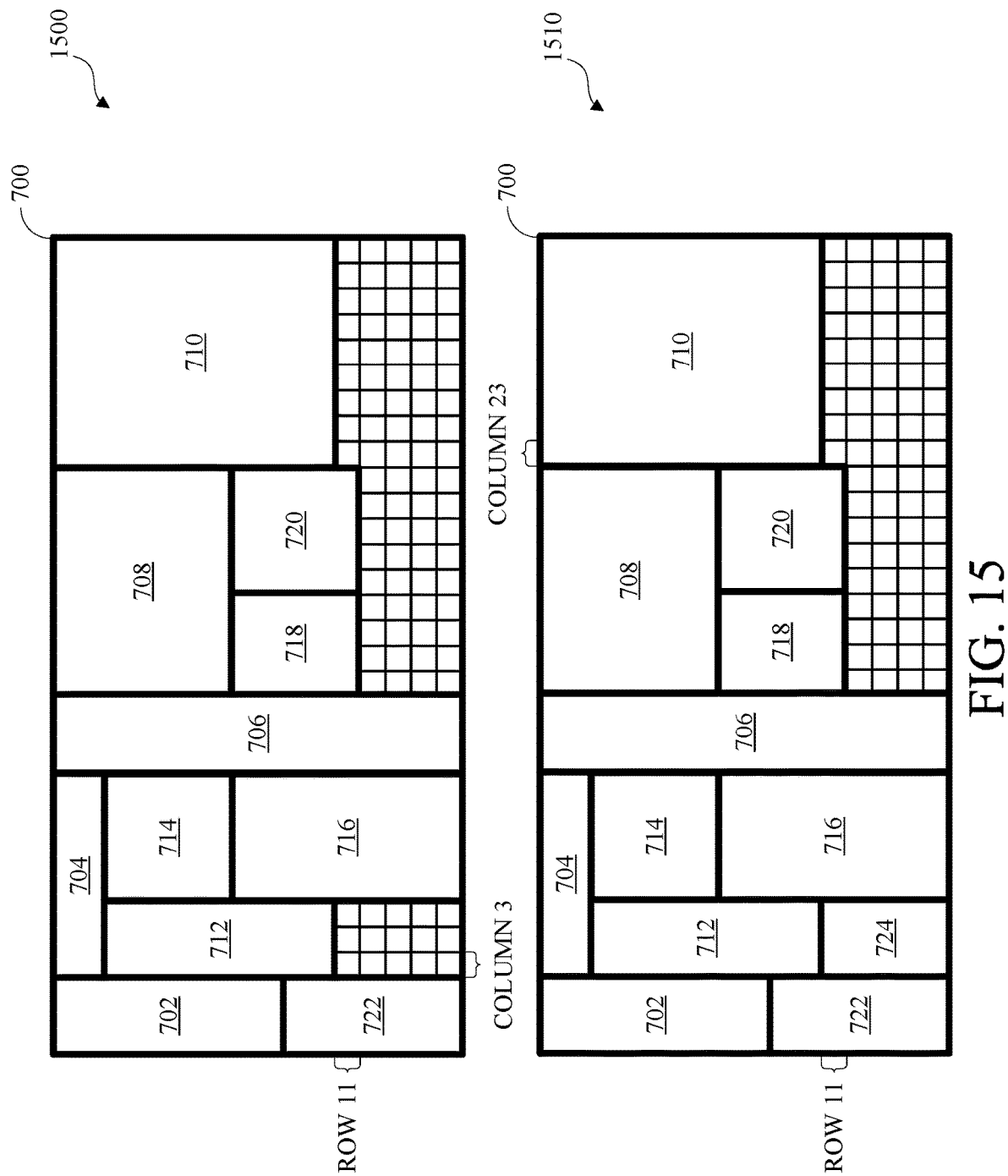

FIG. 15 is a block diagram of raster-lexicographic coding order with floating block-partitioning, in accordance with implementations of this disclosure. As shown at 1500, subsequent to obtaining block dimensions and location data for the tenth block 720 as shown at 1410 in FIG. 14, raster-lexicographic coding order with floating block-partitioning may include obtaining block dimensions and location data for an eleventh block 722, such as by determining the block dimensions and location data at an encoder or decoding the block dimensions and determining the location data at a decoder. The eleventh block 722 is shown as a 7×3 block. The eleventh block 722 is shown with a solid white background to indicate that the reconstructed image content, such as reconstructed pixel values, for the eleventh block 722 are unavailable. The unavailable image content may be obtained, such as decoded at a decoder or the decoding path of an encoder, subsequent to obtaining the block dimension and location data.

Encoding the portion 700 may include identifying the block location and dimension data for the eleventh block 722 and including the block dimension data or the block dimension data and the block location data in the output bitstream.

In some implementations, decoding the portion 700 may include decoding the block location data and the block dimension data for the eleventh block 722 from the encoded bitstream.

In some implementations, the encoded bitstream may omit the block location information for the eleventh block 722 and decoding the portion 700 may include determining the block location for the eleventh block 722. Raster-lexicographic coding order with floating block-partitioning may include using the minimum row constraint and the minimum column constraint, (min, min). As shown at 1410 in FIG. 14, prior to obtaining the block location and dimension data for the eleventh block 722, the minimum available row is row 9 of the portion 700 and the minimum available column within the minimum available row is column 0 of the portion 700. Decoding the block dimension data for the eleventh block 722 may include decoding a block height of seven pixels and a block width of three pixels.

As shown at 1510, subsequent to obtaining block dimensions and location data for the eleventh block 722 as shown at 1500, raster-lexicographic coding order with floating block-partitioning may include obtaining block dimensions and location data for a twelfth block 724, such as by determining the block dimensions and location data at an encoder or decoding the block dimensions and determining the location data at a decoder. The twelfth block 724 is shown as a 5×3 block. The twelfth block 724 is shown with a solid white background to indicate that the content, such as pixel values, for the twelfth block 724 are unavailable. The unavailable image content may be obtained, such as decoded at a decoder, subsequent to obtaining the block dimension and location data.

Encoding the portion 700 may include identifying the block location and dimension data for the twelfth block 724 and including the block dimension data or the block dimension data and the block location data for the twelfth block 724 in the output bitstream.

In some implementations, decoding the portion 700 may include decoding the block location data and the block dimension data for the twelfth block 724 from the encoded bitstream.

In some implementations, the encoded bitstream may omit the block location information for the twelfth block 724 and decoding the portion 700 may include determining the block location for the twelfth block 724. Raster-lexicographic coding order with floating block-partitioning may include using the minimum row constraint and the minimum column constraint, (min, min). As shown at 1500 in FIG. 15, prior to obtaining the block location and dimension data for the twelfth block 724, the minimum available row is row 11 of the portion 700 and the minimum available column within the minimum available row is column 3 of the portion 700. Decoding the block dimension data for the twelfth block 724 may include decoding a block height of five pixels and a block width of three pixels.

Figure 16:
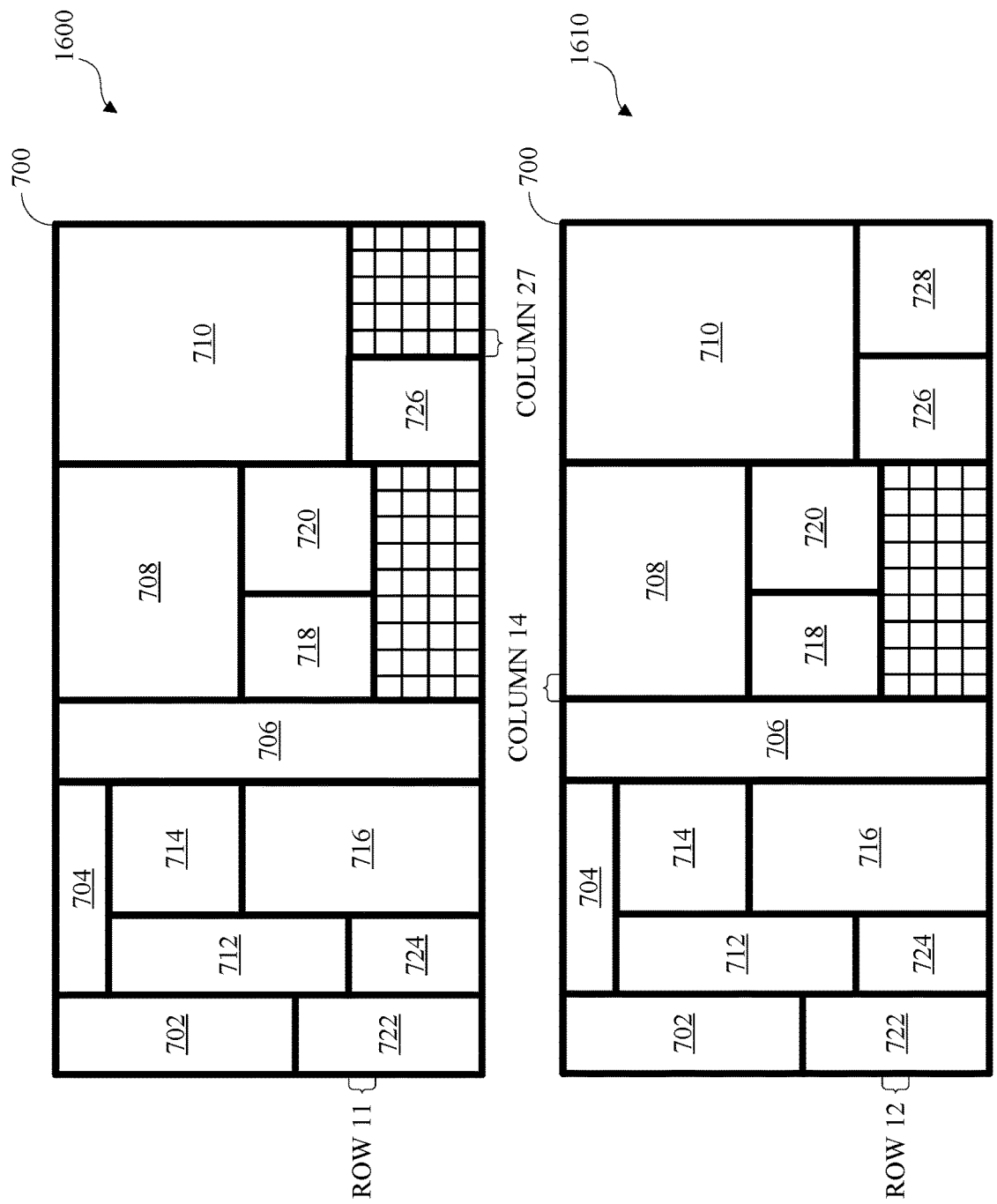

FIG. 16 is a block diagram of raster-lexicographic coding order with floating block-partitioning, in accordance with implementations of this disclosure. As shown at 1600, subsequent to obtaining block dimensions and location data for the twelfth block 724 as shown at 1510 in FIG. 15, raster-lexicographic coding order with floating block-partitioning may include obtaining block dimensions and location data for a thirteenth block 726, such as by determining the block dimensions and location data at an encoder or decoding the block dimensions and determining the location data at a decoder. The thirteenth block 726 is shown as a 5×4 block. The thirteenth block 726 is shown with a solid white background to indicate that the reconstructed image content, such as reconstructed pixel values, for the thirteenth block 726 are unavailable. The unavailable image content may be obtained, such as decoded at a decoder or the decoding path of an encoder, subsequent to obtaining the block dimension and location data.

Encoding the portion 700 may include identifying the block location and dimension data for the thirteenth block 726 and including the block dimension data or the block dimension data and the block location data in the output bitstream.

In some implementations, decoding the portion 700 may include decoding the block location data and the block dimension data for the thirteenth block 726 from the encoded bitstream.

In some implementations, the encoded bitstream may omit the block location information for the thirteenth block 726 and decoding the portion 700 may include determining the block location for the thirteenth block 726. Raster-lexicographic coding order with floating block-partitioning may include using the minimum row constraint and the minimum column constraint, (min, min). As shown at 1510 in FIG. 15, prior to obtaining the block location and dimension data for the thirteenth block 726, the minimum available row is row 11 of the portion 700 and the minimum available column within the minimum available row is column 23 of the portion 700. Decoding the block dimension data for the thirteenth block 726 may include decoding a block height of five pixels and a block width of four pixels.

As shown at 1610, subsequent to obtaining block dimensions and location data for the thirteenth block 726 as shown at 1600, raster-lexicographic coding order with floating block-partitioning may include obtaining block dimensions and location data for a fourteenth block 728, such as by determining the block dimensions and location data at an encoder or decoding the block dimensions and determining the location data at a decoder. The fourteenth block 728 is shown as a 5×5 block. The fourteenth block 728 is shown with a solid white background to indicate that the content, such as pixel values, for the fourteenth block 728 are unavailable. The unavailable image content may be obtained, such as decoded at a decoder, subsequent to obtaining the block dimension and location data.

Encoding the portion 700 may include identifying the block location and dimension data for the fourteenth block 728 and including the block dimension data or the block dimension data and the block location data for the fourteenth block 728 in the output bitstream.

In some implementations, decoding the portion 700 may include decoding the block location data and the block dimension data for the fourteenth block 728 from the encoded bitstream.

In some implementations, the encoded bitstream may omit the block location information for the fourteenth block 728 and decoding the portion 700 may include determining the block location for the fourteenth block 728. Raster-lexicographic coding order with floating block-partitioning may include using the minimum row constraint and the minimum column constraint, (min, min). As shown at 1600 in FIG. 16, prior to obtaining the block location and dimension data for the fourteenth block 728, the minimum available row is row 11 of the portion 700 and the minimum available column within the minimum available row is column 27 of the portion 700. Decoding the block dimension data for the fourteenth block 728 may include decoding a block height of five pixels and a block width of five pixels.

Figure 17:
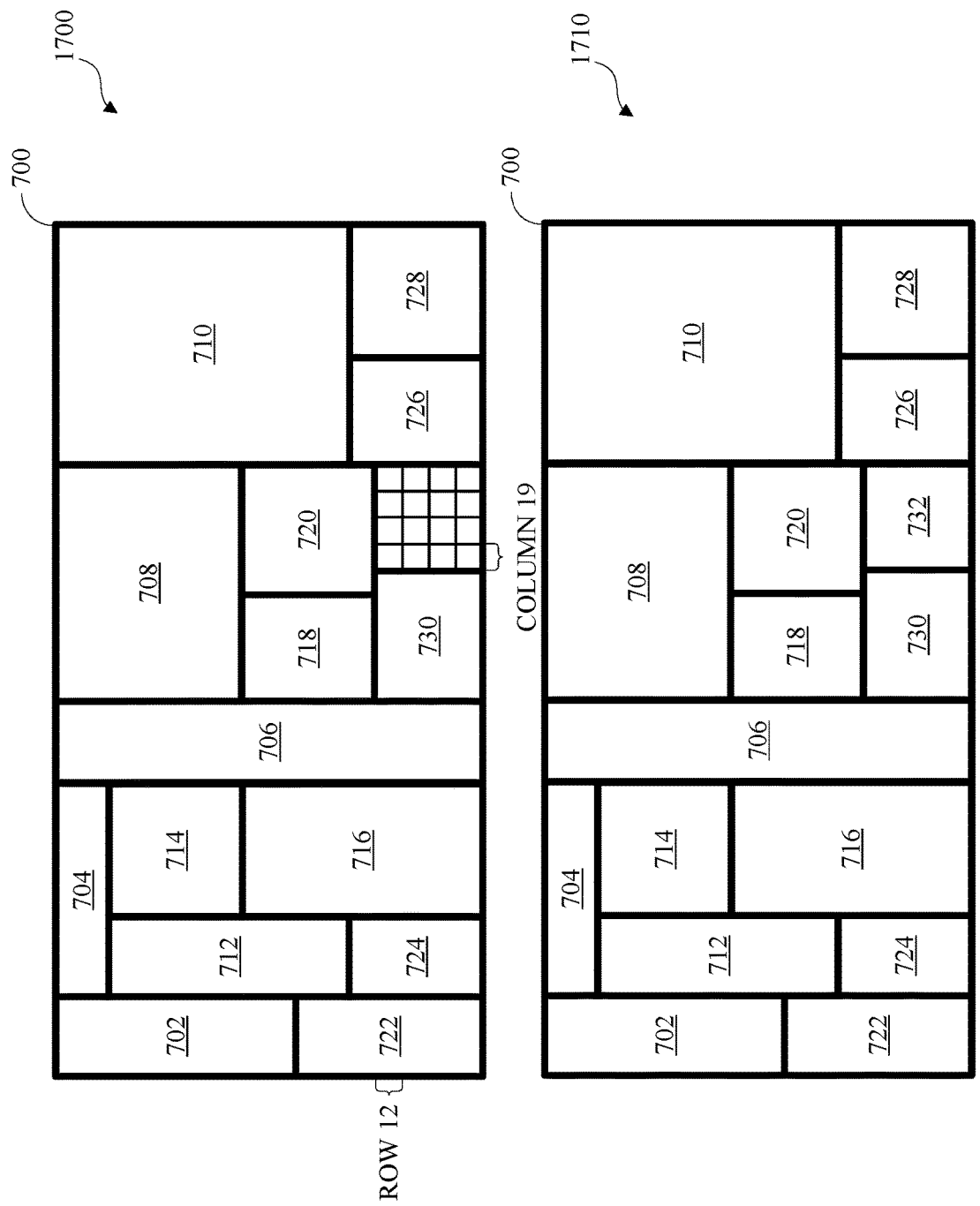

FIG. 17 is a block diagram of raster-lexicographic coding order with floating block-partitioning, in accordance with implementations of this disclosure. As shown at 1700, subsequent to obtaining block dimensions and location data for the fourteenth block 728 as shown at 1610 in FIG. 16, raster-lexicographic coding order with floating block-partitioning may include obtaining block dimensions and location data for a fifteenth block 730, such as by determining the block dimensions and location data at an encoder or decoding the block dimensions and determining the location data at a decoder. The fifteenth block 730 is shown as a 4×5 block. The fifteenth block 730 is shown with a solid white background to indicate that the reconstructed image content, such as reconstructed pixel values, for the fifteenth block 730 are unavailable. The unavailable image content may be obtained, such as decoded at a decoder or the decoding path of an encoder, subsequent to obtaining the block dimension and location data.

Encoding the portion 700 may include identifying the block location and dimension data for the fifteenth block 730 and including the block dimension data or the block dimension data and the block location data in the output bitstream.

In some implementations, decoding the portion 700 may include decoding the block location data and the block dimension data for the fifteenth block 730 from the encoded bitstream.

In some implementations, the encoded bitstream may omit the block location information for the fifteenth block 730 and decoding the portion 700 may include determining the block location for the fifteenth block 730. Raster-lexicographic coding order with floating block-partitioning may include using the minimum row constraint and the minimum column constraint, (min, min). As shown at 1610 in FIG. 16, prior to obtaining the block location and dimension data for the fifteenth block 730, the minimum available row is row 12 of the portion 700 and the minimum available column within the minimum available row is column 14 of the portion 700. Decoding the block dimension data for the fifteenth block 730 may include decoding a block height of four pixels and a block width of five pixels.

As shown at 1710, subsequent to obtaining block dimensions and location data for the fifteenth block 730 as shown at 1700, raster-lexicographic coding order with floating block-partitioning may include obtaining block dimensions and location data for a sixteenth block 732, such as by determining the block dimensions and location data at an encoder or decoding the block dimensions and determining the location data at a decoder. The sixteenth block 732 is shown as a 4×4 block. The sixteenth block 732 is shown with a solid white background to indicate that the content, such as pixel values, for the sixteenth block 732 are unavailable. The unavailable image content may be obtained, such as decoded at a decoder, subsequent to obtaining the block dimension and location data.

Encoding the portion 700 may include identifying the block location and dimension data for the sixteenth block 732 and including the block dimension data or the block dimension data and the block location data for the sixteenth block 732 in the output bitstream.

In some implementations, decoding the portion 700 may include decoding the block location data and the block dimension data for the sixteenth block 732 from the encoded bitstream.

In some implementations, the encoded bitstream may omit the block location information for the sixteenth block 732 and decoding the portion 700 may include determining the block location for the sixteenth block 732. Raster-lexicographic coding order with floating block-partitioning may include using the minimum row constraint and the minimum column constraint, (min, min). As shown at 1700 in FIG. 17, prior to obtaining the block location and dimension data for the sixteenth block 732, the minimum available row is row 12 of the portion 700 and the minimum available column within the minimum available row is column 19 of the portion 700. Decoding the block dimension data for the sixteenth block 732 may include decoding a block height of four pixels and a block width of four pixels.

Figure 18:
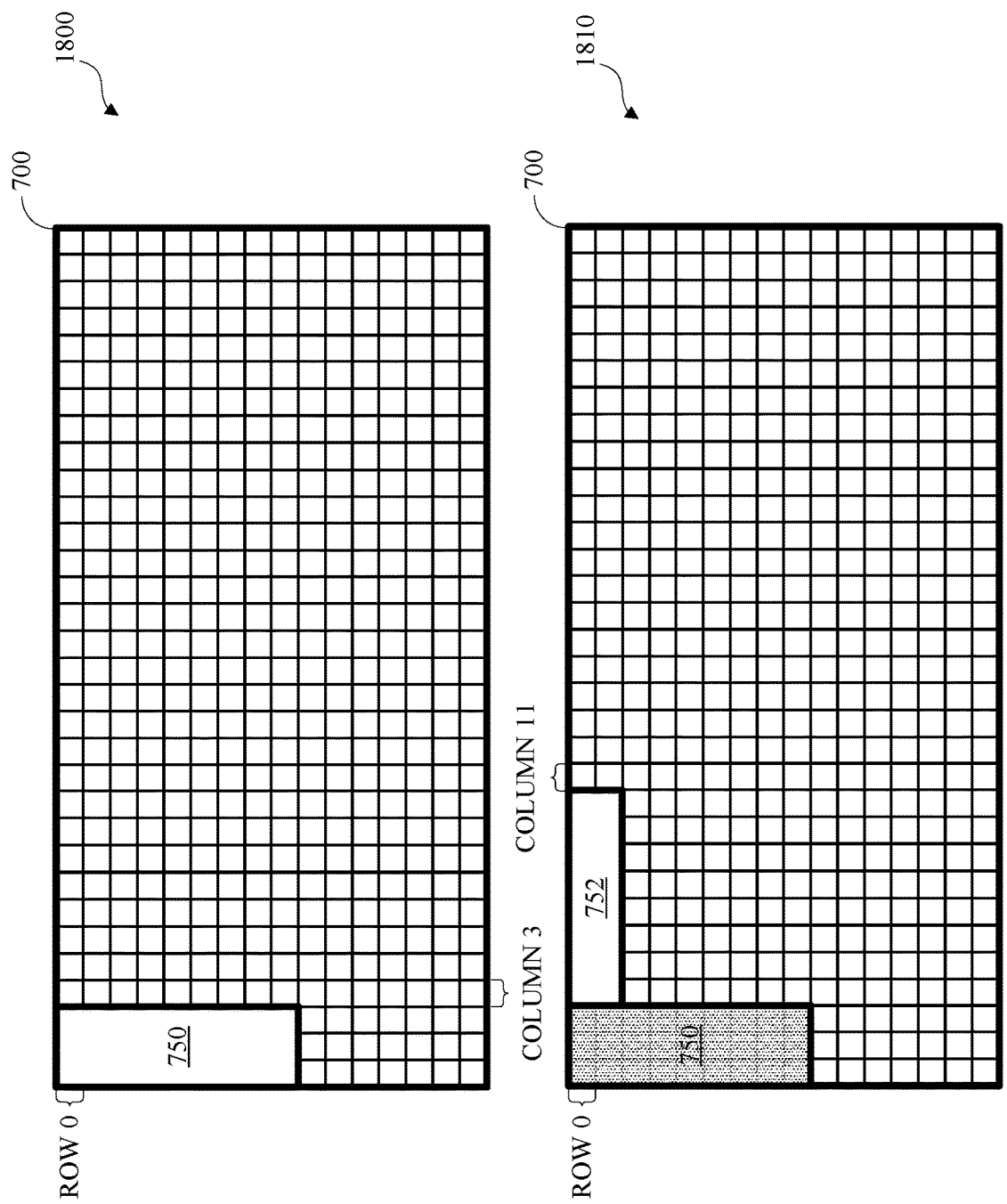
FIGS. 18-31 are a series of block diagrams of contextual-lexicographic coding order with floating block-partitioning for a frame, or a portion of a frame, in accordance with implementations of this disclosure.

FIG. 18 is a block diagram of contextual-lexicographic coding order with floating block-partitioning, in accordance with implementations of this disclosure. As shown at 1800, contextual-lexicographic coding order with floating block-partitioning may include obtaining block dimensions and location data for a first block 750, such as by determining the block dimensions and location data at an encoder or decoding the block dimensions and determining the location data at a decoder. The first block 750 is shown as a 9×3 block. The first block 750 is shown with a solid white background to indicate that the reconstructed image content, such as reconstructed pixel values, for the first block 750 are unavailable. The unavailable reconstructed image content for the first block 750 may be obtained, such as decoded at a decoder or the decoding path of an encoder, subsequent to obtaining the block dimension and location data for the first block 750.

Encoding the portion 700 may include identifying the block location and dimension data for the first block 750 and including the block dimension data for the first block 750 in the output bitstream. The block location data for the first block 750 may be omitted from the output bitstream. In some implementations, the block dimension data and the block location data for the first block 750 may be included in the output bitstream.

In some implementations, decoding the portion 700 may include decoding the block location data, the block dimension data, or both for the first block 750, such as from the encoded bitstream.

In some implementations, the encoded bitstream may omit the block location information for the first block 750 and decoding the portion 700 may include determining the block location for the first block 750. Contextual-lexicographic coding order with floating block-partitioning may include using the minimum row constraint and the minimum column constraint, (min, min), as shown at 940 in FIG. 9. Decoding the block dimension data, such as shown at 950 in FIG. 9, for the first block 750 may include decoding a block height of nine pixels and a block width of three pixels. Identifying the block location may include using available location context, the block location constraints, and the block dimensions, as shown at 960 in FIG. 9. For the first block 750, the available location context may be the boundaries, such as the top and left boundaries, of the portion 700. As shown in FIG. 7, prior to obtaining the block location and dimension data for the first block, the minimum available row is the top row (row 0) of the portion 700 and the minimum available column within the minimum available row is the left column (column 0) of the portion 700.

As shown at 1810, subsequent to obtaining block dimensions and location data for the first block 750 as shown at 1800, contextual-lexicographic coding order with floating block-partitioning may include determining whether the context for decoding the content of the first block 750 is unavailable, as shown at 910 in FIG. 9. The context for decoding the first block 750 may be the boundaries of the portion 700, which may be identified as available. The image content, such as pixel values, for the first block 750 may be decoded and reconstructed, as shown at 920 in FIG. 9. The first block 750 is shown in FIG. 18 with a stippled background to indicate that, subsequent to obtaining block dimensions and location data for the first block 750 as shown at 1800, the reconstructed image content for the first block 750 may be identified as available for coding a subsequently coded block, which may indicate an expectation of availability. The image content for the first block 750 may be decoded subsequent to obtaining block dimensions and location data for the first block 750 as shown at 1800, which may be prior to obtaining block dimensions and location data for the second block 752 as shown at 1810, concurrent with obtaining block dimensions and location data for the second block 752 as shown at 1810, or subsequent to obtaining block dimensions and location data for the second block 752 as shown at 1810. The image content for the first block 750 may be decoded prior to decoding the image content for the second block 752.

As shown at 1810, subsequent to identifying reconstructed image content for the first block 750 as available, contextual-lexicographic coding order with floating block-partitioning may include obtaining block dimensions and location data for a second block 752, such as by determining the block dimensions and location data at an encoder or decoding the block dimensions and determining the location data at a decoder. The second block 752 is shown as a 2×8 block. The second block 752 is shown with a solid white background to indicate that the reconstructed image content, such as reconstructed pixel values, for the second block 752 are unavailable. The unavailable image content may be obtained, such as decoded at a decoder and reconstructed, subsequent to obtaining the block dimension and location data.

Encoding the portion 700 may include identifying the block location and dimension data for the second block 752 and including the block dimension data or the block dimension data and the block location data for the second block 752 in the output bitstream.

In some implementations, decoding the portion 700 may include decoding the block location data and the block dimension data for the second block 752 from the encoded bitstream.

In some implementations, the encoded bitstream may omit the block location information for the second block 752 and decoding the portion 700 may include determining the block location for the second block 752. Contextual-lexicographic coding order with floating block-partitioning may include using the minimum row constraint and the minimum column constraint, (min, min), as shown at 940 in FIG. 9. Decoding the block dimension data, such as shown at 950 in FIG. 9, for the second block 752 may include decoding a block height of two pixels and a block width of eight pixels. Identifying the block location may include using available location context, the block location constraints, and the block dimensions, as shown at 960 in FIG. 9. For the second block 752, the available location context may be the top boundary of the portion 700 and the first block 750. As shown at 1800 in FIG. 18, prior to obtaining the block location and dimension data for the second block 752, the minimum available row is the top row (row 0) of the portion 700 and the minimum available column within the minimum available row is column 3 of the portion 700.

Figure 19:
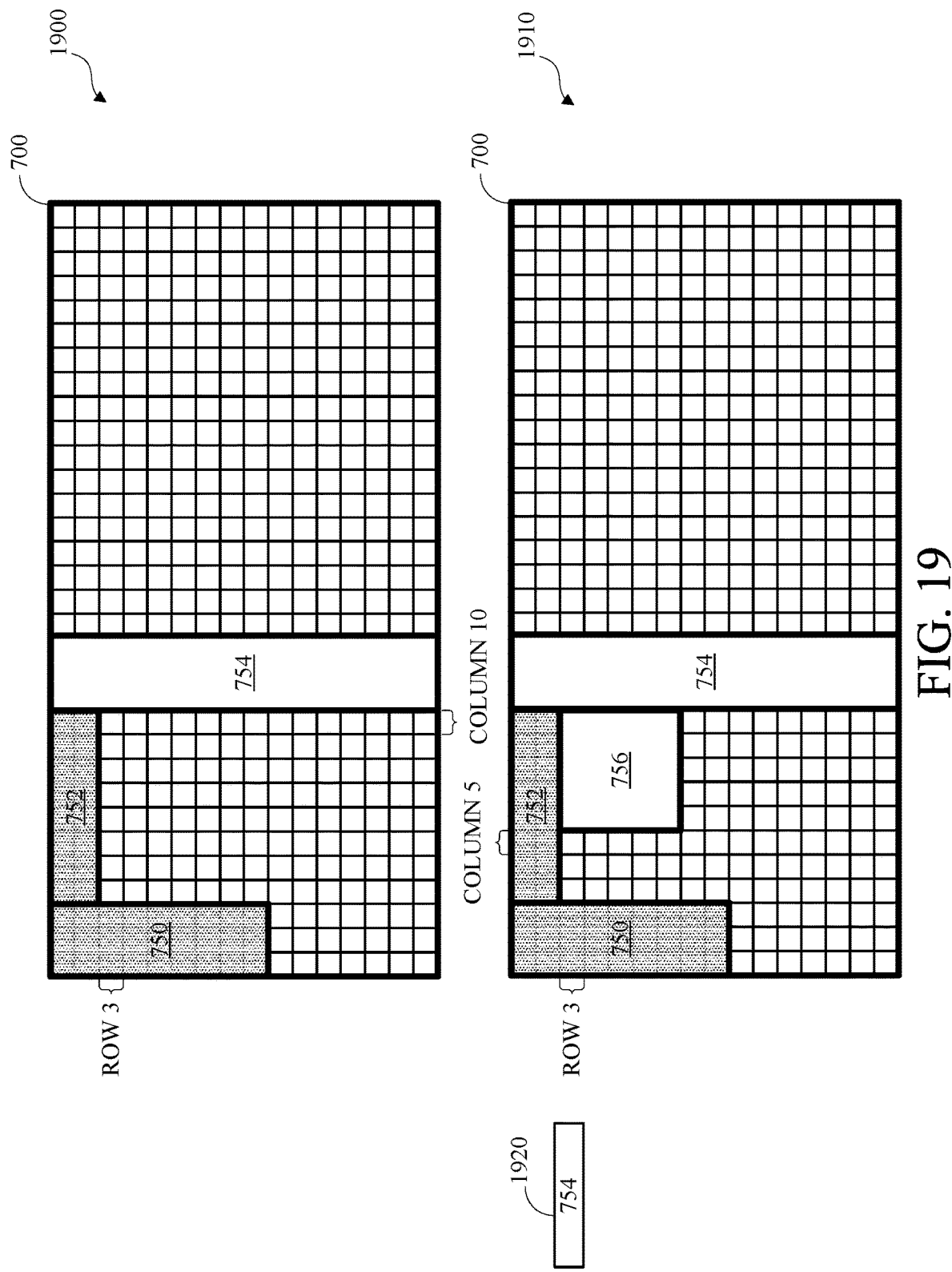

FIG. 19 is a block diagram of contextual-lexicographic coding order with floating block-partitioning, in accordance with implementations of this disclosure.

As shown at 1900, subsequent to obtaining block dimensions and location data for the second block 752 as shown at 1810 in FIG. 18, contextual-lexicographic coding order with floating block-partitioning may include determining whether the context for decoding the content of the second block 752 is unavailable, as shown at 910 in FIG. 9. The context for decoding the second block 752 may include the top boundary of the portion 700, which may be identified as available, and the reconstructed image content of the first block 750, which may be identified as available, which may indicate an expectation of availability. The second block 752 is shown in FIG. 19 with a stippled background to indicate that, subsequent to obtaining block dimensions and location data for the second block 752 as shown at 1810 in FIG. 18, the image content for the second block 752 may be identified as available for coding a subsequently coded block. The image content for the second block 752 may be decoded, as indicated at 920 in FIG. 9, subsequent to obtaining block dimensions and location data for the second block 752, which may be prior to obtaining block dimensions and location data for the third block 754 as shown at 1900, concurrent with obtaining block dimensions and location data for the third block 754, or subsequent to obtaining block dimensions and location data for third block 754. The image content for the second block 752 may be decoded prior to decoding the image content for the third block 754.

As shown at 1900, subsequent to identifying image content for the second block 752 as available, as shown at 1810 in FIG. 18, contextual-lexicographic coding order with floating block-partitioning may include obtaining block dimensions and location data for a third block 754, such as by determining the block dimensions and location data at an encoder or decoding the block dimensions and determining the location data at a decoder. The third block 754 is shown as a 16×3 block. The third block 754 is shown with a solid white background to indicate that the reconstructed image content, such as reconstructed pixel values, for the third block 754 are unavailable. The unavailable image content for the third block 754 may be obtained, such as decoded and reconstructed at a decoder, subsequent to obtaining the block dimension and location data for the third block 754.

Encoding the portion 700 may include identifying the block location and dimension data for the third block 754 and including the block dimension data or the block dimension data and the block location data in the output bitstream.

In some implementations, decoding the portion 700 may include decoding the block location data and the block dimension data for the third block 754 from the encoded bitstream.

In some implementations, the encoded bitstream may omit the block location information for the third block 754 and decoding the portion 700 may include determining the block location for the third block 754. Contextual-lexicographic coding order with floating block-partitioning may include using the minimum row constraint and the minimum column constraint, (min, min), as shown at 940 in FIG. 9. Decoding the block dimension data, such as shown at 950 in FIG. 9, for the third block 754 may include decoding a block height of sixteen pixels and a block width of three pixels. Identifying the block location may include using available location context, the block location constraints, and the block dimensions, as shown at 960 in FIG. 9. For the third block 754, the available location context may be the top boundary of the portion 700 and the second block 752. As shown at 1810 in FIG. 18, prior to obtaining the block location and dimension data for the third block 754, the minimum available row is the top row (row 0) of the portion 700 and the minimum available column within the minimum available row is column 11 of the portion 700.

As shown at 1910, subsequent to obtaining block dimensions and location data for the third block 754 as shown at 1900, contextual-lexicographic coding order with floating block-partitioning may include determining whether the context for decoding the image content of the third block 754 is unavailable, as shown at 910 in FIG. 9. The context for decoding the third block 754 may include the top boundary of the portion 700, which may be identified as available. The context for decoding the third block 754 may include the reconstructed image content of the second block 752, which may be identified as available, which may indicate an expectation of availability. The context for decoding the third block 754 may include unavailable context adjacent to the third block 754 in a defined direction, such as to the left of the third block 754. In response to determining that at least some context for decoding the third block 754 is unavailable, an indicator or identifier for the third block 754 may be pushed or added to a stack 1920 (pending-block-stack), or other last-in-first-out ordered data structure, for tracking blocks for which dimensions are available and at least some context is unavailable, as shown at 970 in FIG. 9. Other data structures, or combinations thereof, may be used for tracking blocks for which dimensions are available and at least some context is unavailable. Prior to pushing the third block 954 on the stack 1920 as shown at 970 in FIG. 9, the stack 1920 may have a cardinality of zero. Subsequent to pushing the third block 954 on the stack 1920 as shown at 970 in FIG. 9, the stack 1920 may have a cardinality greater than zero, such as one.

As shown at 1910, subsequent to pushing the third block 954 on the stack 1920 as shown at 970 in FIG. 9, contextual-lexicographic coding order with floating block-partitioning may include obtaining block dimensions and location data for a fourth block 756, such as by determining the block dimensions and location data at an encoder or decoding the block dimensions and determining the location data at a decoder. The fourth block 756 is shown as a 5×5 block. The fourth block 756 is shown with a solid white background to indicate that the reconstructed image content, such as reconstructed pixel values, for the fourth block 756 are unavailable. The unavailable image content for the fourth block 756 may be obtained, such as decoded and reconstructed at a decoder, subsequent to obtaining the block dimension and location data for the fourth block 756 and subsequent to obtaining the image content of the context for decoding the fourth block 756.

Encoding the portion 700 may include identifying the block location and dimension data for the fourth block 756 and including the block dimension data or the block dimension data and the block location data for the fourth block 756 in the output bitstream.

In some implementations, decoding the portion 700 may include decoding the block location data and the block dimension data for the fourth block 756 from the encoded bitstream.

In some implementations, the encoded bitstream may omit the block location information for the fourth block 756 and decoding the portion 700 may include determining the block location for the fourth block 756. Contextual-lexicographic coding order with floating block-partitioning may include using the minimum row constraint and the context column constraint, (min, context), as shown at 980 in FIG. 9. Decoding the block dimension data, such as shown at 950 in FIG. 9, for the fourth block 756 may include decoding a block height of five pixels and a block width of five pixels. Identifying the block location may include using available location context, the block location constraints, and the block dimensions, as shown at 960 in FIG. 9. For the fourth block 756, the available location context may be the second block 752 and the third block 754. As shown at 1900 in FIG. 19, prior to obtaining the block location and dimension data for the fourth block 756, the minimum available row is row 3, corresponding to one row greater than the maximum row of the second block 752, of the portion 700 and the maximum available column within the minimum available row is column 10 of the portion 700, corresponding to one column less than the minimum column of the third block 754.

Figure 20:
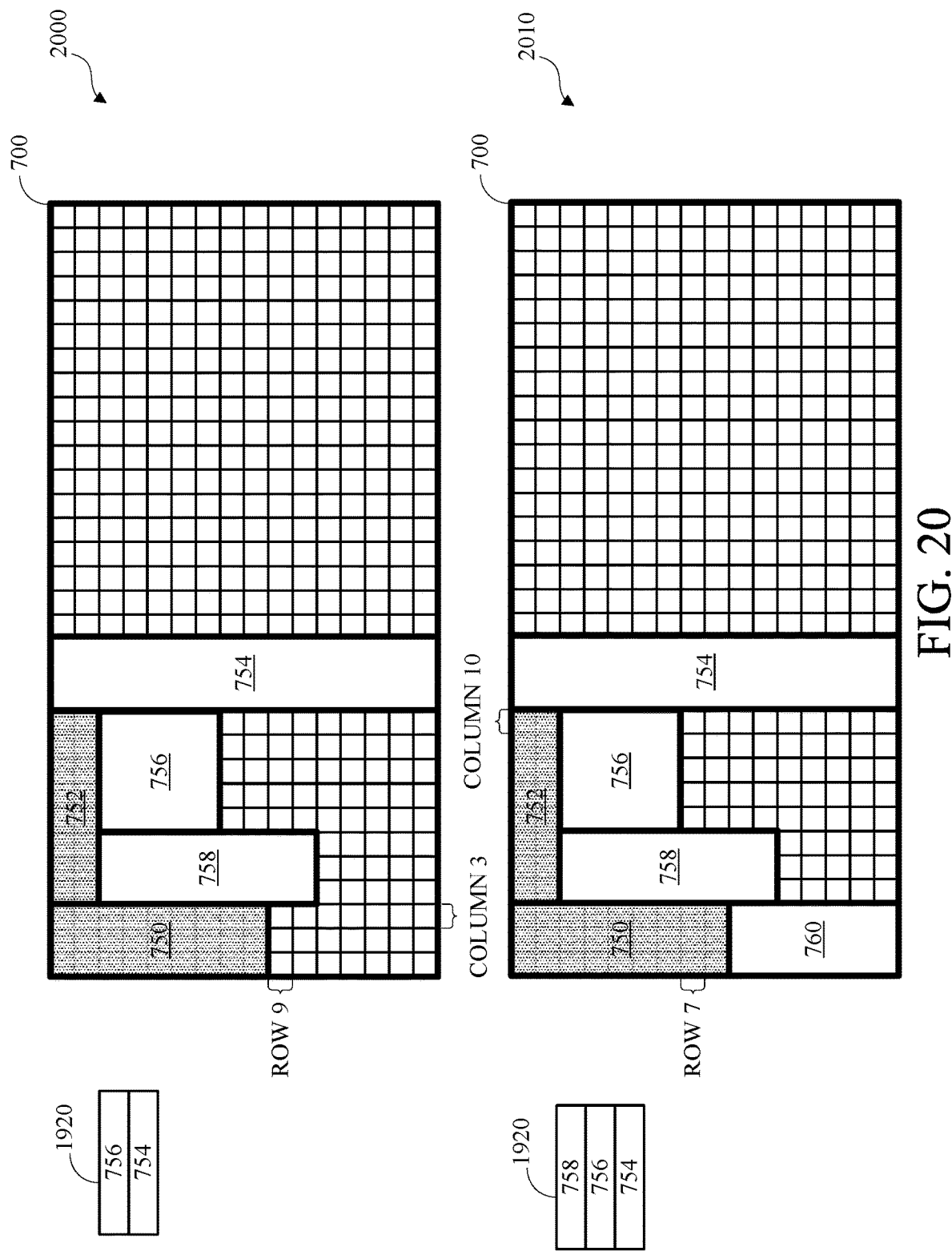

FIG. 20 is a block diagram of contextual-lexicographic coding order with floating block-partitioning, in accordance with implementations of this disclosure.

As shown at 2000, subsequent to obtaining block dimensions and location data for the fourth block 756 as shown at 1910 in FIG. 19, contextual-lexicographic coding order with floating block-partitioning may include determining whether the context for decoding the image content of the fourth block 756 is unavailable, as shown at 910 in FIG. 9. The context for decoding the fourth block 756 may include the reconstructed image content of the second block 752, which may be identified as available. The context for decoding the fourth block 756 may include unavailable context adjacent to the fourth block 756 in a defined direction, such as to the left of the fourth block 756. The fourth block 756 is shown with a solid white background to indicate that the reconstructed image content, such as reconstructed pixel values, for the fourth block 756 are unavailable. In response to determining that at least some context for decoding the fourth block 756 is unavailable, an indicator or identifier for the fourth block 756 may be pushed or added to the stack 1920, as shown at 970 in FIG. 9. Subsequent to pushing the fourth block 756 on the stack 1920 as shown at 970 in FIG. 9, the stack 1920 may have a cardinality greater than zero, such as two.

As shown at 2000, subsequent to pushing the fourth block 756 on the stack 1920 as shown at 970 in FIG. 9, contextual-lexicographic coding order with floating block-partitioning may include obtaining block dimensions and location data for a fifth block 758, such as by determining the block dimensions and location data at an encoder or decoding the block dimensions and determining the location data at a decoder. The fifth block 758 is shown as a 9×3 block. The fifth block 758 is shown with a solid white background to indicate that the reconstructed image content, such as reconstructed pixel values, for the fifth block 758 are unavailable. Unavailable image content for the fifth block 758 may be obtained, such as decoded and reconstructed at a decoder, subsequent to obtaining the block dimension and location data for the fifth block 758 and subsequent to obtaining the image content of the context for decoding the fifth block 758.

Encoding the portion 700 may include identifying the block location and dimension data for the fifth block 758 and including the block dimension data or the block dimension data and the block location data in the output bitstream.

In some implementations, decoding the portion 700 may include decoding the block location data and the block dimension data for the fifth block 758 from the encoded bitstream.

In some implementations, the encoded bitstream may omit the block location information for the fifth block 758 and decoding the portion 700 may include determining the block location for the fifth block 758. Contextual-lexicographic coding order with floating block-partitioning may include using the minimum row constraint and the context column constraint, (min, context), as shown at 980 in FIG. 9. Decoding the block dimension data, such as shown at 950 in FIG. 9, for the fifth block 758 may include decoding a block height of nine pixels and a block width of three pixels. Identifying the block location may include using available location context, the block location constraints, and the block dimensions, as shown at 960 in FIG. 9. For the fifth block 758, the available location context may be the second block 752 and the fourth block 756. As shown at 1910 in FIG. 19, prior to obtaining the block location and dimension data for the fifth block 758, the minimum available row is row three of the portion 700, corresponding to one row greater than the maximum row of the second block 752, and the maximum available column within the minimum available row is column five of the portion 700, corresponding to one column less than the minimum column of the fourth block 756.

As shown at 2010, subsequent to obtaining block dimensions and location data for the fifth block 758 as shown at 2000, contextual-lexicographic coding order with floating block-partitioning may include determining whether the context for decoding the image content of the fifth block 758 is unavailable, as shown at 910 in FIG. 9. The context for decoding the fifth block 758 may include the reconstructed image content of the first block 750, which may be identified as available. The context for decoding the fifth block 758 may include the reconstructed image content of the second block 752, which may be identified as available. The context for decoding the fifth block 758 may include unavailable context adjacent to the fifth block 758 in a defined direction, such as to the left of the fifth block 758. In response to determining that at least some context for decoding the fifth block 758 is unavailable, an indicator or identifier for the fifth block 758 may be pushed or added to the stack 1920, as shown at 970 in FIG. 9. Subsequent to pushing the fifth block 758 on the stack 1920 as shown at 970 in FIG. 9, the stack 1920 may have a cardinality greater than zero, such as three.

As shown at 2010, subsequent to pushing the fifth block 758 on the stack 1920 as shown at 970 in FIG. 9, contextual-lexicographic coding order with floating block-partitioning may include obtaining block dimensions and location data for a sixth block 760, such as by determining the block dimensions and location data at an encoder or decoding the block dimensions and determining the location data at a decoder. The sixth block 760 is shown as a 7×3 block. The sixth block 760 is shown with a solid white background to indicate that the reconstructed image content, such as reconstructed pixel values, for the sixth block 760 are unavailable. The unavailable image content for the sixth block 760 may be obtained, such as decoded and reconstructed at a decoder, subsequent to obtaining the block dimension and location data for the sixth block 760 and subsequent to obtaining the image content of the context for decoding the sixth block 760.

Encoding the portion 700 may include identifying the block location and dimension data for the sixth block 760 and including the block dimension data or the block dimension data and the block location data for the sixth block 760 in the output bitstream.

In some implementations, decoding the portion 700 may include decoding the block location data and the block dimension data for the sixth block 760 from the encoded bitstream.

In some implementations, the encoded bitstream may omit the block location information for the sixth block 760 and decoding the portion 700 may include determining the block location for the sixth block 760. Contextual-lexicographic coding order with floating block-partitioning may include using the minimum row constraint and the context column constraint, (min, context), as shown at 980 in FIG. 9. Decoding the block dimension data, such as shown at 950 in FIG. 9, for the sixth block 760 may include decoding a block height of seven pixels and a block width of three pixels. Identifying the block location may include using available location context, the block location constraints, and the block dimensions, as shown at 960 in FIG. 9. For the sixth block 760, the available location context may be the first block 750 and the fifth block 758. As shown at 2000 in FIG. 20, prior to obtaining the block location and dimension data for the sixth block 760, the minimum available row is row nine, corresponding to one row greater than the maximum row of the first block 750, of the portion 700 and the maximum available column within the minimum available row is column three of the portion 700, corresponding to one column less than the minimum column of the fifth block 758.

Figure 21:
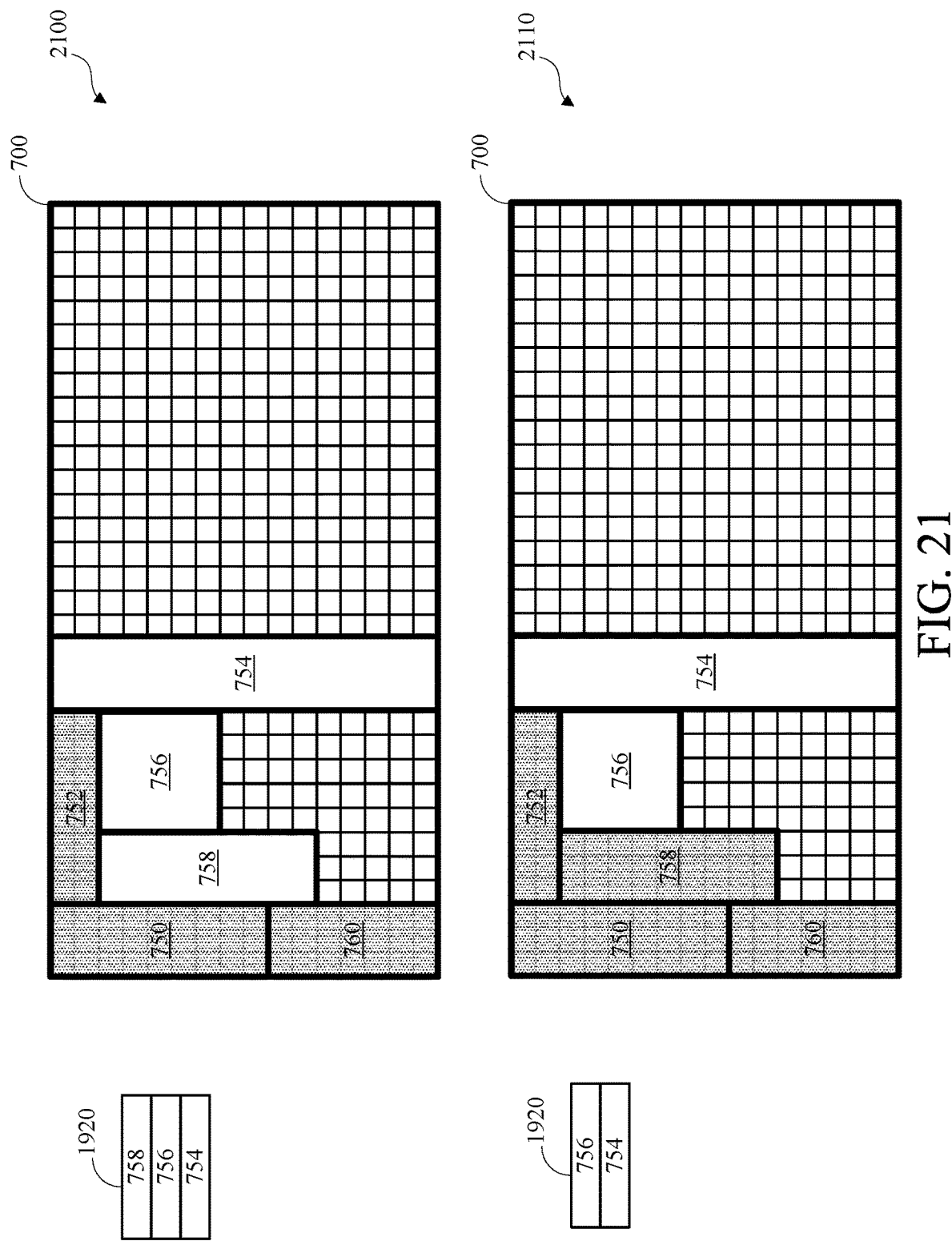

FIG. 21 is a block diagram of contextual-lexicographic coding order with floating block-partitioning, in accordance with implementations of this disclosure. As shown at 2100, subsequent to obtaining block dimensions and location data for the sixth block 760 as shown at 2010 in FIG. 20, contextual-lexicographic coding order with floating block-partitioning may include determining whether the context for decoding the content of the sixth block 760 is unavailable, as shown at 910 in FIG. 9. The context for decoding the sixth block 760 may include the reconstructed image content of the first block 750 and the left boundary of the portion 700, which may be identified as available. The sixth block 760 is shown in FIG. 21 with a stippled background to indicate that, subsequent to obtaining block dimensions and location data for the sixth block 760 as shown at 2010 in FIG. 20, the image content for the sixth block 760 may be identified as available for coding a subsequently coded block. The image content for the sixth block 760 may be decoded, as indicated at 920 in FIG. 9, subsequent to obtaining block dimensions and location data for the sixth block 760, which may be prior to, concurrent with, or subsequent o obtaining block dimensions and location data for subsequent blocks from the portion 700. The image content for the sixth block 760 may be decoded prior to decoding the image content for the fifth block 758.

Subsequent to identifying image content for the sixth block 760 available, contextual-lexicographic coding order with floating block-partitioning may include determining whether the stack 1920 includes any blocks, as shown at 930 in FIG. 9. The stack may include the third block 754, the fourth block 756, and the fifth block 758. The stack 1920 may have a cardinality greater than zero, such as three. As shown at 2110, the fifth block 758 may be identified as the current block, popped or removed from the stack, and contextual-lexicographic coding order with floating block-partitioning may include determining whether the context for decoding the image content of the fifth block 758 is unavailable, as shown at 910 in FIG. 9. The context for decoding the fifth block 758 may include the reconstructed image content of the first block 750, the second block 752, and the sixth block 760, which may be identified as available. The fifth block 758 is shown at 2110 in FIG. 21 with a stippled background to indicate that the image content for the fifth block 758 may be identified as available for coding a subsequently coded block. The image content for the fifth block 758 may be decoded, as indicated at 920 in FIG. 9, prior to, concurrent with, or subsequent o obtaining block dimensions and location data for subsequent blocks from the portion 700. The image content for the fifth block 758 may be decoded prior to decoding the image content for the fourth block 756. Subsequent to popping the fifth block 758 from the stack 1920, the stack 1920 may have a cardinality greater than zero, such as two.

Figure 22:
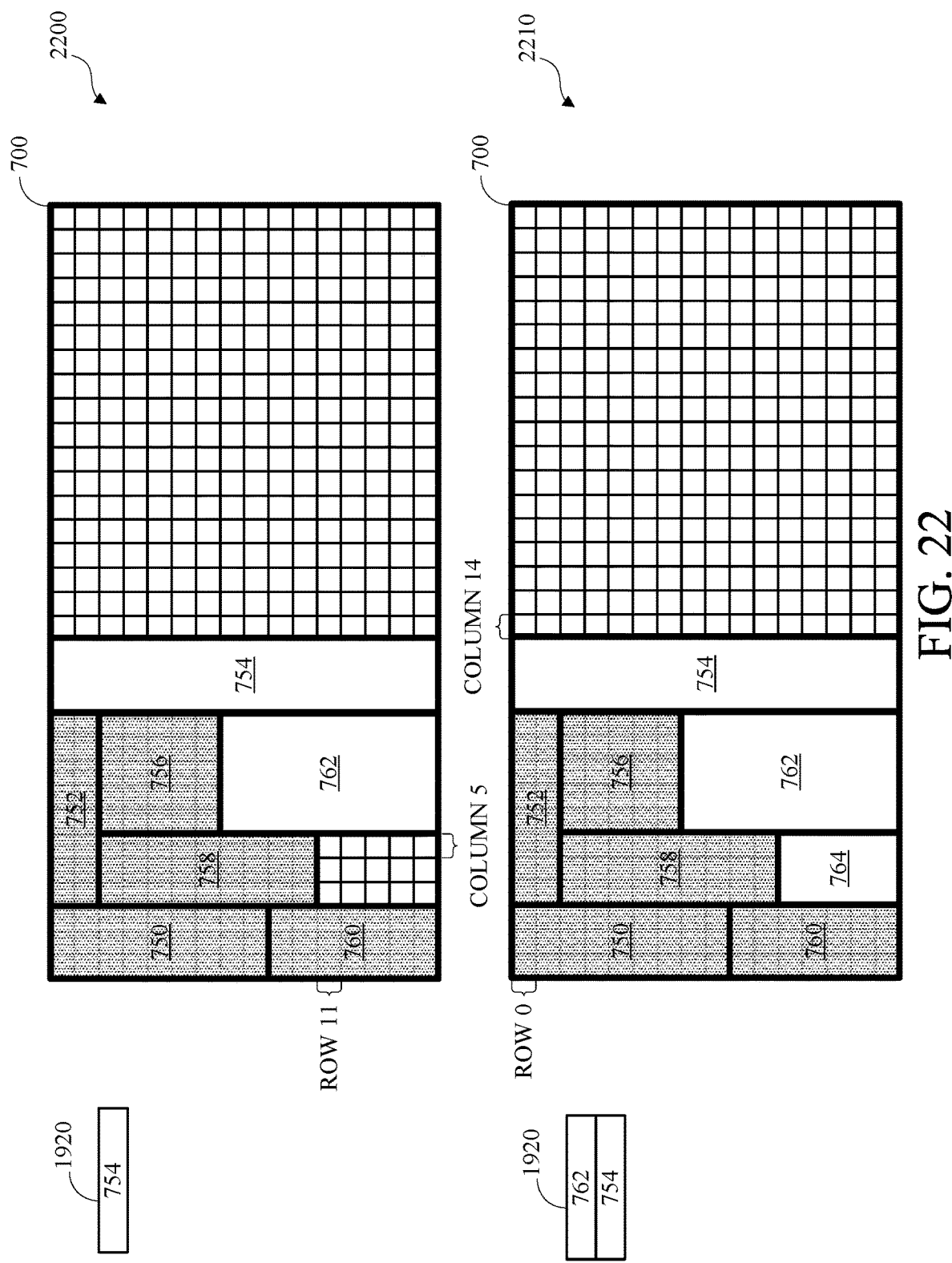

FIG. 22 is a block diagram of contextual-lexicographic coding order with floating block-partitioning, in accordance with implementations of this disclosure.

Subsequent to identifying the image content for the fifth block 758 as available, as shown at 2110 in FIG. 21, contextual-lexicographic coding order with floating block-partitioning may include determining whether the stack 1920 includes any blocks, as shown at 930 in FIG. 9. The stack 1920 may include the third block 754 and the fourth block 756. The stack 1920 may have a cardinality of two. As shown at 2200, the fourth block 756 may be identified as the current block, popped or removed from the stack 1920, and contextual-lexicographic coding order with floating block-partitioning may include determining whether the context for decoding the image content of the fourth block 756 is unavailable, as shown at 910 in FIG. 9. The context for decoding the fourth block 756 may include the reconstructed image content of the second block 752 and the fifth block 758, which may be identified as available. The fourth block 756 is shown at 2200 in FIG. 22 with a stippled background to indicate that the image content for the fourth block 756 may be identified as available for coding a subsequently coded block. The image content for the fourth block 756 may be decoded, as indicated at 920 in FIG. 9, prior to, concurrent with, or subsequent to obtaining block dimensions and location data for subsequent blocks from the portion 700. The image content for the fourth block 756 may be decoded prior to decoding the image content for the third block 754. Subsequent to popping the fourth block 756 from the stack 1920, the stack 1920 may have a cardinality greater than zero, such as one.

Subsequent to identifying the image content for the fourth block 756 as available, contextual-lexicographic coding order with floating block-partitioning may include determining whether the stack 1920 includes any blocks, as shown at 930 in FIG. 9. The stack 1920 may include the third block 754. The stack 1920 may have a cardinality of one. As shown at 2200, the third block 754 may be identified as the current block, popped or removed from the stack 1920, and contextual-lexicographic coding order with floating block-partitioning may include determining whether the context for decoding the content of the third block 754 is unavailable, as shown at 910 in FIG. 9. The context for decoding the third block 754 may include the reconstructed image content of the second block 752 and the reconstructed image content of the fourth block 756, which may be identified as available. The context for decoding the third block 754 may include unavailable context adjacent to the third block 754 in a defined direction, such as to the left of the third block 754. In response to determining that at least some context for decoding the third block 754 is unavailable, the indicator or identifier for the third block 754 may be pushed or added to the stack 1920, as shown at 970 in FIG. 9. In some implementations, determining whether the context for decoding the content of a block is unavailable may be performed prior to removing the block from the stack and removing the block from the stack may be omitted in response to determining that the context for decoding the content of the block is unavailable.

As shown at 2200, subsequent to pushing the third block 754 on the stack 1920, contextual-lexicographic coding order with floating block-partitioning may include obtaining block dimensions and location data for a seventh block 762, such as by determining the block dimensions and location data at an encoder or decoding the block dimensions and determining the location data at a decoder. The seventh block 762 is shown as a 9×5 block. The seventh block 762 is shown with a solid white background to indicate that the reconstructed image content, such as reconstructed pixel values, for the seventh block 762 are unavailable. The unavailable image content for the seventh block 762 may be obtained, such as decoded at a decoder, subsequent to obtaining the block dimension and location data for the seventh block 762 and subsequent to obtaining the image content of the context for decoding the seventh block 762.

Encoding the portion 700 may include identifying the block location and dimension data for the seventh block 762 and including the block dimension data or the block dimension data and the block location data for the seventh block 762 in the output bitstream.

In some implementations, decoding the portion 700 may include decoding the block location data and the block dimension data for the seventh block 762 from the encoded bitstream.

In some implementations, the encoded bitstream may omit the block location information for the seventh block 762 and decoding the portion 700 may include determining the block location for the seventh block 762. Contextual-lexicographic coding order with floating block-partitioning may include using the minimum row constraint and the context column constraint, (min, context), as shown at 980 in FIG. 9. Decoding the block dimension data, such as shown at 950 in FIG. 9, for the seventh block 762 may include decoding a block height of nine pixels and a block width of five pixels. Identifying the block location may include using available location context, the block location constraints, and the block dimensions, as shown at 960 in FIG. 9. For the seventh block 762, the available location context may be the third block 754 and the fourth block 756. As shown at 2010 in FIG. 20, prior to obtaining the block location and dimension data for the seventh block 762, the minimum available row is row 7, corresponding to one row greater than the maximum row of the fourth block 756, and the maximum available column within the minimum available row is column 10, corresponding to one column less than the minimum column of the third block 754.

As shown at 2210, subsequent to obtaining block dimensions and location data for the seventh block 762 as shown at 2200, contextual-lexicographic coding order with floating block-partitioning may include determining whether the context for decoding the image content of the seventh block 762 is unavailable, as shown at 910 in FIG. 9. The context for decoding the seventh block 762 may include the reconstructed image content of the fourth block 756 and the reconstructed image content of the fifth block 758, which may be identified as available. The context for decoding the seventh block 762 may include unavailable context adjacent to the seventh block 762 in a defined direction, such as to the left of the seventh block 762. In response to determining that at least some context for decoding the seventh block 762 is unavailable, an indicator or identifier for the seventh block 762 may be pushed or added to the stack 1920, as shown at 970 in FIG. 9.

As shown at 2210, subsequent to pushing the seventh block 762 on the stack 1920, contextual-lexicographic coding order with floating block-partitioning may include obtaining block dimensions and location data for an eighth block 764, such as by determining the block dimensions and location data at an encoder or decoding the block dimensions and determining the location data at a decoder. The eighth block 764 is shown as a 5×3 block. The eighth block 764 is shown with a solid white background to indicate that the reconstructed image content, such as reconstructed pixel values, for the eighth block 764 are unavailable. The unavailable image content for the eighth block 764 may be obtained, such as decoded at a decoder, subsequent to obtaining the block dimension and location data for the eighth block 764 and subsequent to obtaining the image content of the context for decoding the eighth block 764.

Encoding the portion 700 may include identifying the block location and dimension data for the eighth block 764 and including the block dimension data or the block dimension data and the block location data for the eighth block 764 in the output bitstream.

In some implementations, decoding the portion 700 may include decoding the block location data and the block dimension data for the eighth block 764 from the encoded bitstream.

In some implementations, the encoded bitstream may omit the block location information for the eighth block 764 and decoding the portion 700 may include determining the block location for the eighth block 764. Contextual-lexicographic coding order with floating block-partitioning may include using the minimum row constraint and the context column constraint, (min, context), as shown at 980 in FIG. 9. Decoding the block dimension data, such as shown at 950 in FIG. 9, for the eighth block 764 may include decoding a block height of five pixels and a block width of three pixels. Identifying the block location may include using available location context, the block location constraints, and the block dimensions, as shown at 960 in FIG. 9. For the eighth block 764, the available location context may be the fifth block 758 and the seventh block 762. As shown at 2200, prior to obtaining the block location and dimension data for the eighth block 764, the minimum available row is row 11, corresponding to one row greater than the maximum row of the fifth block 758, and the maximum available column within the minimum available row is column 5 of the portion 700, corresponding to one column less than the minimum column of the seventh block 762.

Figure 23:
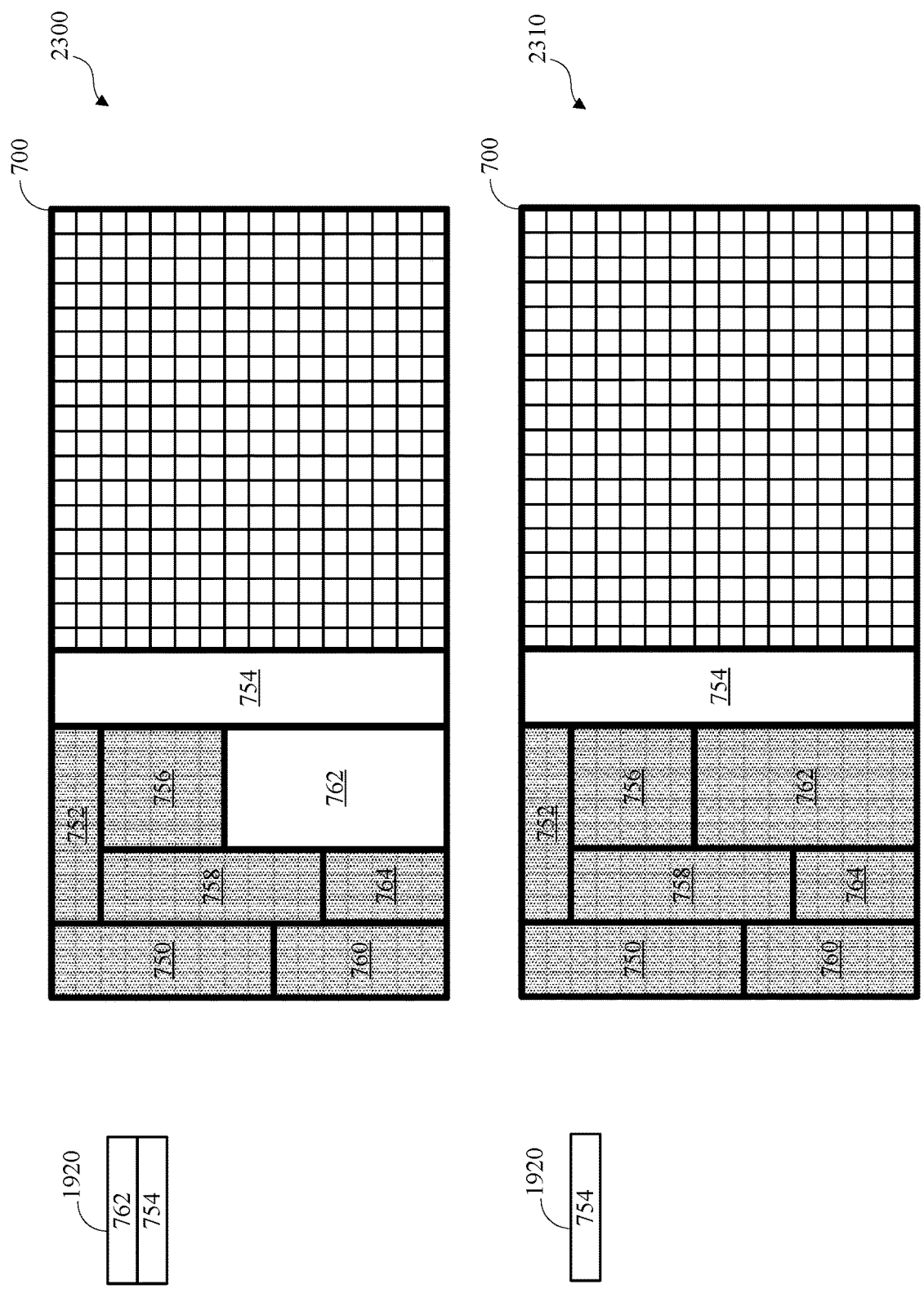

FIG. 23 is a block diagram of contextual-lexicographic coding order with floating block-partitioning, in accordance with implementations of this disclosure.

As shown at 2300, subsequent to obtaining block dimensions and location data for the eighth block 764 as shown at 2210 in FIG. 22, contextual-lexicographic coding order with floating block-partitioning may include determining whether the context for decoding the image content of the eighth block 764 is unavailable, as shown at 910 in FIG. 9. The context for decoding the eighth block 764 may include the reconstructed image content of the fifth block 758 and the reconstructed image content of the sixth block 760, which may be identified as available. The eighth block 764 is shown at 2300 in FIG. 23 with a stippled background to indicate that the image content for the eighth block 764 may be identified as available for coding a subsequently coded block. The image content for the eighth block 764 may be decoded, as indicated at 920 in FIG. 9, prior to, concurrent with, or subsequent o obtaining block dimensions and location data for subsequent blocks from the portion 700. The image content for the eighth block 764 may be decoded prior to decoding the image content for the seventh block 762.

Subsequent to identifying image content for the eighth block 764 as available, contextual-lexicographic coding order with floating block-partitioning may include determining whether the stack 1920 includes any blocks, as shown at 930 in FIG. 9. The stack may include the third block 754 and the seventh block 762. As shown at 2310, the seventh block 762 may be identified as the current block, popped or removed from the stack, and contextual-lexicographic coding order with floating block-partitioning may include determining whether the context for decoding the image content of the seventh block 762 is unavailable, as shown at 910 in FIG. 9. The context for decoding the seventh block 762 may the reconstructed image content of the fourth block 756, the reconstructed image content of the fifth block 758, and the reconstructed image content of the eighth block 764, which may be identified as available. The seventh block 762 is shown at 2310 in FIG. 23 with a stippled background to indicate that the image content for the seventh block 762 may be identified as available for coding a subsequently coded block. The image content for the seventh block 762 may be decoded, as indicated at 920 in FIG. 9, prior to, concurrent with, or subsequent to obtaining block dimensions and location data for subsequent blocks from the portion 700. The image content for the seventh block 762 may be decoded prior to decoding the image content for the third block 754.

Figure 24:
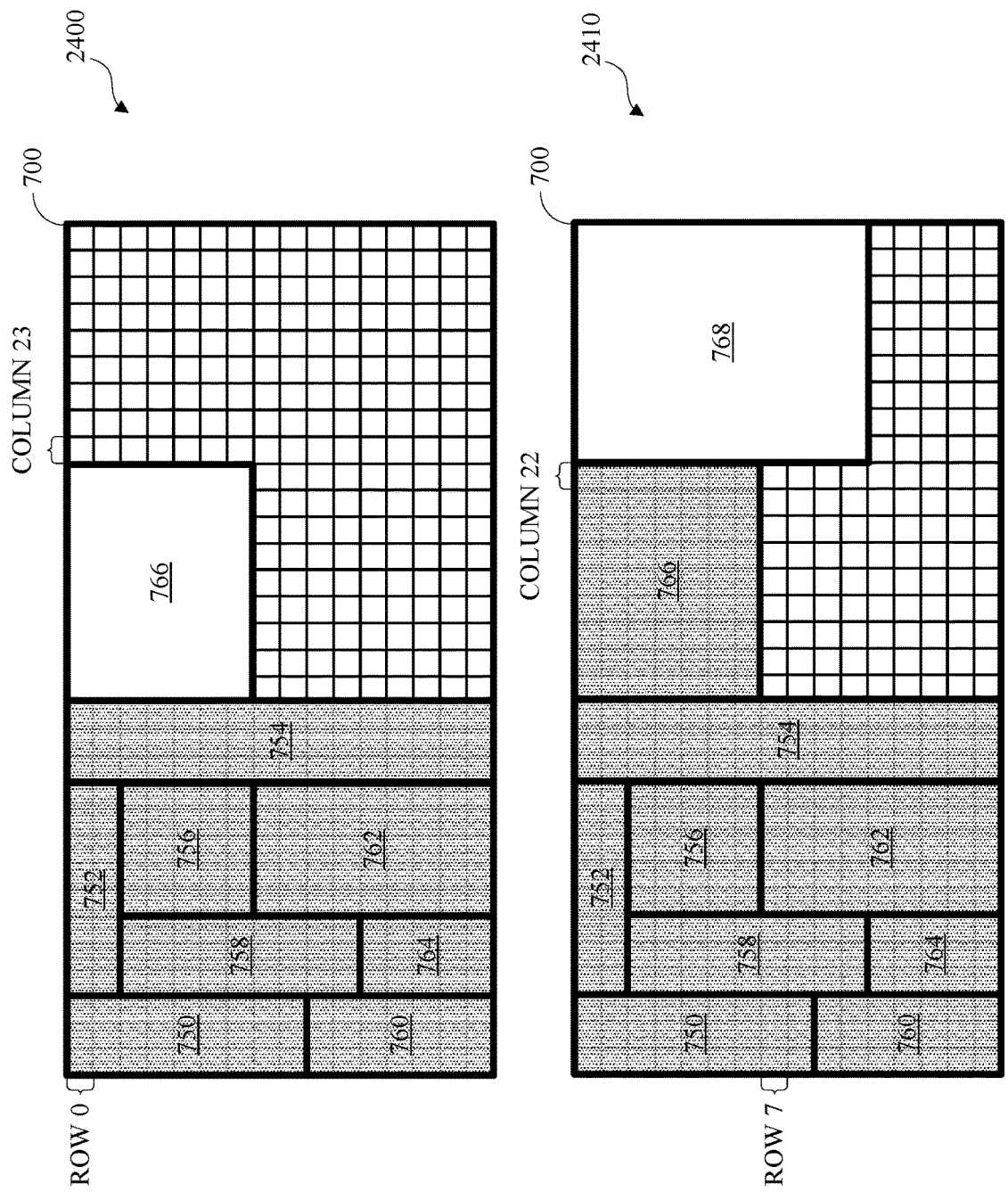

FIG. 24 is a block diagram of contextual-lexicographic coding order with floating block-partitioning, in accordance with implementations of this disclosure.

Subsequent to identifying the image content for the seventh block 762 as available, contextual-lexicographic coding order with floating block-partitioning may include determining whether the stack 1920 includes any blocks, as shown at 930 in FIG. 9. The stack may include the third block 754. As shown at 2400, the third block 754 may be identified as the current block, popped or removed from the stack, and contextual-lexicographic coding order with floating block-partitioning may include determining whether the context for decoding the image content of the third block 754 is unavailable, as shown at 910 in FIG. 9. The context for decoding the third block 754 may include the reconstructed image content of the second block 752, the reconstructed image content of the fourth block 756, and the reconstructed image content of the seventh block 762, which may be identified as available. The third block 754 is shown in FIG. 24 with a stippled background to indicate that the image content for the third block 754 may be identified as available for coding a subsequently coded block. The image content for the third block 754 may be decoded, as indicated at 920 in FIG. 9, prior to, concurrent with, or subsequent to obtaining block dimensions and location data for subsequent blocks from the portion 700. The image content for the third block 754 may be decoded prior to decoding the image content for subsequent blocks from the portion 700 for which the third block 754 is context for decoding.

As shown at 2400, subsequent to identifying the image content for the third block 754 as available, contextual-lexicographic coding order with floating block-partitioning may include determining whether the stack 1920 includes any blocks, as shown at 930 in FIG. 9. The stack 1920 may omit blocks. Subsequent to determining that the stack 1920 omits blocks, contextual-lexicographic coding order with floating block-partitioning may include obtaining block dimensions and location data for a ninth block 766, such as by determining the block dimensions and location data at an encoder or decoding the block dimensions and determining the location data at a decoder. The ninth block 766 is shown as a 7×9 block. The ninth block 766 is shown with a solid white background to indicate that the reconstructed image content, such as reconstructed pixel values, for the ninth block 766 are unavailable. Unavailable image content for the ninth block 766 may be obtained, such as decoded at a decoder, subsequent to obtaining the block dimension and location data for the ninth block 766.

Encoding the portion 700 may include identifying the block location and dimension data for the ninth block 766 and including the block dimension data or the block dimension data and the block location data in the output bitstream.

In some implementations, decoding the portion 700 may include decoding the block location data and the block dimension data for the ninth block 766 from the encoded bitstream.

In some implementations, the encoded bitstream may omit the block location information for the ninth block 766 and decoding the portion 700 may include determining the block location. Contextual-lexicographic coding order with floating block-partitioning may include using the minimum row constraint and the minimum column constraint, (min, min), as shown at 940 in FIG. 9. Decoding the block dimension data, such as shown at 950 in FIG. 9, for the ninth block 766 may include decoding a block height of seven pixels and a block width of nine pixels. Identifying the block location may include using the available location context, the block location constraints, and the block dimensions, as shown at 960 in FIG. 9. For the ninth block 766, the available location context may be the top boundary of the portion 700 and the third block 754. As shown at 2210 in FIG. 22, prior to obtaining the block location and dimension data for ninth block 766, the minimum available row is the top row (row 0) of the portion 700 and the minimum available column within the minimum available row is column 14 of the portion 700.

As shown at 2410, subsequent to obtaining the block dimensions and location data for the ninth block 766 as shown at 2400, contextual-lexicographic coding order with floating block-partitioning may include determining whether the context for decoding the image content of the ninth block 766 is unavailable, as shown at 910 in FIG. 9. The context for decoding the ninth block 766 may include the top boundary of the portion 700 and the reconstructed image content of the third block 754, which may be identified as available. The ninth block 766 is shown at 2410 in FIG. 24 with a stippled background to indicate that the image content for the ninth block 766 may be identified as available for coding a subsequently coded block. The image content for the ninth block 766 may be decoded, as indicated at 920 in FIG. 9, prior to, concurrent with, or subsequent to obtaining block dimensions and location data for subsequent blocks from the portion 700. The image content for the ninth block 766 may be decoded prior to decoding the image content for subsequent blocks from the portion 700 for which the ninth block 766 is context for decoding.

As shown at 2410, subsequent to identifying the image content for the ninth block 766 as available, contextual-lexicographic coding order with floating block-partitioning may include obtaining block dimensions and location data for a tenth block 768, such as by determining the block dimensions and location data at an encoder or decoding the block dimensions and determining the location data at a decoder. The tenth block 768 is shown as an 11×9 block. The tenth block 768 is shown with a solid white background to indicate that the reconstructed image content, such as reconstructed pixel values, for the tenth block 768 is unavailable. The unavailable image content for the tenth block 768 may be obtained, such as decoded at a decoder, subsequent to obtaining the block dimension and location data for the tenth block 768 and subsequent to obtaining the image content of the context for decoding the tenth block 768.

Encoding the portion 700 may include identifying the block location and dimension data for the tenth block 768 and including the block dimension data or the block dimension data and the block location data for the tenth block 768 in the output bitstream.

In some implementations, decoding the portion 700 may include decoding the block location data and the block dimension data for the tenth block 768 from the encoded bitstream.

In some implementations, the encoded bitstream may omit the block location information for the tenth block 768 and decoding the portion 700 may include determining the block location for the tenth block 768. Contextual-lexicographic coding order with floating block-partitioning may include using the minimum row constraint and the minimum column constraint, (min, min), as shown at 940 in FIG. 9. Decoding the block dimension data, such as shown at 950 in FIG. 9, for the tenth block 768 may include decoding a block height of eleven pixels and a block width of nine pixels. Identifying the block location may include using the available location context, the block location constraints, and the block dimensions, as shown at 960 in FIG. 9. For the tenth block 768, the available location context may be the ninth block 766 and the top boundary of the portion 700. As shown at 2400, prior to obtaining the block location and dimension data for the tenth block 768, the minimum available row is row 0 of the portion 700 and the minimum available column within the minimum available row is column 23 of the portion 700.

Figure 25:
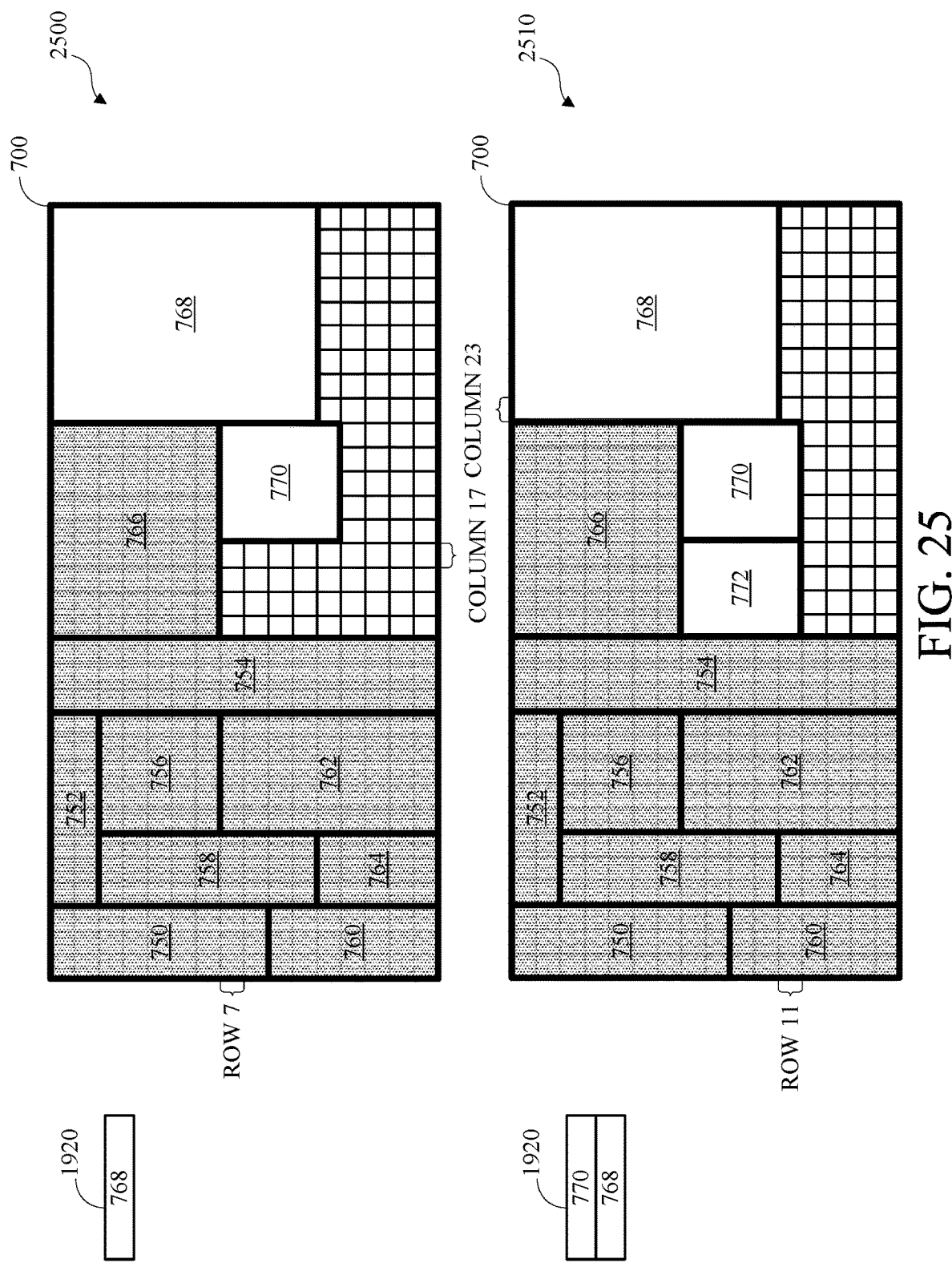

FIG. 25 is a block diagram of contextual-lexicographic coding order with floating block-partitioning, in accordance with implementations of this disclosure.

As shown at 2500, subsequent to obtaining block dimensions and location data for the tenth block 768 as shown at 2410 in FIG. 24, contextual-lexicographic coding order with floating block-partitioning may include determining whether the context for decoding the image content of the tenth block 768 is unavailable, as shown at 910 in FIG. 9. The context for decoding the tenth block 768 may include the reconstructed image content of the ninth block 766 and the top boundary of the portion 700, which may be identified as available. The context for decoding the tenth block 768 may include unavailable context adjacent to the tenth block 768 in a defined direction, such as to the left of the tenth block 768. The tenth block 768 is shown with a solid white background to indicate that the reconstructed image content, such as reconstructed pixel values, for the tenth block 768 are unavailable. In response to determining that at least some context for decoding the tenth block 768 is unavailable, an indicator or identifier for the tenth block 768 may be pushed or added to the stack 1920, as shown at 970 in FIG. 9.

As shown at 2500, subsequent to pushing the tenth block 768 on the stack 1920, contextual-lexicographic coding order with floating block-partitioning may include obtaining block dimensions and location data for an eleventh block 770, such as by determining the block dimensions and location data at an encoder or decoding the block dimensions and determining the location data at a decoder. The eleventh block 770 is shown as a 5×5 block. The eleventh block 770 is shown with a solid white background to indicate that the reconstructed image content, such as reconstructed pixel values, for the eleventh block 770 is unavailable. The unavailable image content for the eleventh block 770 may be obtained, such as decoded at a decoder, subsequent to obtaining the block dimension and location data for the eleventh block 770 and subsequent to obtaining the image content of the context for decoding the eleventh block 770.

Encoding the portion 700 may include identifying the block location and dimension data for the eleventh block 770 and including the block dimension data or the block dimension data and the block location data in the output bitstream.

In some implementations, decoding the portion 700 may include decoding the block location data and the block dimension data for the eleventh block 770 from the encoded bitstream.

In some implementations, the encoded bitstream may omit the block location information for the eleventh block 770 and decoding the portion 700 may include determining the block location for the eleventh block 770. Contextual-lexicographic coding order with floating block-partitioning may include using the minimum row constraint and the context column constraint, (min, context), as shown at 980 in FIG. 9. Decoding the block dimension data, such as shown at 950 in FIG. 9, for the eleventh block 770 may include decoding a block height of five pixels and a block width of five pixels. Identifying the block location may include using the available context, the block location constraints, and the block dimensions, as shown at 960 in FIG. 9. For the eleventh block 770, the available context may be the ninth block 766 and the tenth block 768. As shown at 2410 in FIG. 24, prior to obtaining the block location and dimension data for the eleventh block 770, the minimum available row is row 7, corresponding to one row greater than the maximum row of the ninth block 766, and the maximum available column within the minimum available row is column 22, corresponding to one column less than the minimum column of the tenth block 768.

As shown at 2510, subsequent to obtaining block dimensions and location data for the eleventh block 770 as shown at 2500, contextual-lexicographic coding order with floating block-partitioning may include determining whether the context for decoding the image content of the eleventh block 770 is unavailable, as shown at 910 in FIG. 9. The context for decoding the eleventh block 770 may include the reconstructed image content of the ninth block 766, which may be identified as available. The context for decoding the eleventh block 770 may include unavailable context adjacent to the eleventh block 770 in a defined direction, such as to the left of the eleventh block 770. In response to determining that at least some context for decoding the eleventh block 770 is unavailable, an indicator or identifier for the eleventh block 770 may be pushed or added to the stack 1920, as shown at 970 in FIG. 9.

As shown at 2510, subsequent to pushing the eleventh block 770 on the stack 1920, contextual-lexicographic coding order with floating block-partitioning may include obtaining block dimensions and location data for a twelfth block 772, such as by determining the block dimensions and location data at an encoder or decoding the block dimensions and determining the location data at a decoder. The twelfth block 772 is shown as a 5×4 block. The twelfth block 772 is shown with a solid white background to indicate that the reconstructed image content, such as reconstructed pixel values, for the twelfth block 772 are unavailable. The unavailable image content for the twelfth block 772 may be obtained, such as decoded at a decoder, subsequent to obtaining the block dimension and location data for the twelfth block 772 and subsequent to obtaining the image content of the context for decoding the twelfth block 772.

Encoding the portion 700 may include identifying the block location and dimension data for the twelfth block 772 and including the block dimension data or the block dimension data and the block location data for the twelfth block 772 in the output bitstream.

In some implementations, decoding the portion 700 may include decoding the block location data and the block dimension data for the twelfth block 772 from the encoded bitstream.

In some implementations, the encoded bitstream may omit the block location information for the twelfth block 772 and decoding the portion 700 may include determining the block location for the twelfth block 772. Contextual-lexicographic coding order with floating block-partitioning may include using the minimum row constraint and the context column constraint, (min, context), as shown at 980 in FIG. 9. Decoding the block dimension data, such as shown at 950 in FIG. 9, for the twelfth block 772 may include decoding a block height of five pixels and a block width of four pixels. Identifying the block location may include using the available context, the block location constraints, and the block dimensions, as shown at 960 in FIG. 9. For the twelfth block 772, the available context may be the ninth block 766 and the eleventh block 770. As shown at 2500, prior to obtaining the block location and dimension data for the twelfth block 772, the minimum available row is row 7, corresponding to one row greater than the maximum row of the ninth block 766, and the maximum available column within the minimum available row is column 17, corresponding to one column less than the minimum column of the eleventh block 770.

Figure 26:
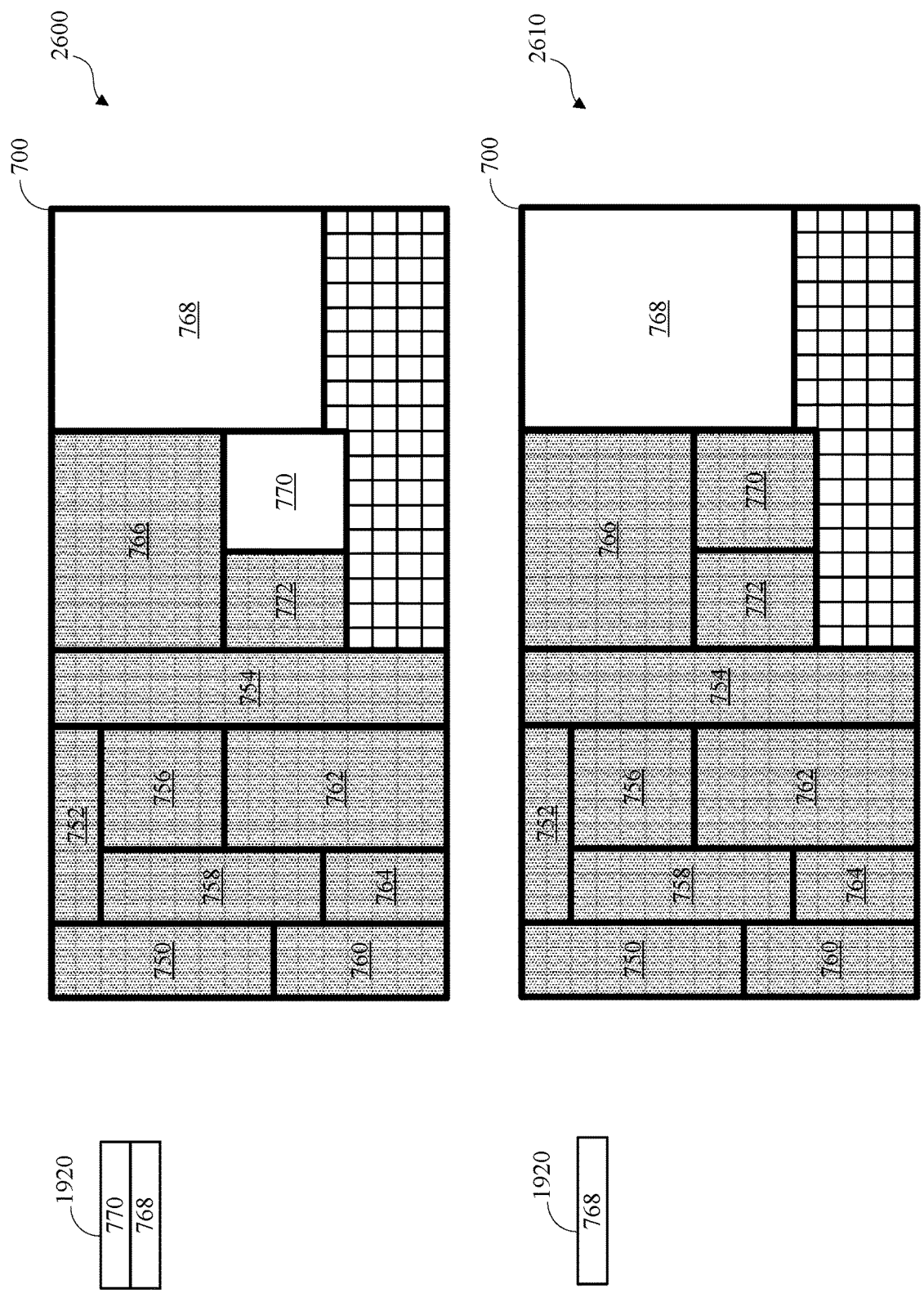

FIG. 26 is a block diagram of contextual-lexicographic coding order with floating block-partitioning, in accordance with implementations of this disclosure.

As shown at 2600, subsequent to obtaining the block dimensions and location data for the twelfth block 772 as shown at 2510 in FIG. 25, contextual-lexicographic coding order with floating block-partitioning may include determining whether the context for decoding the image content of the twelfth block 772 is unavailable, as shown at 910 in FIG. 9. The context for decoding the twelfth block 772 may include the reconstructed image content of the third block 754 and the reconstructed image content of the ninth block 766, which may be identified as available. The twelfth block 772 is shown at 2600 in FIG. 26 with a stippled background to indicate that the image content for the twelfth block 772 may be identified as available for coding a subsequently coded block. The image content for the twelfth block 772 may be decoded, as indicated at 920 in FIG. 9, prior to, concurrent with, or subsequent to obtaining block dimensions and location data for subsequent blocks from the portion 700. The image content for the twelfth block 772 may be decoded prior to decoding the image content for the eleventh block 770.

Subsequent to identifying image content for the twelfth block 772 as available, contextual-lexicographic coding order with floating block-partitioning may include determining whether the stack 1920 includes any blocks, as shown at 930 in FIG. 9. The stack may include the tenth block 768 and the eleventh block 770. As shown at 2610, the eleventh block 770 may be identified as the current block, popped or removed from the stack, and contextual-lexicographic coding order with floating block-partitioning may include determining whether the context for decoding the image content of the eleventh block 770 is unavailable, as shown at 910 in FIG. 9. The context for decoding the eleventh block 770 may the reconstructed image content of the ninth block 766 and the reconstructed image content of the twelfth block 772, which may be identified as available. The eleventh block 770 is shown at 2610 in FIG. 26 with a stippled background to indicate that the image content for the eleventh block 770 may be identified as available for coding a subsequently coded block. The image content for the eleventh block 770 may be decoded, as indicated at 920 in FIG. 9, prior to, concurrent with, or subsequent o obtaining block dimensions and location data for subsequent blocks from the portion 700. The image content for the eleventh block 770 may be decoded prior to decoding the image content for the tenth block 768.

Figure 27:
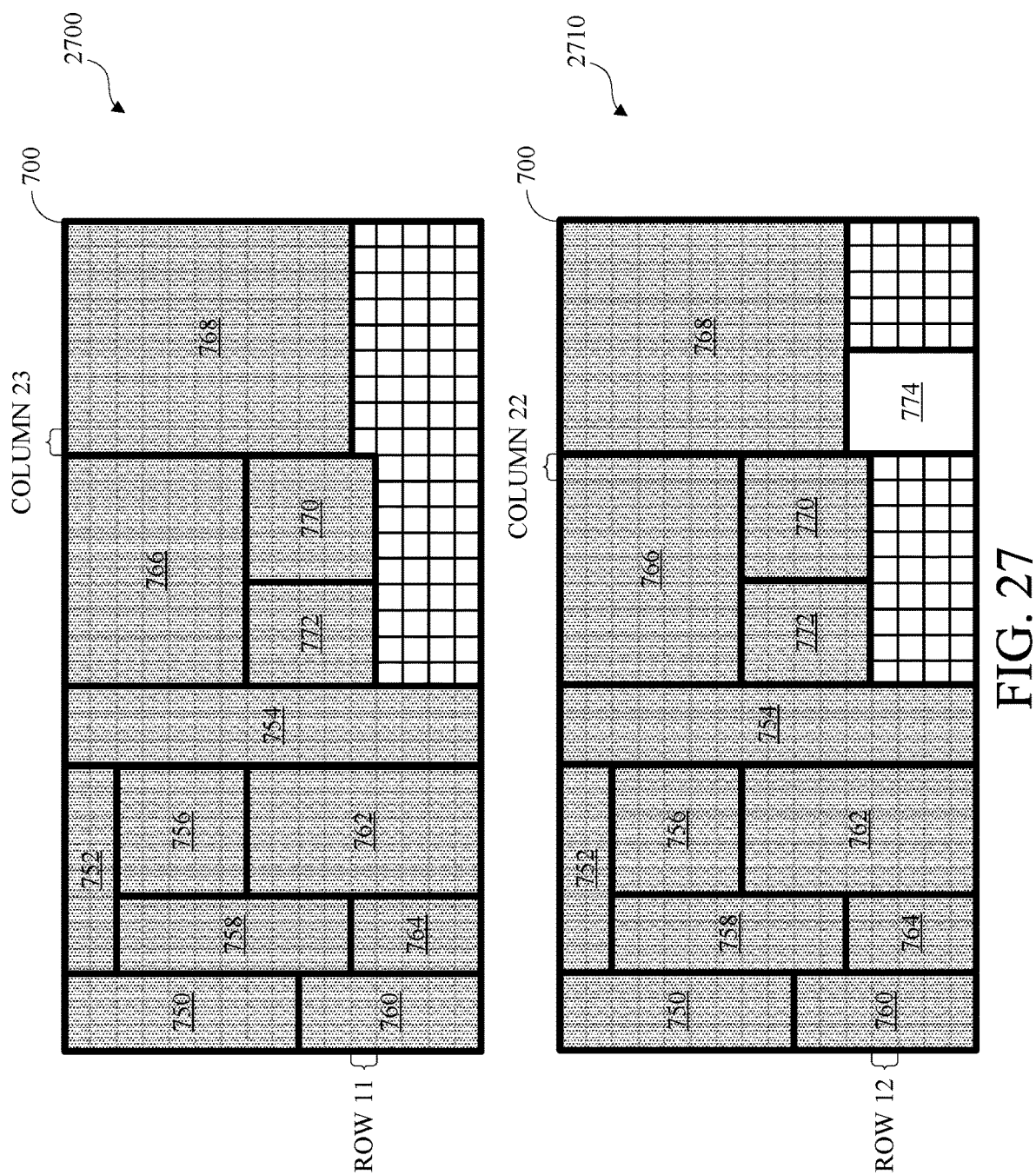

FIG. 27 is a block diagram of contextual-lexicographic coding order with floating block-partitioning, in accordance with implementations of this disclosure.

Subsequent to identifying image content for the eleventh block 770 as available, contextual-lexicographic coding order with floating block-partitioning may include determining whether the stack 1920 includes any blocks, as shown at 930 in FIG. 9. The stack may include the tenth block 768. As shown at 2700, the tenth block 768 may be identified as the current block, popped or removed from the stack, and contextual-lexicographic coding order with floating block-partitioning may include determining whether the context for decoding the image content of the tenth block 768 is unavailable, as shown at 910 in FIG. 9. The context for decoding the tenth block 768 may be the reconstructed image content of the ninth block 766 and the reconstructed image content of the eleventh block 770, which may be identified as available. The tenth block 768 is shown at 2700 with a stippled background to indicate that the image content for the tenth block 768 may be identified as available for coding a subsequently coded block. The image content for the tenth block 768 may be decoded, as indicated at 920 in FIG. 9, prior to, concurrent with, or subsequent o obtaining block dimensions and location data for subsequent blocks from the portion 700. The image content for the tenth block 768 may be decoded prior to decoding subsequent blocks from the portion 700.

As shown at 2710, subsequent to identifying image content for the tenth block 768 as available, contextual-lexicographic coding order with floating block-partitioning may include determining whether the stack 1920 includes any blocks, as shown at 930 in FIG. 9. The stack 1920 may omit blocks. Subsequent to determining that the stack 1920 omits blocks, contextual-lexicographic coding order with floating block-partitioning may include obtaining block dimensions and location data for a thirteenth block 774, such as by determining the block dimensions and location data at an encoder or decoding the block dimensions and determining the location data at a decoder. The thirteenth block 774 is shown as a 5×4 block. The thirteenth block 774 is shown with a solid white background to indicate that the content, such as pixel values, for the thirteenth block 774 are unavailable. The unavailable image content for the thirteenth block 774 may be obtained, such as decoded at a decoder, subsequent to obtaining the block dimension and location data for the thirteenth block 774.

Encoding the portion 700 may include identifying the block location and dimension data for the thirteenth block 774 and including the block dimension data or the block dimension data and the block location data in the output bitstream.

In some implementations, decoding the portion 700 may include decoding the block location data and the block dimension data for the thirteenth block 774 from the encoded bitstream.

In some implementations, the encoded bitstream may omit the block location information for the thirteenth block 774 and decoding the portion 700 may include determining the block location. Contextual-lexicographic coding order with floating block-partitioning may include using the minimum row constraint and the minimum column constraint, (min, min), as shown at 940 in FIG. 9. Decoding the block dimension data, such as shown at 950 in FIG. 9, for the thirteenth block 774 may include decoding a block height of five pixels and a block width of four pixels. Identifying the block location may include using the available location context, the block location constraints, and the block dimensions, as shown at 960 in FIG. 9. For the thirteenth block 774, the available location context may be the tenth block 768 and the eleventh block 770. As shown at 2510 in FIG. 25, prior to obtaining the block location and dimension data for thirteenth block 774, the minimum available row is row 11 of the portion 700 and the minimum available column within the minimum available row is column 24 of the portion 700.

Figure 28:
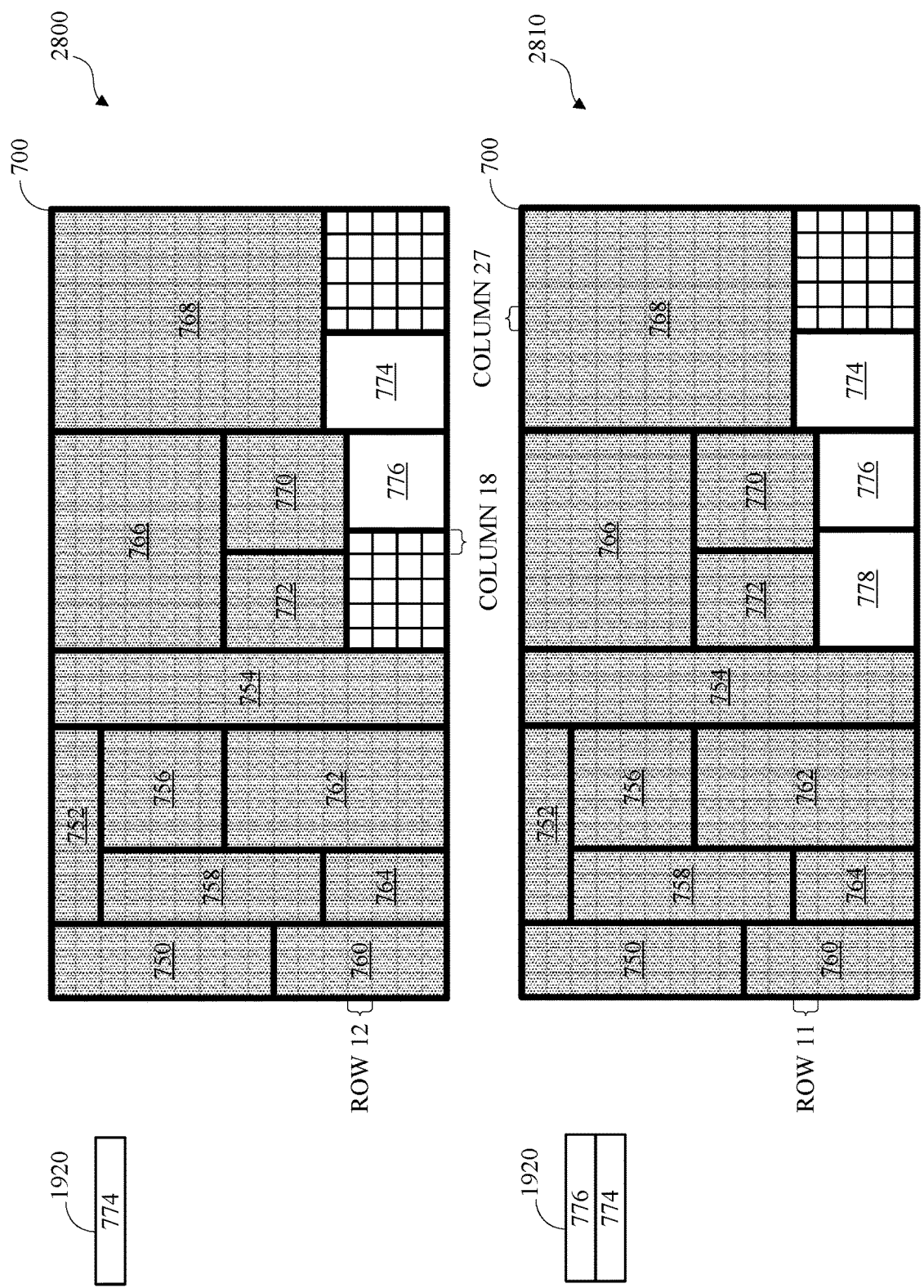

FIG. 28 is a block diagram of contextual-lexicographic coding order with floating block-partitioning, in accordance with implementations of this disclosure.

As shown at 2800, subsequent to obtaining block dimensions and location data for the thirteenth block 774 as shown at 2410 in FIG. 24, contextual-lexicographic coding order with floating block-partitioning may include determining whether the context for decoding the image content of the thirteenth block 774 is unavailable, as shown at 910 in FIG. 9. The context for decoding the thirteenth block 774 may include the reconstructed image content of the tenth block 768 and the reconstructed image content of the eleventh block 770, which may be identified as available. The context for decoding the thirteenth block 774 may include unavailable context adjacent to the thirteenth block 774 in a defined direction, such as to the left of the thirteenth block 774. The thirteenth block 774 is shown with a solid white background to indicate that the reconstructed image content, such as reconstructed pixel values, for the thirteenth block 774 are unavailable. In response to determining that at least some context for decoding the thirteenth block 774 is unavailable, an indicator or identifier for the thirteenth block 774 may be pushed or added to the stack 1920, as shown at 970 in FIG. 9.

As shown at 2800, subsequent to pushing the thirteenth block 774 on the stack 1920, contextual-lexicographic coding order with floating block-partitioning may include obtaining block dimensions and location data for a fourteenth block 776, such as by determining the block dimensions and location data at an encoder or decoding the block dimensions and determining the location data at a decoder. The fourteenth block 776 is shown as a 4×4 block. The fourteenth block 776 is shown with a solid white background to indicate that the reconstructed image content, such as reconstructed pixel values, for the fourteenth block 776 are unavailable. The unavailable image content for the fourteenth block 776 may be obtained, such as decoded at a decoder, subsequent to obtaining the block dimension and location data for the fourteenth block 776 and subsequent to obtaining the image content of the context for decoding the fourteenth block 776.

Encoding the portion 700 may include identifying the block location and dimension data for the fourteenth block 776 and including the block dimension data or the block dimension data and the block location data in the output bitstream.

In some implementations, decoding the portion 700 may include decoding the block location data and the block dimension data for the fourteenth block 776 from the encoded bitstream.

In some implementations, the encoded bitstream may omit the block location information for the fourteenth block 776 and decoding the portion 700 may include determining the block location for the fourteenth block 776. Contextual-lexicographic coding order with floating block-partitioning may include using the minimum row constraint and the context column constraint, (min, context), as shown at 980 in FIG. 9. Decoding the block dimension data, such as shown at 950 in FIG. 9, for the fourteenth block 776 may include decoding a block height of four pixels and a block width of four pixels. Identifying the block location may include using the available location context, the block location constraints, and the block dimensions, as shown at 960 in FIG. 9. For the fourteenth block 776, the available location context may be the eleventh block 770 and the thirteenth block 774. As shown at 2710 in FIG. 27, prior to obtaining the block location and dimension data for the fourteenth block 776, the minimum available row is row 12, corresponding to one row greater than the maximum row of the eleventh block 770, and the maximum available column within the minimum available row is column 22, corresponding to one column less than the minimum column of the thirteenth block 774.

As shown at 2810, subsequent to obtaining block dimensions and location data for the fourteenth block 776 as shown at 2800, contextual-lexicographic coding order with floating block-partitioning may include determining whether the context for decoding the image content of the fourteenth block 776 is unavailable, as shown at 910 in FIG. 9. The context for decoding the fourteenth block 776 may include the reconstructed image content of the eleventh block 770, which may be identified as available. The context for decoding the fourteenth block 776 may include unavailable context adjacent to the fourteenth block 776 in a defined direction, such as to the left of the fourteenth block 776. In response to determining that at least some of the context for decoding the fourteenth block 776 is unavailable, an indicator or identifier for the fourteenth block 776 may be pushed or added to the stack 1920, as shown at 970 in FIG. 9.

Subsequent to pushing the fourteenth block 776 on the stack 1920, contextual-lexicographic coding order with floating block-partitioning may include obtaining block dimensions and location data for a fifteenth block 778, such as by determining the block dimensions and location data at an encoder or decoding the block dimensions and determining the location data at a decoder. The fifteenth block 778 is shown as a 4×5 block. The fifteenth block 778 is shown with a solid white background to indicate that the reconstructed image content, such as reconstructed pixel values, for the fifteenth block 778 is unavailable. The unavailable image content for the fifteenth block 778 may be obtained, such as decoded at a decoder, subsequent to obtaining the block dimension and location data for the fifteenth block 778 and subsequent to obtaining the image content of the context for decoding the fifteenth block 778.

Encoding the portion 700 may include identifying the block location and dimension data for the fifteenth block 778 and including the block dimension data or the block dimension data and the block location data for the fifteenth block 778 in the output bitstream.

In some implementations, decoding the portion 700 may include decoding the block location data and the block dimension data for the fifteenth block 778 from the encoded bitstream.

In some implementations, the encoded bitstream may omit the block location information for the fifteenth block 778 and decoding the portion 700 may include determining the block location for the fifteenth block 778. Contextual-lexicographic coding order with floating block-partitioning may include using the minimum row constraint and the context column constraint, (min, context), as shown at 980 in FIG. 9. Decoding the block dimension data, such as shown at 950 in FIG. 9, for the fifteenth block 778 may include decoding a block height of four pixels and a block width of five pixels. Identifying the block location for the fifteenth block 778 may include using available location context, the block location constraints, and the block dimensions, as shown at 960 in FIG. 9. For the fifteenth block 778, the available location context may be the twelfth block 772 and the fourteenth block 776. As shown at 2800, prior to obtaining the block location and dimension data for the fifteenth block 778, the minimum available row is row 12, corresponding to one row greater than the maximum row of the twelfth block 772, and the maximum available column within the minimum available row is column 18, corresponding to one column less than the minimum column of the fourteenth block 776.

Figure 29:
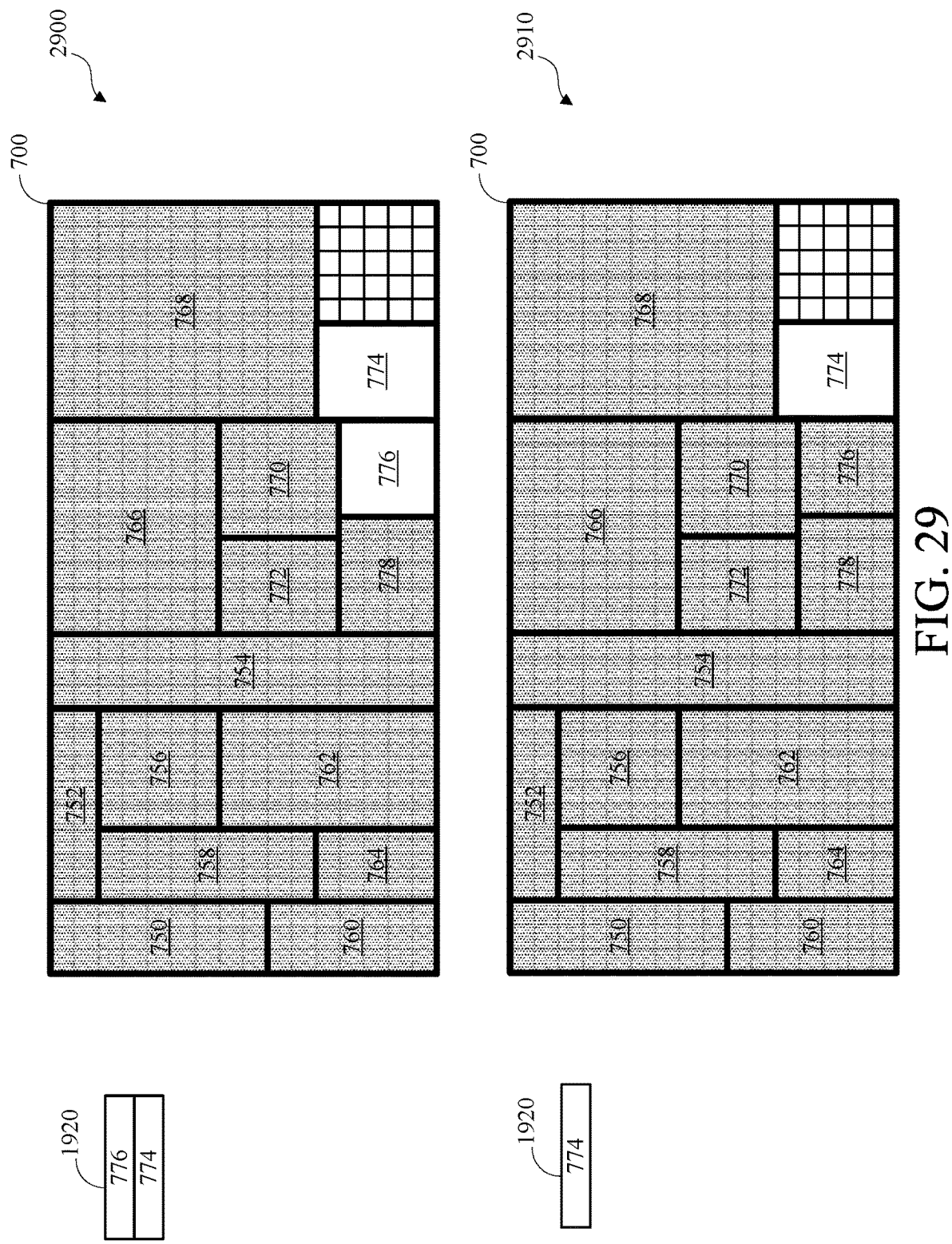

FIG. 29 is a block diagram of contextual-lexicographic coding order with floating block-partitioning, in accordance with implementations of this disclosure.

As shown at 2900, subsequent to obtaining the block dimensions and location data for the fifteenth block 778 as shown at 2810 in FIG. 28, contextual-lexicographic coding order with floating block-partitioning may include determining whether the context for decoding the image content of the fifteenth block 778 is unavailable, as shown at 910 in FIG. 9. The context for decoding the fifteenth block 778 may include the reconstructed image content of the third block 754, the reconstructed image content of the twelfth block 772, and the reconstructed image content of the eleventh block 770, which may be identified as available. The fifteenth block 778 is shown at 2900 in FIG. 29 with a stippled background to indicate that the image content for the fifteenth block 778 may be identified as available for coding a subsequently coded block. The image content for the fifteenth block 778 may be decoded, as indicated at 920 in FIG. 9, prior to, concurrent with, or subsequent to obtaining block dimensions and location data for subsequent blocks from the portion 700. The image content for the fifteenth block 778 may be decoded prior to decoding the image content for the fourteenth block 776.

Subsequent to identifying the image content for the fifteenth block 778 as available, contextual-lexicographic coding order with floating block-partitioning may include determining whether the stack 1920 includes blocks, as shown at 930 in FIG. 9. The stack may include the thirteenth block 774 and the fourteenth block 776. As shown at 2910, the fourteenth block 776 may be identified as the current block, popped or removed from the stack, and contextual-lexicographic coding order with floating block-partitioning may include determining whether the context for decoding the image content of the fourteenth block 776 is unavailable, as shown at 910 in FIG. 9. The context for decoding the fourteenth block 776 may be the reconstructed image content of the fifteenth block 778 and the reconstructed image content of the eleventh block 770, which may be identified as available. The fourteenth block 776 is shown at 2910 in FIG. 29 with a stippled background to indicate that the image content for the fourteenth block 776 may be identified as available for coding a subsequently coded block. The image content for the fourteenth block 776 may be decoded, as indicated at 920 in FIG. 9, prior to, concurrent with, or subsequent to obtaining block dimensions and location data for subsequent blocks from the portion 700. The image content for the fourteenth block 776 may be decoded prior to decoding the image content for the thirteenth block 774.

Figure 30:
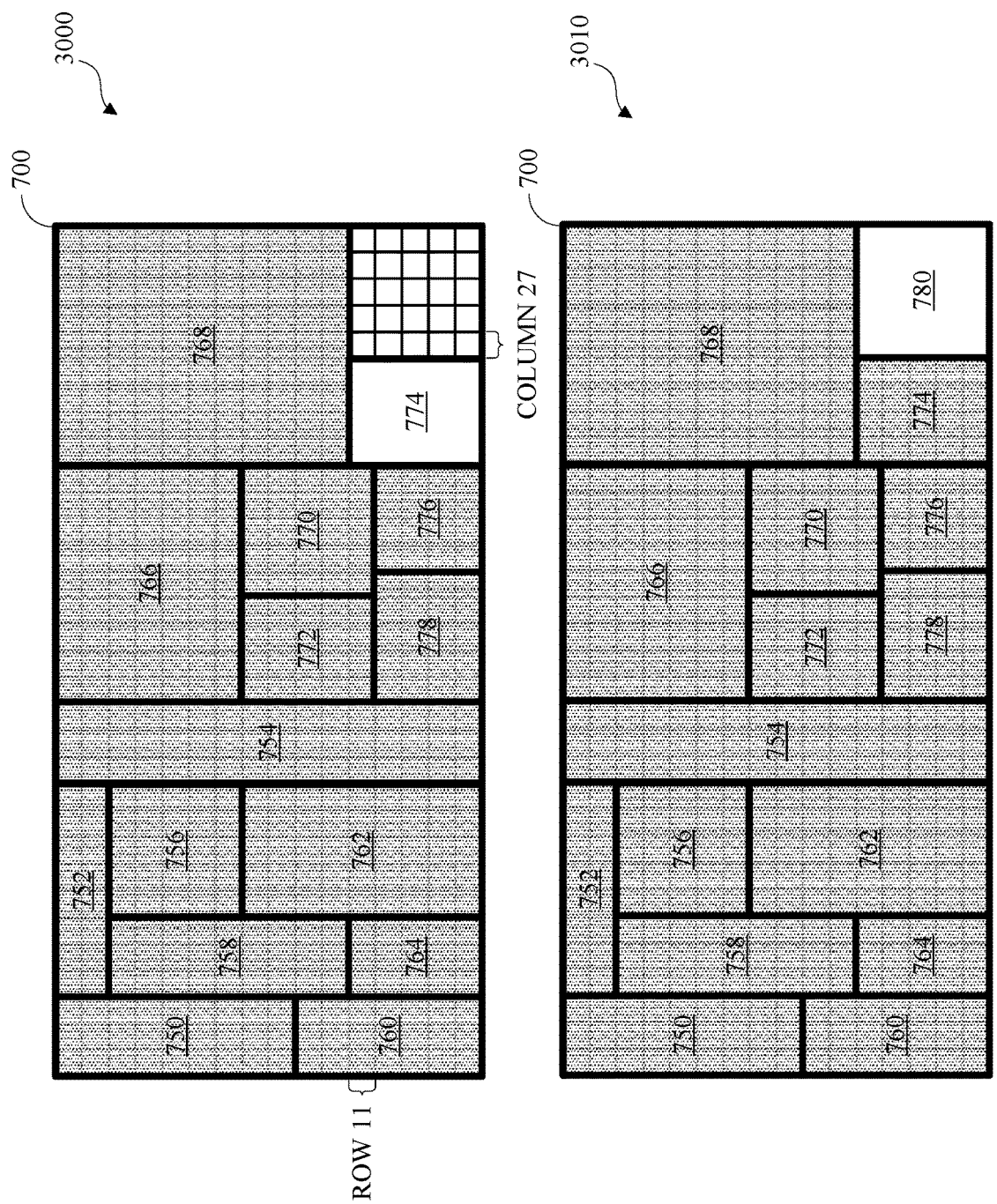

FIG. 30 is a block diagram of contextual-lexicographic coding order with floating block-partitioning, in accordance with implementations of this disclosure.

Subsequent to identifying the image content for the fourteenth block 776 as available, contextual-lexicographic coding order with floating block-partitioning may include determining whether the stack 1920 includes blocks, as shown at 930 in FIG. 9. The stack may include the thirteenth block 774. As shown at 3000, the thirteenth block 774 may be identified as the current block, popped or removed from the stack, and contextual-lexicographic coding order with floating block-partitioning may include determining whether the context for decoding the image content of the thirteenth block 774 is unavailable, as shown at 910 in FIG. 9. The context for decoding the thirteenth block 774 may be the reconstructed image content of the tenth block 768, the reconstructed image content of the eleventh block 770, and the reconstructed image content of the fourteenth block 776, which may be identified as available. The thirteenth block 774 is shown at 3000 with a stippled background to indicate that the image content for the thirteenth block 774 may be identified as available for coding a subsequently coded block. The image content for the thirteenth block 774 may be decoded, as indicated at 920 in FIG. 9, prior to, concurrent with, or subsequent to obtaining block dimensions and location data for subsequent blocks from the portion 700. The image content for the thirteenth block 774 may be decoded prior to decoding subsequent blocks from the portion 700.

As shown at 3010, subsequent to identifying the image content for the thirteenth block 774 as available, contextual-lexicographic coding order with floating block-partitioning may include determining whether the stack 1920 includes blocks, as shown at 930 in FIG. 9. The stack 1920 may omit blocks. Subsequent to determining that the stack 1920 omits blocks, contextual-lexicographic coding order with floating block-partitioning may include obtaining block dimensions and location data for a sixteenth block 780, such as by determining the block dimensions and location data at an encoder or decoding the block dimensions and determining the location data at a decoder. The sixteenth block 780 is shown as a 5×5 block. The sixteenth block 780 is shown with a solid white background to indicate that the reconstructed image content, such as reconstructed pixel values, for the sixteenth block 780 is unavailable. The unavailable image content for the sixteenth block 780 may be obtained, such as decoded at a decoder, subsequent to obtaining the block dimension and location data for the sixteenth block 780.

Encoding the portion 700 may include identifying the block location and dimension data for the sixteenth block 780 and including the block dimension data or the block dimension data and the block location data in the output bitstream.

In some implementations, decoding the portion 700 may include decoding the block location data and the block dimension data for the sixteenth block 780 from the encoded bitstream.

In some implementations, the encoded bitstream may omit the block location information for the sixteenth block 780 and decoding the portion 700 may include determining the block location. Contextual-lexicographic coding order with floating block-partitioning may include using the minimum row constraint and the minimum column constraint, (min, min), as shown at 940 in FIG. 9. Decoding the block dimension data, such as shown at 950 in FIG. 9, for the sixteenth block 780 may include decoding a block height of five pixels and a block width of five pixels. Identifying the block location for the sixteenth block 780 may include using the available location context, the block location constraints, and the block dimensions, as shown at 960 in FIG. 9. For sixteenth block 780, the available location context may include the tenth block 768 and the thirteenth block 774. As shown at 3000, prior to obtaining the block location and dimension data for sixteenth block 780, the minimum available row is row 11 and the minimum available column within the minimum available row is column 27.

Figure 31:
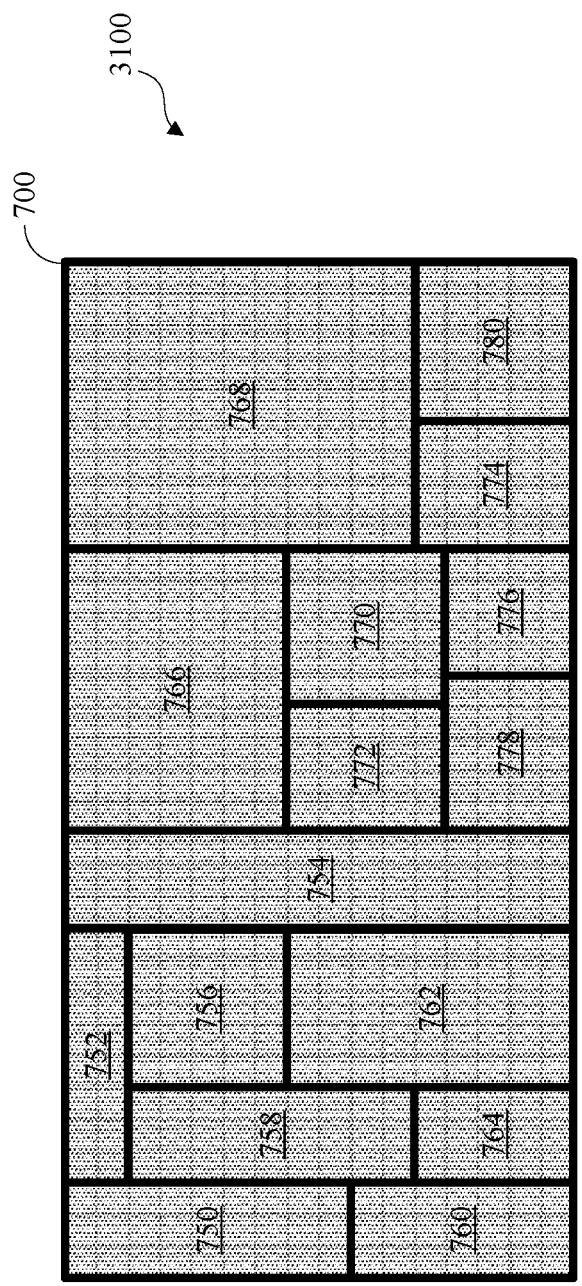

FIG. 31 is a block diagram of contextual-lexicographic coding order with floating block-partitioning, in accordance with implementations of this disclosure.

Subsequent to obtaining the block dimensions and location data for the sixteenth block 780 as shown at 3010 in FIG. 30, contextual-lexicographic coding order with floating block-partitioning may include determining whether the context for decoding the image content of the sixteenth block 780 is unavailable, as shown at 910 in FIG. 9. As shown at 3100, the context for decoding the sixteenth block 780 may include the reconstructed image content of the tenth block 768 and the reconstructed image content of the thirteenth block 774, which may be identified as available. The sixteenth block 780 is shown at 3100 in FIG. 31 with a stippled background to indicate that the image content for the sixteenth block 780 may be decoded, as indicated at 920 in FIG. 9.

As used herein, the terms "optimal", "optimized", "optimization", or other forms thereof, are relative to a respective context and are not indicative of absolute theoretic optimization unless expressly specified herein.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in one implementation, for example, the transmitting computing and communication device 100A or the receiving computing and communication device 100B can be implemented using a computer program that, when executed, carries out any of the respective methods, algorithms and/or instructions described herein. In addition, or alternatively, for example, a special purpose computer/processor can be utilized which can contain specialized hardware for carrying out any of the methods, algorithms, or instructions described herein.

The transmitting computing and communication device 100A and receiving computing and communication device 100B can, for example, be implemented on computers in a real-time video system. Alternatively, the transmitting computing and communication device 100A can be implemented on a server and the receiving computing and communication device 100B can be implemented on a device separate from the server, such as a hand-held communications device. In this instance, the transmitting computing and communication device 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting computing and communication device 100A. Other suitable transmitting computing and communication device 100A and receiving computing and communication device 100B implementation schemes are available. For example, the receiving computing and communication device 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method comprising:
   obtaining, from an encoded bitstream, encoded data for a defined portion of a frame;
   generating, by a processor, a reconstructed frame by decoding the encoded data using lexicographic coding order with floating block-partitioning, wherein the defined portion includes a plurality of blocks of pixels, wherein decoding the encoded data using lexicographic coding order with floating block-partitioning includes:
      decoding, from the encoded data, block dimension data for respective blocks from the plurality of blocks in lexicographic coding order;
      determining block location data for the respective blocks from the plurality of blocks in lexicographic coding order;
      generating reconstructed block data for the respective blocks from the plurality of blocks using the block dimension data and the block location data by decoding, from the encoded data, image content data for the respective blocks from the plurality of blocks; and
      including the reconstructed block data in the reconstructed frame; and
   outputting the reconstructed frame for presentation to a user.

2. The method of claim 1, wherein the defined portion is a tile or the frame.

3. The method of claim 1, wherein decoding the block dimension data includes decoding the block dimension data from a header for the defined portion.

4. The method of claim 1, wherein decoding the encoded data using lexicographic coding order with floating block-partitioning omits using a trellising constraint.

5. The method of claim 1, wherein determining the block location data omits using sub-blocks.

6. The method of claim 1, wherein decoding the encoded data using lexicographic coding order with floating block-partitioning includes:
   decoding the image content data subsequent to decoding the block dimension data and determining the block location data.

7. The method of claim 1, wherein decoding the encoded data using lexicographic coding order with floating block-partitioning includes:
   decoding the encoded data using raster-lexicographic coding order with floating block-partitioning, wherein decoding the encoded data using raster-lexicographic coding order with floating block-partitioning includes, for a current block from the plurality of blocks:
  determining the block location data using a minimum row block location constraint and a minimum column block location constraint such that determining the block location data includes:
    identifying, in accordance with the minimum row block location constraint, a row nearest the top of the defined portion that includes one or more pixels from the defined portion, other than pixels corresponding to a previously identified block from the defined portion; and
    identifying, in accordance with the minimum column block location constraint, a column nearest the left of the defined portion that includes a pixel from the one or more pixels.

8. The method of claim 1, wherein decoding the encoded data using lexicographic coding order with floating block-partitioning includes:
  decoding the encoded data using contextual-lexicographic coding order with floating block-partitioning, wherein decoding the encoded data using contextual-lexicographic coding order with floating block-partitioning includes, for a current block from the plurality of blocks:
    determining whether at least some context is unavailable for decoding the image content data for the current block;
    identifying block location constraints for identifying the block location data for the current block; and
    determining the block location data in accordance with the block location constraints.

9. The method of claim 8, wherein determining whether at least some context is unavailable for decoding the image content data for the current block includes identifying an absence of unavailable context, and wherein decoding the encoded data using contextual-lexicographic coding order with floating block-partitioning includes, for the current block:
  on a condition that a pending-block-stack has a cardinality of zero, identifying the block location constraints includes:
    identifying a minimum row block location constraint, wherein the minimum row block location constraint indicates a minimum row from the defined portion that includes one or more pixels from the defined portion, other than pixels corresponding to a respective previously identified block from the defined portion; and
    identifying a minimum column block location constraint, wherein the minimum column block location constraint indicates a minimum column from the defined portion that includes an intersection pixel from the one or more pixels from the minimum row; and
  determining the block location data in accordance with the block location constraints such that the top-left pixel of the block corresponds with the intersection pixel.

10. The method of claim 8, wherein decoding the encoded data using contextual-lexicographic coding order with floating block-partitioning includes, for the current block:
  in response to determining that at least some context is unavailable for decoding the image content data for the current block:
    pushing the current block on a pending-block-stack such that the current block is a most recently pushed block;
    identifying a subsequent block from the defined portion as the current block;
    identifying the block location constraints such that identifying the block location constraints includes:
      identifying a contextual column block location constraint, wherein the contextual column block location constraint indicates a contextual column from the defined portion immediately adjacent to the left of the most recently pushed block, wherein the contextual column includes one or more pixels from the defined portion, other than pixels corresponding to a respective previously identified block from the defined portion; and
      identifying a minimum row block location constraint, wherein the minimum row block location constraint indicates a minimum row from the defined portion that includes an intersection pixel from the one or more pixels from the contextual column; and
    determining the block location data in accordance with the block location constraints such that the top-right pixel of the block corresponds with the intersection pixel.

11. The method of claim 8, wherein determining whether at least some context is unavailable for decoding the image content data for the current block includes identifying an absence of unavailable context, and wherein decoding the encoded data using contextual-lexicographic coding order with floating block-partitioning includes:
  on a condition that a pending-block-stack includes a block from the plurality of blocks:
    identifying the block from the pending-block-stack as the current block; and
    determining whether at least some context is unavailable for decoding the image content data for the current block.

12. An apparatus comprising:
  a processor configured to:
    obtain, from an encoded bitstream, encoded data for an image;
    generate a reconstructed image by decoding the encoded data using lexicographic coding order with floating block-partitioning, wherein a defined portion includes a plurality of blocks of pixels, wherein decoding the encoded data using lexicographic coding order with floating block-partitioning includes:
      decoding, from the encoded data, block dimension data for respective blocks from the plurality of blocks in lexicographic coding order;
      determining block location data for the respective blocks from the plurality of blocks in lexicographic coding order;
      generating reconstructed block data for the respective blocks from the plurality of blocks using the block dimension data and the block location data by decoding, from the encoded data, image content data for the respective blocks from the plurality of blocks; and
      including the reconstructed block data in the reconstructed image; and
    output the reconstructed image for presentation to a user.

13. The apparatus of claim 12, wherein the processor is configured to decode the encoded data using lexicographic coding order with floating block-partitioning by:

decoding the encoded data using raster-lexicographic coding order with floating block-partitioning, wherein decoding the encoded data using raster-lexicographic coding order with floating block-partitioning includes, for a current block from the plurality of blocks:
    determining the block location data using a minimum row block location constraint and a minimum column block location constraint such that the block location data indicates that a top-left pixel of the block is located at a pixel from the defined portion, other than a pixel corresponding to a previously identified block from the defined portion, at an intersection of a minimum row from the defined portion that includes the pixel and a minimum column from the defined portion that includes the pixel.

14. The apparatus of claim 12, wherein the processor is configured to decode the encoded data using lexicographic coding order with floating block-partitioning by:
    decoding the encoded data using contextual-lexicographic coding order with floating block-partitioning, wherein decoding the encoded data using contextual-lexicographic coding order with floating block-partitioning includes, for a current block from the plurality of blocks:
        determining whether at least some context is unavailable for decoding the image content data for the current block;
        identifying block location constraints for identifying the block location data for the current block; and
        determining the block location data in accordance with the block location constraints.

15. The apparatus of claim 14, wherein determining whether at least some context is unavailable for decoding the image content data for the current block includes identifying an absence of unavailable context, and wherein decoding the encoded data using contextual-lexicographic coding order with floating block-partitioning includes, for the current block:
    on a condition that a pending-block-stack has a cardinality of zero, identifying the block location constraints includes:
        identifying a minimum row block location constraint, wherein the minimum row block location constraint indicates a minimum row from the defined portion that includes one or more pixels from the defined portion, other than pixels corresponding to a respective previously identified block from the defined portion; and
        identifying a minimum column block location constraint, wherein the minimum column block location constraint indicates a minimum column from the defined portion that includes an intersection pixel from the one or more pixels from the minimum row; and
    determining the block location data in accordance with the block location constraints such that the top-left pixel of the block corresponds with the intersection pixel.

16. The apparatus of claim 14, wherein decoding the encoded data using contextual-lexicographic coding order with floating block-partitioning includes, for the current block:
    in response to determining that at least some context is unavailable for decoding the image content data for the current block:
        pushing the current block on a pending-block-stack such that the current block is a most recently pushed block;
        identifying a subsequent block from the defined portion as the current block;
        identifying the block location constraints such that identifying the block location constraints includes:
            identifying a contextual column block location constraint, wherein the contextual column block location constraint indicates a contextual column from the defined portion immediately adjacent to the left of the most recently pushed block, wherein the contextual column includes one or more pixels from the defined portion, other than pixels corresponding to a respective previously identified block from the defined portion; and
            identifying a minimum row block location constraint, wherein the minimum row block location constraint indicates a minimum row from the defined portion that includes an intersection pixel from the one or more pixels from the contextual column; and
        determining the block location data in accordance with the block location constraints such that the top-right pixel of the block corresponds with the intersection pixel.

17. The apparatus of claim 14, wherein determining whether at least some context is unavailable for decoding the image content data for the current block includes identifying an absence of unavailable context, and wherein decoding the encoded data using contextual-lexicographic coding order with floating block-partitioning includes:
    on a condition that a pending-block-stack includes a block:
    identifying the block from the pending-block-stack as the current block; and
    determining whether at least some context unavailable for decoding the image content data for the current block.

18. A method comprising:
    obtaining, from an encoded bitstream, an encoded tile header for a tile from an image;
    decoding, from the encoded tile header, block dimensions for a first block, other than a sub-block, wherein the block dimensions for the first block differ from block dimensions for an adjacent block, other than a sub-block, from the tile;
    identifying the first block as a current block;
    determining block location data for the current block in accordance with block location constraints;
    obtaining, from the encoded bitstream, encoded block data for the current block;
    generating reconstructed block data for the current block using the block dimensions and the block location data by decoding the encoded block data;
    including the reconstructed block data in a reconstructed tile;
    including the reconstructed tile in a reconstructed image; and
    outputting the reconstructed image for presentation to a user.

19. The method of claim 18, wherein:
the block location constraints include a minimum row block location constraint and a minimum column block location constraint; and
determining the block location data includes:
    identifying, in accordance with the minimum row block location constraint, a row nearest the top of the tile that includes one or more pixels, other than pixels corresponding to a previously identified block from the tile; and identifying, in accordance with the minimum column block location constraint, a column nearest the left of the tile that includes a pixel from the one or more pixels.

20. The method of claim 18, wherein determining the block location data includes:

determining whether at least some context is unavailable for decoding the encoded block data; and identifying the block location constraints, wherein:

on a condition that determining whether at least some context is unavailable for decoding the image content data for the current block includes identifying an absence of unavailable context, identifying the block location constraints includes:

identifying a minimum row block location constraint, wherein the minimum row block location constraint indicates a row nearest the top of the tile that includes one or more pixels, other than pixels corresponding to a previously identified block from the tile; and identifying a minimum column block location constraint, wherein the minimum column block location constraint indicates a column nearest the left of the tile that includes a pixel from the one or more pixels; and in response to determining that at least some context is unavailable for decoding the image content data for the current block, identifying the block location constraints includes:

decoding, from the encoded tile header, block dimensions for the adjacent block;

identifying the adjacent block as the current block;

identifying a contextual column block location constraint, wherein the contextual column block location constraint indicates a column of the tile adjacent to the left of the first block, wherein the column includes one or more pixels, other than pixels corresponding to previously identified blocks from the tile;

identifying a minimum row block location constraint, wherein the minimum row block location constraint indicates a row nearest the top of the tile that includes a pixel from the one or more pixels.

* * * * *